(12) United States Patent
Denney et al.

(10) Patent No.: US 8,908,716 B2
(45) Date of Patent: *Dec. 9, 2014

(54) UPSTREAM CHANNEL BONDING IN A CABLE COMMUNICATIONS SYSTEM

(75) Inventors: Lisa Voigt Denney, Suwanee, GA (US); Niki Roberta Pantelias, Duluth, GA (US); A. Scott Hollums, Duluth, GA (US); Victor T. Hou, La Jolla, CA (US); John Daniel Horton, Jr., Alpharetta, GA (US); David Michael Pullen, Hayesville, NC (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,095

(22) Filed: Sep. 14, 2012

(65) Prior Publication Data

US 2013/0070784 A1 Mar. 21, 2013

Related U.S. Application Data

(63) Continuation of application No. 11/298,446, filed on Dec. 12, 2005, now Pat. No. 8,279,892.

(60) Provisional application No. 60/634,809, filed on Dec. 10, 2004.

(51) Int. Cl.
| | | |
|---|---|---|
| *H04J 3/16* | (2006.01) | |
| *H04L 12/28* | (2006.01) | |
| *H04L 12/801* | (2013.01) | |
| *H04N 21/61* | (2011.01) | |
| *H04L 12/26* | (2006.01) | |
| *H04L 12/709* | (2013.01) | |
| *H04L 12/861* | (2013.01) | |
| *H04N 7/173* | (2011.01) | |
| *H04L 12/803* | (2013.01) | |

(52) U.S. Cl.
CPC ............. *H04L 12/2801* (2013.01); *Y02B 60/33* (2013.01); *H04L 47/10* (2013.01); *H04N 21/6168* (2013.01); *H04L 12/26* (2013.01); *H04L 45/245* (2013.01); *H04L 49/90* (2013.01); *H04L 49/9094* (2013.01); *H04L 43/00* (2013.01); *H04J 3/1694* (2013.01); *H04N 7/17309* (2013.01); *H04L 47/35* (2013.01); *H04L 47/125* (2013.01)
USPC ........................................................ 370/468

(58) Field of Classification Search
USPC ........................................ 370/468, 477, 480
See application file for complete search history.

(56) References Cited

U.S. PATENT DOCUMENTS

| | | | |
|---|---|---|---|
| 6,594,305 | B1 | 7/2003 | Roeck et al. |
| 6,650,624 | B1 | 11/2003 | Quigley et al. |

(Continued)

FOREIGN PATENT DOCUMENTS

| | | |
|---|---|---|
| CN | 1181671 A | 5/1989 |
| CN | 1440619 A | 9/2003 |

(Continued)

OTHER PUBLICATIONS

European Search Report issued in EP Appl. No. 06005337.8, dated Jun. 27, 2006, 3 pages.

(Continued)

*Primary Examiner* — Mohammad Anwar
(74) *Attorney, Agent, or Firm* — Sterne, Kessler, Goldstein & Fox, P.L.L.C.

(57) ABSTRACT

A method for increasing upstream bandwidth per cable modem user in a cable communications system that includes a cable modem termination system (CMTS) and a plurality of cable modems is provided. The method permits a cable modem to transmit data to the CMTS on multiple upstream channels simultaneously using a technique called "channel bonding." Channel bonding allows smaller bandwidth upstream channels to be bonded together to create a larger bandwidth pipe.

16 Claims, 30 Drawing Sheets

(56) References Cited

U.S. PATENT DOCUMENTS

| | | | |
|---|---|---|---|
| 6,775,707 | B1 | 8/2004 | Bennett et al. |
| 6,807,193 | B1 | 10/2004 | Beser |
| 6,898,755 | B1 | 5/2005 | Hou |
| 6,961,314 | B1* | 11/2005 | Quigley et al. ............... 370/252 |
| 7,023,871 | B2 | 4/2006 | Lind et al. |
| 7,050,419 | B2 | 5/2006 | Azenkot et al. |
| 7,106,760 | B1 | 9/2006 | Perumal et al. |
| 7,113,484 | B1 | 9/2006 | Chapman et al. |
| 7,145,997 | B2 | 12/2006 | Poikselka et al. |
| 7,190,683 | B2 | 3/2007 | Giallorenzi et al. |
| 7,333,495 | B2* | 2/2008 | Sala et al. ................ 370/395.21 |
| 7,532,627 | B2 | 5/2009 | Chapman et al. |
| 7,970,010 | B2 | 6/2011 | Denney et al. |
| 8,279,892 | B2* | 10/2012 | Denney et al. ................ 370/468 |
| 8,705,567 | B2 | 4/2014 | Denney et al. |
| 8,711,878 | B2 | 4/2014 | Denney et al. |
| 2001/0053152 | A1 | 12/2001 | Sala et al. |
| 2002/0080868 | A1 | 6/2002 | Bunn et al. |
| 2002/0093955 | A1 | 7/2002 | Grand et al. |
| 2002/0136291 | A1 | 9/2002 | Sala et al. |
| 2003/0067883 | A1 | 4/2003 | Azenkot et al. |
| 2003/0103527 | A1 | 6/2003 | Beser |
| 2003/0152095 | A1 | 8/2003 | Foore et al. |
| 2003/0177502 | A1 | 9/2003 | Kolze et al. |
| 2004/0162020 | A1 | 8/2004 | Dale et al. |
| 2004/0244043 | A1 | 12/2004 | Lind et al. |
| 2005/0122996 | A1 | 6/2005 | Azenkot et al. |
| 2005/0232304 | A1 | 10/2005 | Quigley |
| 2005/0265376 | A1* | 12/2005 | Chapman et al. ............. 370/461 |
| 2006/0039380 | A1 | 2/2006 | Cloonan et al. |
| 2006/0126505 | A1 | 6/2006 | Denney et al. |
| 2006/0126506 | A1 | 6/2006 | Denney et al. |
| 2006/0126660 | A1 | 6/2006 | Denney et al. |
| 2006/0153093 | A1 | 7/2006 | Cloonan et al. |
| 2007/0109995 | A1 | 5/2007 | Quigley et al. |
| 2007/0195817 | A1 | 8/2007 | Denney et al. |
| 2010/0296511 | A1 | 11/2010 | Prodan et al. |

FOREIGN PATENT DOCUMENTS

| | | | |
|---|---|---|---|
| CN | 1466850 | A | 1/2004 |
| CN | 101073260 | A | 11/2007 |
| TW | 321809 | | 12/1997 |
| TW | 503637 | B | 9/2002 |
| TW | 576028 | B | 2/2004 |
| WO | WO 2006/020559 | | 2/2006 |

OTHER PUBLICATIONS

International Search Report issued in International Appl. No. PCT/US05/44780, dated Jul. 12, 2006, 7 pages.

Data-Over-Cable Service Interface Specifications, DOCSIS 2.0, Radio Frequency Interface Specification, CM-SP-RFIv2.0-I10-051209, Cable Television Laboratories, Inc., Dec. 9, 2005, 538 pgs.

Non-Final Rejection mailed Jan. 6, 2009 for U.S. Appl. No. 11/298,447, 23 pgs.

Second Non-Final Rejection mailed Jun. 10, 2009 for U.S. Appl. No. 11/298,447, 20 pgs.

Non-Final Rejection mailed Oct. 6, 2008 for U.S. Appl. No. 11/298,451, 19 pgs.

Second Non-Final Rejection mailed Jun. 8, 2009 for U.S. Appl. No. 11/298,451, 4 pgs.

Non-Final Rejection mailed Mar. 11, 2009 for U.S. Appl. No. 11/384,409, 28 pgs.

Third Non-Final Rejection mailed Jan. 6, 2010 for U.S. Appl. No. 11/298,447, 23 pgs.

Final Rejection mailed Dec. 30, 2009 for U.S. Appl. No. 11/384,409, 34 pgs.

Examination issued in EP Appl. No. 06005337.8, dated Oct. 8, 2009, 5 pages.

European Search Report directed to related European Application No. 05853648.3-1244, mailed Jan. 25, 2011, from the European Patent Office, Rijswijk, Netherlands; 8 pages.

Notice of Allowance mailed Feb. 14, 2011 for U.S. Appl. No. 11/298,451, filed Dec. 12, 2005; 7 pages.

Final Rejection mailed Mar. 22, 2011 for U.S. Appl. No. 11/384,409, filed Mar. 21, 2006; 29 pages.

European Search Report for European Patent Application No. 05853648.3-1244, dated Jan. 25, 2011, from the European Patent Office, Rijswijk, Netherlands, 8 pages.

Non-Final Rejection mailed Dec. 22, 2010 for U.S. Appl. No. 11/298,447, filed Dec. 12, 2005, 17 pages.

Non-Final Rejection mailed Dec. 28, 2011 for U.S. Appl. No. 11/298,447, filed Dec. 12, 2005, 19 pages.

Non-Final Rejection mailed Jul. 7, 2010 for U.S. Appl. No. 11/298,447, filed Dec. 12, 2005, 20 pgs.

Non-Final Rejection mailed Jun. 30, 2011 for U.S. Appl. No. 11/298,447, filed Dec. 12, 2005, 20 pages.

Non-Final Rejection mailed Mar. 23, 2010 for U.S. Appl. No. 11/298,451, filed Dec. 12, 2005, 7 pgs.

Non-Final Rejection mailed Sep. 15, 2010 for U.S. Appl. No. 11/384,409, filed Mar. 21, 2006, 28 pgs.

European Search Report for European Patent Application No. 05853648.3-1244, dated Oct. 25, 2011, from the European Patent Office, Rijswijk, Netherlands, 5 pages.

Non-Final Rejection mailed Jun. 7, 2012 for U.S. Appl. No. 11/298,447, filed Dec. 12, 2005, 33 pages.

Final Rejection mailed Dec. 21, 2012 for U.S. Appl. No. 11/298,447, filed Dec. 12, 2005, 20 pages.

Notice of Allowance mailed Apr. 11, 2013 for U.S. Appl. No. 11/298,447, filed Dec. 12, 2005, 8 pages.

Notice of Allowance mailed Dec. 8, 2009 for U.S. Appl. No. 11/298,451, filed Dec. 12, 2005, 10 pages.

Notice of Allowance mailed Nov. 5, 2010 for U.S. Appl. No. 11/298,451, filed Dec. 12, 2005, 6 pages.

Non-Final Rejection mailed Apr. 18, 2012, for U.S. Appl. No. 11/384,409, filed Mar. 21, 2006, 28 pages.

Notice of Allowance mailed Sep. 27, 2012 for U.S. Appl. No. 11/384,409, filed Mar. 21, 2006, 7 pages.

Non-Final Rejection mailed Jan. 17, 2013 for U.S. Appl. No. 11/384,409, filed Mar. 21, 2006, 6 pages.

Notice of Allowance mailed May 1, 2013 for U.S. Appl. No. 11/384,409, filed Mar. 21, 2006, 8 pages.

English Abstract for CN 1181671 A, published May 13, 1998, retrieved from http://worldwide.espacenet.com, 1 page.

English Abstract for CN 1440619 A, published Sep. 3, 2003, retrieved from http://worldwide.espacenet.com, 2 pages.

English Abstract for CN 1466850 A, published Jan. 7, 2004, retrieved from http://worldwide.espacenet.com, 2 pages.

English Abstract CN 101073260 A, published Nov. 14, 2007, retrieved from http://worldwide.espacenet.com, 2 pages.

English Abstract for TW 321809, published Dec. 1, 2007, retrieved from http://twpat1.tipo.gov.tw, 1 page.

English Abstract for TW 503637 B, published Sep. 21, 2002, retrieved from http://worldwide.espacenet.com, 2 pages.

English Abstract for TW 576028 B, published Feb. 11, 2004, retrieved from http://worldwide.espacenet.com, 1 page.

Examination Report dated Jun. 25, 2013, issued in European Application No. 05853648.3, 4 pages.

Notice of Allowance mailed Aug. 27, 2013, for U.S. Appl. No. 11/298,447, filed Dec. 12, 2005, 8 pages.

Notice of Allowance mailed Dec. 2, 2013, for U.S. Appl. No. 11/298,447, filed Dec. 12, 2005, 10 pages.

Notice of Allowance mailed Aug. 6, 2013, for U.S. Appl. No. 11/384,409, filed Mar. 21, 2006, 8 pages.

Notice of Allowance mailed Nov. 22, 2013, for U.S. Appl. No. 11/384,409, filed Mar. 21, 2006, 9 pages.

* cited by examiner

UPSTREAM CHANNEL BONDING IN A CABLE COMMUNICATIONS SYSTEM

CROSS-REFERENCE TO RELATED APPLICATIONS

This application is a continuation of U.S. patent application Ser. No. 11/298,446, filed Dec. 12, 2005, now U.S. Pat. No. 8,279,892 which claims the benefit of U.S. Provisional Patent Application No. 60/634,809, filed Dec. 10, 2004, both of which are incorporated herein by reference in their entirety.

BACKGROUND OF THE INVENTION

1. Field of the Invention

The present invention is directed to a method for transmitting data in a data communications system, such as, but not limited to, a cable communications system.

2. Background

Conventional cable communications systems typically employ a cable modem headend that manages communications with a plurality of cable modems. The headend defines the upstream operating characteristics that enable the cable modems to send carrier signals upstream to the headend. The upstream may include multiple channels that can be assigned to the cable modems. These channels are separated from each other by operating at different frequencies.

One or more cable modems use a designated frequency channel to transmit a carrier signal carrying requests and/or data to the headend. The headend receives the upstream signal at a demodulator that interfaces with the physical spectrum interconnecting the cable modems with the headend. The demodulator recovers the underlying requests and/or grants from the carrier signal and forwards this information to a media access controller (MAC) for additional processing.

Cable Operators would like to be able to provide higher upstream bandwidth per user to compete with Fiber-to-the-Subscriber (FTTx) offerings, among others, and services to small businesses. For example, Cable Operators have stated an objective of 100 Megabits per second (Mbps) upstream throughput from a single user or group of users. Using very high orders of modulation (e.g., 1024QAM) and wider channels in the upstream, however, are currently impractical.

Accordingly, what is needed are a practical method and system for providing increased upstream throughput in a cable communications system.

BRIEF SUMMARY OF THE INVENTION

One way to achieve increased upstream throughput in a cable communications system is to enable a user or group of users to transmit on multiple upstream channels simultaneously. This technique of bonding together smaller bandwidth upstream channels to create a larger bandwidth pipe is referred to herein as "channel bonding." Methods and systems for enabling upstream channel bonding in a cable communications system are described herein.

This specification discloses one or more embodiments that incorporate the features of this invention. The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

In a first embodiment, a method in a cable modem termination system (CMTS) for high-throughput bandwidth allocation in a cable network includes: bonding a plurality of upstream channels in a group, receiving a bandwidth request from a cable modem, and issuing a multichannel grant. The multichannel grant allocates the requested bandwidth across the bonded group for use by the cable modem in transmitting a stream of data packets to the CMTS.

In a second embodiment, a method in a cable modem (CM) for high-throughput transmission in a cable network includes sending a bandwidth request to a CMTS. The method further includes receiving a multichannel grant that allocates the requested bandwidth across a plurality of upstream channels in a bonded group, and transmitting a stream of data packets to the CMTS on the plurality of upstream channels in the bonded group according to the multichannel grant.

In a third embodiment, a high-throughput cable network includes a CMTS and a plurality of CMs residing on the cable network. The CMTS bonds a plurality of upstream channels in a group and issues a multichannel grant responsive to a bandwidth request from a CM of the plurality of CMs. The multichannel grant allocates the requested bandwidth across the bonded group. The CM transmits a stream of data packets to the CMTS on the plurality of upstream channels in the bonded group according to the multichannel grant.

Further features and advantages of the present invention, as well as the structure and operation of various embodiments of the present invention, are described in detail below with reference to the accompanying drawings. It is noted that the invention is not limited to the specific embodiments described herein. Such embodiments are provided herein for illustrative purposes only. Additional embodiments will be apparent to persons skilled in the art based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
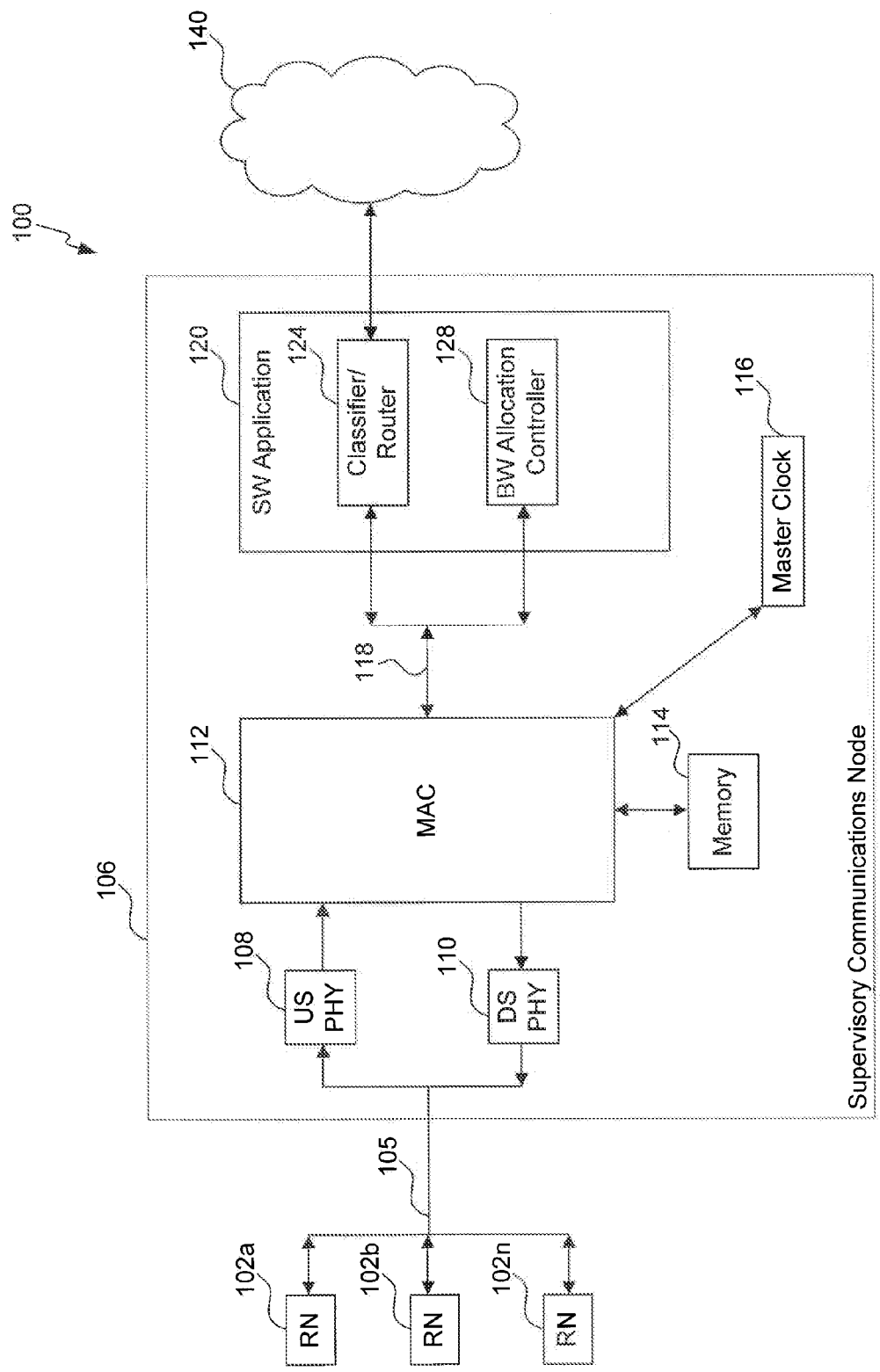
FIG. 1 illustrates an example voice and data communications management system for implementing upstream channel bonding, in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Table of Contents

1. Overview
    1.1 System Overview
    1.2 Channel Bonding Overview
    1.3 Terminology
2. Traffic Segmentation
    2.1 Segmentation Overview
    2.2 Continuous Concatenation and Fragmentation
        2.2.1 Conventional DOCSIS Concatenation and Fragmentation
        2.2.2 Continuous Concatenation and Fragmentation in Accordance with an Embodiment of the Present Invention
        2.2.3 Segmentation without Segment Headers
3. Requesting Bandwidth
    3.1 Request Mechanisms
    3.2 Piggyback Requesting
        3.2.1 Example Rules for Piggyback Requesting with Segment Headers On
        3.2.2 Example Rules for Piggyback Requesting with Segment Headers Off
    3.3 Contention Requesting
4. Granting Bandwidth
5. Baseline Privacy Impact
    5.1 Conventional DOCSIS Traffic Encryption
    5.2 Traffic Encryption for Bonded Upstream Channels
        5.2.1 CM Forcing Single Packet Transmission
        5.2.2 Using Dedicated SID with BPI Disabled
        5.2.2 Encrypting on PDU Basis Rather Than Segment Basis
6. System Initialization
7. Detailed MAC Changes
    7.1 Request Message
    7.2 Segment Header Formats
    7.3 Extended Header Formats
        7.3.1 Request EHDR with Length 4
        7.3.2 BP_UP2
    7.4 MAC Management Message Changes
        7.4.1 Bonded Upstream Channel Descriptor (B-UCD)
            7.4.1.1 Removing Channel from Upstream Bonding Group
            7.4.1.2 Adding Channel to Upstream Bonding Group
            7.4.1.3 Replacing Channel in Upstream Bonding Group
        7.4.2 Bonded Upstream Bandwidth Allocation MAP (B-MAP)
        7.4.3 Bonded Upstream Initial Ranging Request
        7.4.4 Ranging Response Messages
            7.4.4.1 Bonded Upstream Channel Override TLV
        7.4.5 Registration Messages
            7.4.5.1 Upstream Channel Bonding Capability TLV
            7.4.5.2 Maximum Concatenated Burst TLV
            7.4.5.3 Maximum Request Outstanding TLV
            7.4.5.4 Request/Transmission Policy TLV 7.4.6 Bonded Channel Upstream Ranging Abort Message
7.4.7 Bonded Channel Upstream Ranging Abort Response Message
7.4.8 DCC-REQ Messages
7.4.8.1 Bonded Upstream Channel ID
8. System Synchronization Requirements
9. Discussion of Other Mechanisms for Bonding Channels
9.1 Bonding at the Physical Layer (PHY)
9.2 Variations of Bonding at the MAC Layer
9.2.1 Requiring Identical Channel Parameters
9.2.2 CM Controlling Bonding
9.3 Bonding at Higher Layers than the MAC Layer
10. Conclusion 1. Overview The conventional CableLabs® Certified™ Cable Modem project interface specification, also known as Data Over Cable Service Interface Specification (DOCSIS®) and referred to herein as "legacy" specifications (e.g., DOCSIS 2.0, DOCSIS 1.1 and DOCSIS 1.0), specify interface requirements for cable communications systems, but do not specify interface requirements for implementing upstream channel bonding. Thus, in an embodiment, the upstream channel bonding technique of the present invention is implemented as an extension of the conventional DOCSIS interface specifications. The DOCSIS 2.0 Radio Frequency Interface Specification SP-RFIv2.0-I04-030730, Cable Television Laboratories, Inc., 2005, is herein incorporated by reference in its entirety.

1.1 System Overview

FIG. 1 illustrates a voice and data communications management system 100. Voice and data communications management system 100 is capable of supporting conventional DOCSIS interface requirements, as well as extensions of the conventional DOCSIS interface requirements for implementing upstream channel bonding, in accordance with an embodiment of the present invention.

System 100 includes a supervisory communications node 106 and one or more widely distributed remote communications nodes 102a-102n (collectively referred to as "remote communications nodes 102"). System 100 can be implemented in any multimedia distribution network. Furthermore, it should be understood that the method and system of the present invention manage the exchange of voice, data, video, audio, messaging, graphics, other forms of media and/or multimedia, or any combination thereof.

Supervisory communications node 106 is centrally positioned to command and control interactions with and among remote communications nodes 102. Supervisory communications node 106 manages upstream modulation and arbitrates bandwidth among remote communications nodes 102. As described in greater detail below, supervisory communications node 106 establishes the upstream slot structure and allocates upstream bandwidth by sending, for example, an upstream channel descriptor (UCD) message and MAP messages, respectively, to remote communications nodes 102. In an embodiment, the UCD and MAP messages are defined by the conventional DOCSIS specifications.

In an embodiment, supervisory communications node 106 is a component of a headend controller for a cable communications network. As such, supervisory communication node 106 is a cable modem termination system (CMTS) or a part thereof. In an embodiment, at least one remote communications node 102 is a cable modem (CM) or a part thereof. In another embodiment, supervisory communications node 106 is a CMTS and at least one remote communications node 102 is part of a television set-top box.

As part of a CM, remote communications node 102 is configurable to transport one or more services to a subscriber. The services include telephony, television broadcasts, pay-for-view, Internet communications (e.g., WWW), radio broadcasts, facsimile, file data transfer, electronic mailing services (email), messaging, video conferencing, live or time-delayed media feeds (such as, speeches, debates, presentations, infomercials, news reports, sporting events, concerts, etc.), and/or the like.

Each remote communications node 102 is assigned one or more service identifier (SID) codes that supervisory communications node 106 uses to allocate bandwidth. A SID is used primarily to identify a specific flow from a remote communications node 102. However, as apparent to one skilled in the relevant art(s), other identifiers can be assigned to distinguish between the remote communications node 102 and/or the flow of traffic therefrom. Accordingly, in an embodiment, a SID or another type of identifier is assigned to identify a specific service affiliated with one or more remote communications nodes 102. In an embodiment, a SID or another type of identifier is assigned to designate a particular service or group of services without regard to the source remote communications node 102. In an embodiment, a SID or another type of identifier is assigned to designate a quality of service (QoS), such as voice or data at decreasing levels of priority, voice lines at different compression algorithms, best effort data, or the like. In an embodiment having multiple SIDs assigned to a single remote communications node, a primary SID is used to identify the remote communications node or a general flow from the remote communications node 102, and one or more other SIDs can be used to carry other specific flows, such as phone calls, video streams, messaging, video-conferencing, or the like.

In an embodiment, supervisory communications node 106 and remote communications nodes 102 are integrated to support protocols such as Internet Protocol (IP), Transmission Control Protocol (TCP), User Datagram Protocol (UDP), Real Time Transport Protocol (RTP), Resource Reservation Protocol (RSVP), or the like.

Communications management system 100 also includes an internodal infrastructure 105. As shown in FIG. 1, internodal infrastructure 105 provides interconnectivity among supervisory communications node 106 and remote communications nodes 102. Internodal infrastructure 105 supports wired, wireless, or both transmission media, including satellite, terrestrial (e.g., fiber optic, copper, twisted pair, coaxial, hybrid fiber-coaxial (HFC), or the like), radio, microwave, free-space optics, and/or any other form or method of transmission.

Communications transmitted in the direction from supervisory communications node 106 towards remote communications nodes 102 are referred to as being in the downstream. In an embodiment, the downstream is divided into one or more downstream channels. Each downstream channel is configured to carry various types of information to remote communications nodes 102. Such downstream information includes television signals, data packets (IP datagrams), voice packets, control messages, and/or the like. In an embodiment, the downstream is formatted with a motion picture expert group (MPEG) transmission convergence sublayer. However, other data formats can also be supported, as would be apparent to one skilled in the relevant art(s).

Communications transmitted from remote communications nodes 102 towards supervisory communications node 106 are referred to as being in the upstream. The upstream is divided into one or more upstream channels. Each upstream channel carries bursts of packets from remote communications nodes 102 to supervisory communications node 106. In accordance with an embodiment of the present invention, multiple upstream channels are bonded together in a bonded channel group to increase upstream throughput. In the upstream, each channel is broken into multiple assignable slots (e.g., minislots), and remote communications nodes 102 send a burst signal in an assigned slot. As discussed above, the slot structure is defined and assigned by supervisory communications node 106.

As shown in FIG. 1, an embodiment of supervisory communications node 106 includes an upstream physical layer demodulator (US PHY) 108, a downstream physical layer modulator (DS PHY) 110, a media access controller (MAC) 112, a memory 114, a software application 120, and a master clock source 116. US PHY 108 forms the physical layer interface between supervisory communications node 106 and the upstream channels of internodal infrastructure 105. Supervisory communications node 106 will include a separate US PHY 108 for each one of the upstream channels. Hence, US PHY 108 receives and demodulates all bursts from remote communications nodes 102.

Conversely, DS PHY 110 forms the physical layer interface between supervisory communications node 106 and the downstream channel(s) of internodal infrastructure 105. Hence, voice, data (including television or radio signals) and/or control messages that are destined for one or more remote communications nodes 102 are collected at DS PHY 110 and transmitted to the respective remote communications nodes 102. DS PHY 110 modulates and/or formats the information for downstream transmission.

MAC 112 receives the upstream signals from US PHY 108 or provides the downstream signals to DS PHY 110, as appropriate. MAC 112 operates as the lower sublayer of the data link layer of supervisory communications node 106. In embodiments, MAC 112 supports fragmentation, concatenation, payload header suppression/expansion, and/or error checking for signals transported over the physical layer (i.e., internodal infrastructure 105).

Memory 114 interacts with MAC 112 to store the signals as they are processed by MAC 112. Memory 114 also stores various auxiliary data used to support the processing activities. Such auxiliary data includes security protocols, identifiers, rules, policies, and the like.

MAC 112 is connected to software application 120 over bus 118, which is a conventional bidirectional bus. Software application 120 operates on one or more processors (or hardware assist devices, such as a field-programmable gate array (FPGA) or application-specific integrated circuit (ASIC)) to receive control messages, voice, and/or data from MAC 112 and implement further processing. As shown, software application 120 includes a classifier/router 124 and a bandwidth (BW) allocation controller 128. BW allocation controller 128 manages upstream and/or downstream modulation and bandwidth allocation. Classifier/router 124 provides rules and policies for classifying and/or prioritizing communications with remote communications nodes 102. Classifier/router 124 also routes signals from remote communications nodes 102 to a destined location over backbone network 140.

Backbone network 140 is part of a wired, wireless, or combination of wired and wireless local area networks (LAN), wide area networks (WAN), and/or optical networks (such as, an organization's intranet, local internets, the global-based Internet (including the World Wide Web (WWW)), virtual private networks, and/or the like). As such, supervisory communications node 106 utilizes backbone network 140 to communicate with another device or application external to communications management system 100. The device or application can be a server, web browser, operating system, other types of information processing software (such as, word processing, spreadsheets, financial management, or the like), television or radio transmitter, another remote communications node 102, another supervisory communications node 106, or the like.

When communications management system 100 is used to implement upstream channel bonding, the upstream channels must be synchronized to master clock source 116, in accordance with an embodiment of the present invention. Synchronization is discussed in more detail below in Section 8.

1.2 Channel Bonding Overview

As described above, one way to achieve increased upstream throughput in a cable communications system is to enable a user or group of users to transmit on multiple upstream channels simultaneously. In an embodiment of the present invention, the upstream channel bonding process is controlled by a CMTS as part of the bandwidth granting process. For example, the CMTS can be supervisory communications node 106 of communications management system 100, shown in FIG. 1.

When a CM makes a request for bandwidth for a given SID on one of its associated upstream channels, the CMTS chooses whether to grant the request on a given channel or over several channels in the form of a multichannel grant. The CMTS is responsible for allocating the bandwidth across the individual upstream channels. This centralized control allows the system the best statistical multiplexing possible and allows the CMTS to do real-time load balancing of the upstream channels within a bonded group. When the CM receives a multichannel grant, it divides its transmission according to the information in the grant. The grant may be staggered in time across any or all of the upstream channels and may require the CM to transmit on all bonded upstream channels simultaneously. The CMTS then uses the multichannel grant information from bandwidth allocation messages to reconstruct the original data stream.

As described above, an embodiment of the present invention requires that the upstream channels be synchronized to a master clock source, such as master clock source 116, shown in FIG. 1. Other than this synchronization requirement, no other requirements are placed on the physical layer (PHY) parameters of any of the channels within the upstream bonding group. The individual channels can be any mix of modulation types, symbol rates, TDMA (Time Division Multiple Access) or S-CDMA (Synchronous Code Division Multiple Access) as specified in the DOCSIS 2.0 specification, and can be any mix of adjacent or non-adjacent upstream channels.

Figure 2:
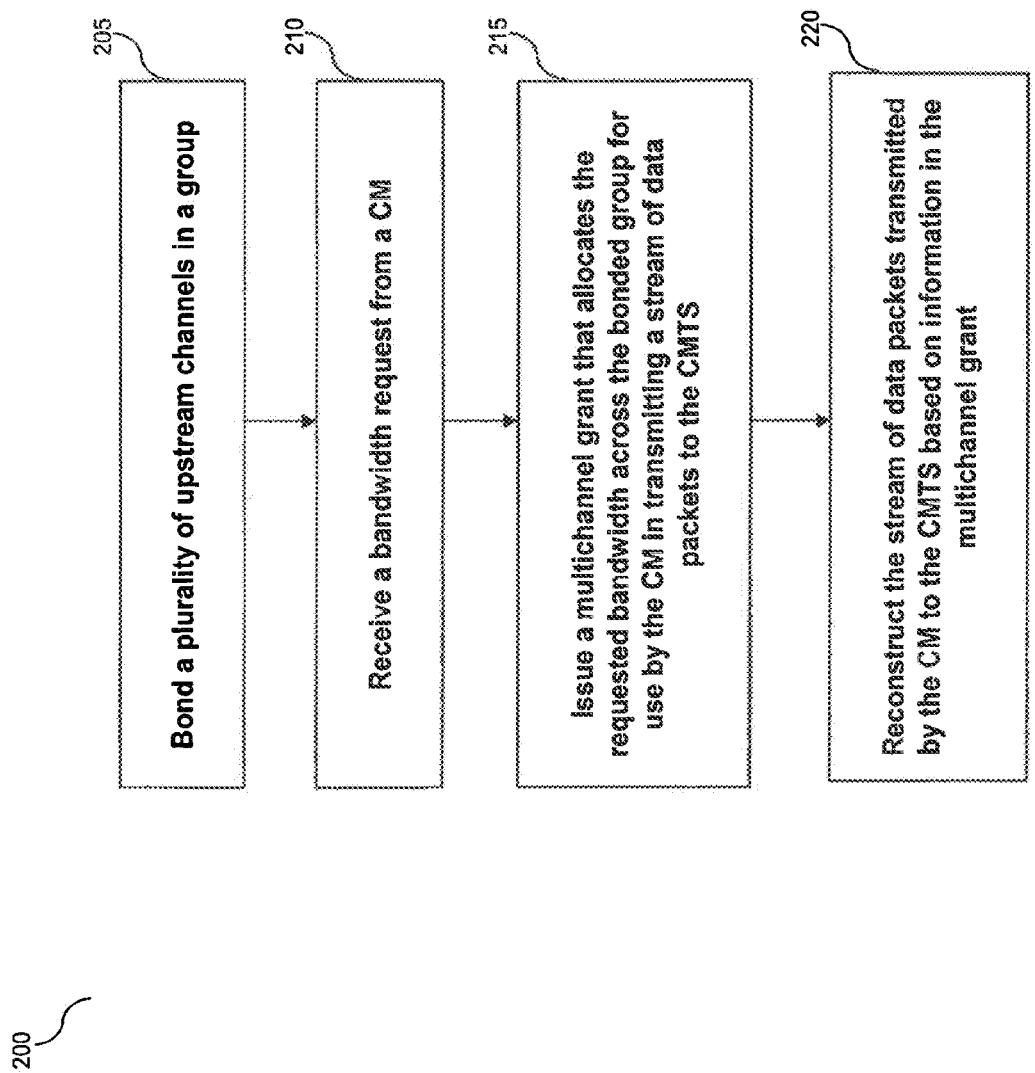
FIGS. 2-3 show process flowcharts providing example steps for high-throughput bandwidth allocation and transmission in a cable network, respectively, according to one or more embodiments of the present invention.

FIG. 2 shows a process flowchart 200 providing example high-level steps in a CMTS for high-throughput bandwidth allocation in a cable network, in accordance with an example embodiment of the present invention. In step 205, the CMTS bonds a plurality of upstream channels in a group. For example, supervisory communications node 106, shown in FIG. 1, can perform the upstream channel bonding.

In step 210, the CMTS receives a bandwidth request from a CM. For example, as shown in FIG. 1, supervisory communications node 106 can receive the bandwidth request from a remote communications node 102 through US PHY 108.

In step 215, the CMTS issues a multichannel grant that allocates the requested bandwidth across the bonded group for use by the CM in transmitting a stream of data packets to the CMTS. For example, as shown in FIG. 1, BW allocation controller 128 allocates the requested bandwidth across the bonded group for use by remote communications nodes 102 in transmitting a stream of data packets to supervisory communications node 106. In another embodiment, step 215 includes performing real-time load balancing of the plurality of upstream channels in the bonded group to allocate the requested bandwidth across the bonded group.

In step 220, the CMTS reconstructs the stream of data packets transmitted by the CM to the CMTS based on information in the multichannel grant.

Figure 3:
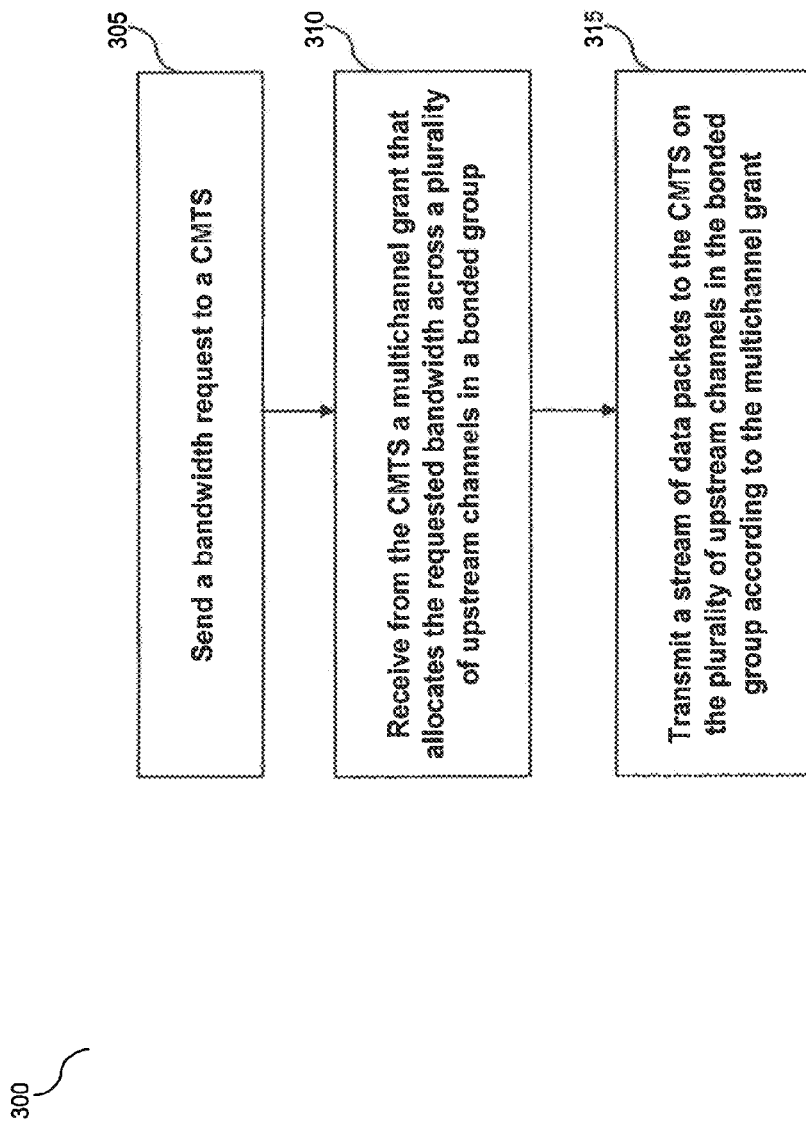

FIG. 3 shows a process flowchart 300 providing example high-level steps in a CM for high-throughput transmission in a cable network, in accordance with an embodiment of the present invention. In step 305, the CM sends a bandwidth request to a CMTS. For example, as shown in FIG. 1, a remote communications node 102 sends a bandwidth request to supervisory communications node 106 over internodal infrastructure 105.

In step 310, the CM receives from the CMTS a multichannel grant that allocates the requested bandwidth across a plurality of upstream channels in a bonded group.

In step 315, the CM transmits a stream of data packets to the CMTS on the plurality of upstream channels in the bonded group according to the multichannel grant. In another embodiment, step 315 includes dividing the stream of data packets among the plurality of upstream channels in the bonded group according to information in the multichannel grant. In yet another embodiment, step 315 further includes simultaneously transmitting on the plurality of upstream channels in the bonded group.

1.3 Terminology

As described above, in an embodiment, the upstream channel bonding technique of the present invention is implemented as an extension of conventional DOCSIS interface specifications. Thus, several new terms are introduced below to describe upstream channel bonding interface specifications, which are extensions of conventional DOCSIS interface specifications.

As used herein, the term "Bonded Information Element (BIE)" describes a bandwidth allocation on a specific channel for a specific period of time using a particular set of PHY parameters. The BIE serves the same purpose as the conventional DOCSIS information element (IE) but has a slightly different format.

As used herein, the term "Bonded Bandwidth Allocation Map (B-MAP)" describes a bandwidth allocation message for an upstream bonded channel.

As used herein, the term "Bonded Upstream Channel Descriptor (B-UCD)" describes a downstream message that specifies the channel identifiers contained in an upstream bonding group.

As used herein, the term "Multichannel Allocation (MCA)" describes a series of bandwidth allocations to a particular SID (including broadcast and multicast SIDs) across one or more upstream channels within a bonded group. The allocations within the MCA can have any mix of conventional DOCSIS time-defining interval usage codes (IUCs). An IUC is a field to link burst profiles to grants. Allocations to data regions (e.g., allocations to IUCs 5, 6, 9, 10 and 11) must be placed in the MCA in the order in which the CM should segment the data. All other time-defining allocations (e.g., allocations to IUCs 1, 2, 3 and 4) should be placed in the MCA in order of earliest relative information element start time as measured across all channels within the bonding group. BIEs of type 1, 2, 3, and 4 must be specified in integer numbers of transmit opportunities for those types (e.g., if a request region IUC=1 is specified in the BIE, and a request requires two minislots using the IUC=1 parameters, then the duration of the BIE must be a multiple of two minislots).

The term "segment" as used herein describes a bandwidth allocation, which may include the following characteristics: (1) allocated to particular SID (i.e., may be unicast, multicast, or broadcast); (2) consisting of contiguous minislots; (3) using a specific IUC; and (4) defined in an MCA.

The term "supergrant" as used herein describes the portions of an MCA that specify data regions (i.e., BIEs to IUCs 5, 6, 9, 10, or 11), taken collectively.

These and other new terms, which describe extensions of conventional DOCSIS interface specifications for implementing upstream channel bonding, are discussed in more detail in the sections that follow.

2. Traffic Segmentation 2.1 Segmentation Overview

As described above, upstream channel bonding is one way to achieve increased upstream throughput in a cable communications system. In an embodiment of the present invention, a CMTS controls the upstream channel bonding process as part of the bandwidth granting process, and decides how to segment the bandwidth based on the bandwidth requested by a CM and on the other traffic on the upstream channels.

The upstream channels within a bonded group may have very different physical layer characteristics. For example, one channel may support 160 kilosymbols per second (ksps) with Quadrature Phase Shift Key (QPSK) data regions and TDMA framing, while another may support 2.56 megasymbols per second (Msps) with 64 Quadrature Amplitude Modulation (QAM) data regions and S-CDMA framing. Centralized control allows the CMTS to perform real-time load balancing of the different upstream channels within the bonded group.

Figure 4:
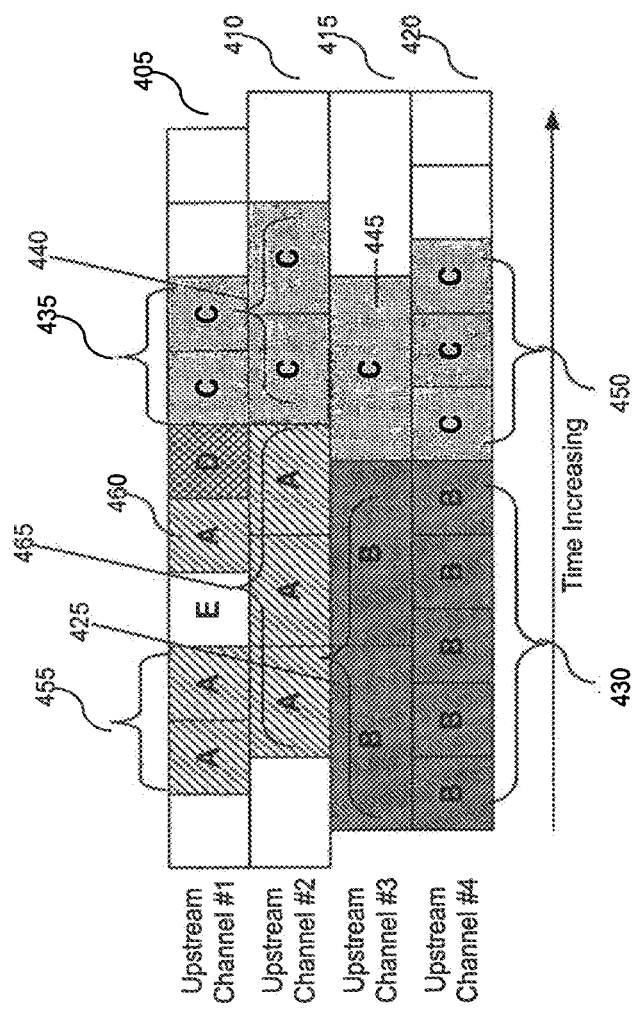
FIG. 4 illustrates an example traffic segmentation for four upstream channels with varying minislot sizes, in accordance with an embodiment of the present invention.

FIG. 4 shows an example segmentation of four upstream channels 405, 410, 415 and 420 with varying minislot sizes, in accordance with an embodiment of the present invention. Each row 405, 410, 415 and 420 represents bandwidth across a single upstream channel. The vertical lines demarcate minislot boundaries. To minimize the amount of horizontal space required for FIG. 4, this example uses much shorter packets than are typical, however, the vertical lines in this example can also represent a number of minislots rather than a single minislot.

The letters A-D within the blocks in FIG. 4 represent a SID to which the CMTS has allocated the corresponding block of bandwidth. In this example, the CMTS chooses to grant SID A's request by using bandwidth on channels 405 and 410 only. Similarly, the CMTS chooses to grant SID B's request by using bandwidth on channels 415 and 420 only. The CMTS chooses to grant SID C's request by using bandwidth spread across all four upstream channels 405, 410, 415 and 420. Blocks to SID E and SID D represent small grants to different unsolicited grant service (UGS) flows.

Each contiguous group of blocks/minislots assigned to the same SID on the same channel in FIG. 4 represents a segment. Thus, the grant to SID B consists of two segments 425 and 430, and the grant to SID C consists of four segments 435, 440, 445 and 450. Since the grant to SID A on channel 405 consists of two portions separated by the grant to SID E, the overall grant to SID A consists of three segments, segments 455 and 460 on channel 405 and segment 465 on channel 410. Each of these segments is treated like a conventional DOCSIS grant from the standpoint of physical layer overhead. Each segment will need a preamble at the beginning and guard time at the end. The physical layer properties of each segment are specified by the channel's physical parameters and the segment's IUC type.

2.2 Continuous Concatenation and Fragmentation

Having defined a general bandwidth segmentation structure, mechanisms for efficiently filling granted bandwidth segments are described below. In order to describe embodiments of the present invention for efficiently filling granted bandwidth segments, it is helpful to contrast these embodiments with conventional approaches. For example, one conventional approach for filling granted bandwidth segments is the conventional DOCSIS concatenation and fragmentation technique described below.

2.2.1 Conventional DOCSIS Concatenation and Fragmentation

With conventional DOCSIS systems, the CM decides whether it will send a single packet or a group of packets (i.e., a concatenation) upstream at a time and sends a request for the amount of bandwidth required to transmit the given traffic. The CMTS decides how it will grant the requested bandwidth and whether or not to allocate the bandwidth with a single grant or several grants spread over time. Should the CMTS decide to grant the request with a single grant, the CM transmits the traffic without any additional modifications. Should the CMTS decide to grant the request with several grants spread over time, the CM is forced to fragment the packet or concatenation of packets. The conventional DOCSIS method of fragmentation encapsulates each fragment with a fragment header and fragment cyclic redundancy code (CRC), adding a total of sixteen bytes of overhead to each fragment. With the conventional DOCSIS encapsulation technique, fragments look similar to non-fragmented DOCSIS frames, allowing for more consistent functionality of the CMTS hardware.

Conventional DOCSIS systems require a handshaking of requests and grants so as to avoid unwanted fragmentation. Such fragmentation will occur if the CMTS sends a grant that is too small for the packet or concatenation of packets that the CM is trying to send upstream. To help the CM and CMTS stay aligned in the request/grant process, conventional DOCSIS systems use a convention that the CM can have only one request outstanding. The one request outstanding rule avoids some request/grant alignment issues. In one example, the one request outstanding rule avoids the following condition: a CM sends two requests, one for 100 minislots for packet A and another for 75 minislots for packet B, and the CMTS only receives the request for packet B due to contention. In another example, the one request outstanding rule avoids the following condition: the CMTS receives both requests for packets A and B, grants the requests in two separate DOCSIS MAP messages, and the first MAP message becomes lost due to a noise burst. While the one request outstanding rule avoids some request/grant alignment issues, it does not solve all of them.

Also, there are error conditions that happen routinely in the field that cause the CMTS and CM to get out of request/grant alignment. One example error condition is a CMTS that does not set its acknowledgement time accurately in each MAP or that improperly omits a grant pending for a SID whose request was considered but not granted. With an inaccurate acknowledgement time in the MAPs, there will be cases where a CM sends a request for a packet, thinks the request was lost due to the received acknowledgment time, and re-requests for the packet. Meanwhile, the CMTS grants the original request and later grants the re-request from the CM, while thinking the re-request is actually a new request for another packet. This sequence of events results in what appears to the CM to be an unsolicited grant. The CM will try to use this "unsolicited grant" for any packet that appears next in its queue and will fragment the packet if necessary. Depending on the timing of requests and grants, the system described above could remain out of request/grant alignment (caused by the extra grant) until the traffic flow for that SID stops.

In addition to the bandwidth wasted due to the fragmentation overhead, the conventional DOCSIS encapsulation method of fragmented concatenation also causes bandwidth inefficiencies due to the rules associated with sending fragments. Whenever a CM is transmitting a fragment and there is no grant pending in the MAP, the CM sends up a request for the bandwidth required to transmit the remainder of the packet, regardless of other packets that may have arrived in its queue. The CM cannot make requests for additional bandwidth for the new packets until the CM receives sufficient grants to transmit the remaining fragment. Additionally, any extra room in the last fragment for a grant cannot be used for other packets and the CM must insert padding to fill the wasted space.

Figure 5:
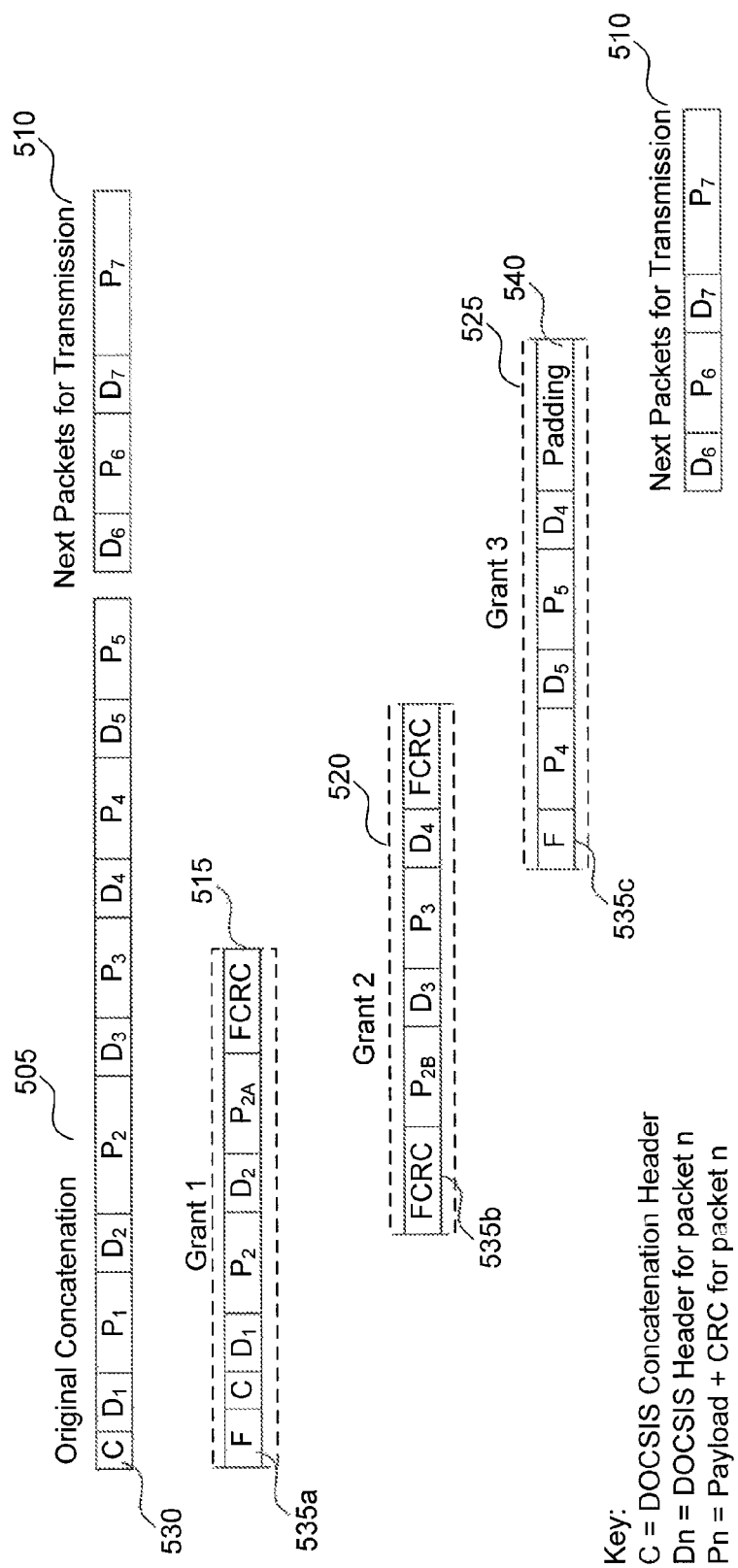
FIG. 5 illustrates an example of fragmented concatenation in accordance with a conventional DOCSIS implementation.

FIG. 5 illustrates an example of the conventional DOCSIS encapsulation method of fragmented concatenation. FIG. 5 shows an original concatenation of packets 505, for which a CM transmitted a request for bandwidth, and a queue 510 of next packets for transmission. The CM divides original concatenation 505 into three grants 515, 520 and 525 for transmission. Each transmission 515, 520 and 525 includes a corresponding fragmentation header 535a, 535b and 535c. As shown in FIG. 5, a disadvantage of the DOCSIS. encapsulation method of fragmented concatenation is that instead of filling third giant 525 with next packets for transmission from queue 510, the CM must pad out the grant with padding 540 to fill the wasted bandwidth.

Just as there are several cases where the conventional DOCSIS method of encapsulating fragments causes additional wasted bandwidth, a similar inefficiency occurs with conventional DOCSIS concatenation, which uses a concatenation header that contains the length of the entire concatenation. Thus, packets cannot later be added to a concatenation without changing the concatenation header. Should a grant arrive at the CM that is large enough to contain the concatenation plus an additional packet that arrives after transmission of the concatenation has begun, the CM cannot add the new packet to the concatenation.

For example, as shown in FIG. 5, original concatenation 505 includes a concatenation header 530 that contains the length of concatenation 505. Thus, instead of filling out third grant 525 with next packets for transmission from queue 510, the CM must pad out third grant 525 with padding 540. There are scenarios where changing the concatenation construction ad hoc would be useful, for example, when a concatenation is fragmented, when the PHY parameters and minislot size granularity result in excess unused bytes within a burst, and when the CM receives what it thinks is an unsolicited grant.

2.2.2 Continuous Concatenation and Fragmentation in Accordance with an Embodiment of the Present Invention In accordance with one or more embodiments of the present invention, a new mechanism, which allows for more efficient use of bandwidth when a request and grant do not match, is provided that has smaller overhead for fragments and allows the concatenation length to be changed after the beginning of the concatenation has been transmitted. This mechanism allows more efficient use of bandwidth when the grant size and packet boundaries do not align. One such mechanism is embodied in the concept of continuous concatenation and fragmentation (CCF). Unlike the conventional DOCSIS encapsulation approach, CCF employs a data-streaming type approach. Packets are inserted into granted bandwidth without using a concatenation header.

Figure 6:
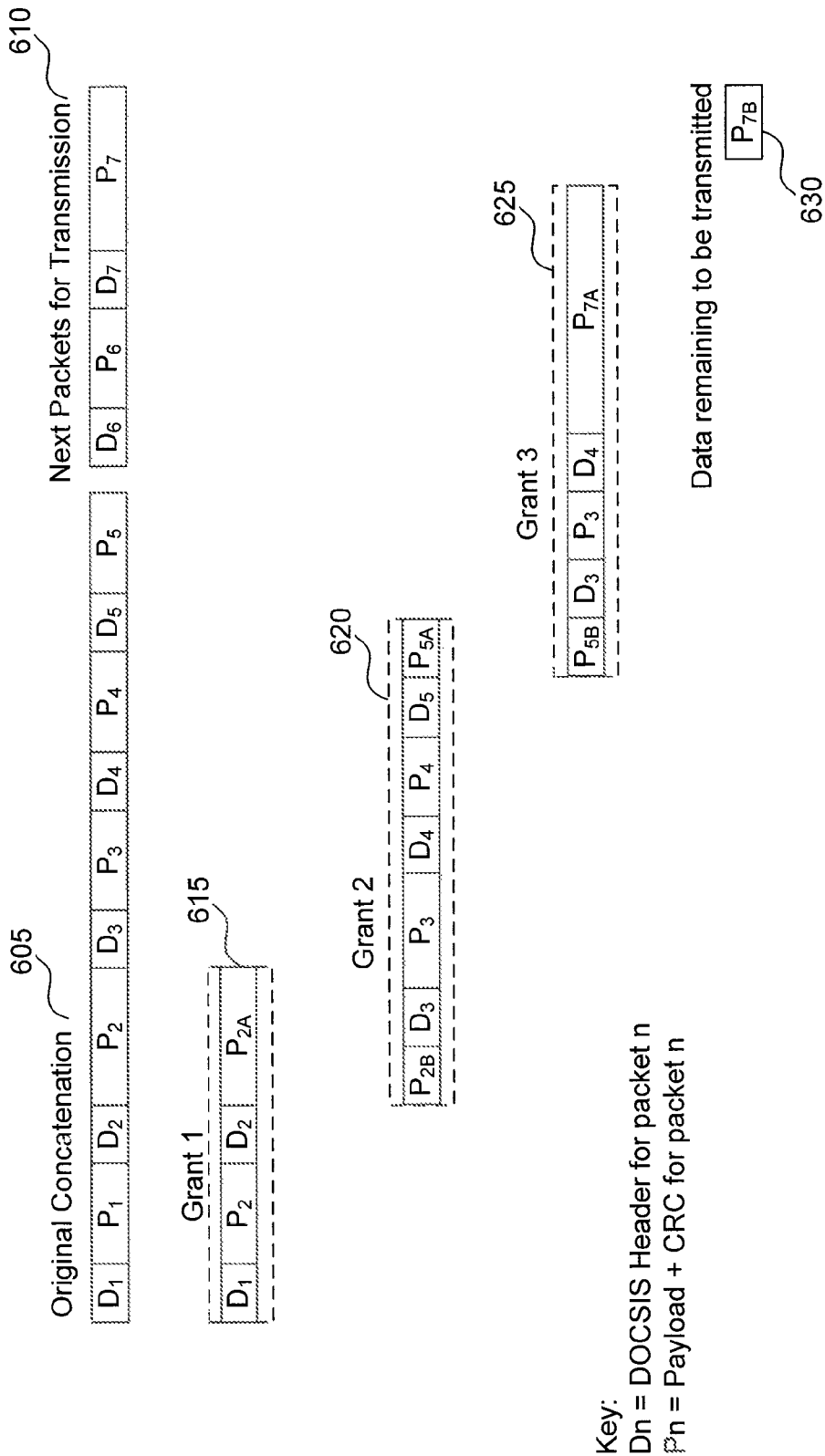
FIG. 6 illustrates an example of continuous concatenation and fragmentation, in accordance with an embodiment of the present invention.

FIG. 6 illustrates an example implementation of CCF, in accordance with an embodiment of the present invention. FIG. 6 shows an original concatenation of packets 605, for which the CM transmitted a request for bandwidth, and a queue 610 of next packets for transmission. Unlike the approach shown in FIG. 5, the CM divides original concatenation 605 into three grants 615, 620 and 625, without the use of fragmentation headers. In this case, the CM fills third grant 625 with next packets for transmission from queue 610 so that no bandwidth is wasted.

In the conventional DOCSIS approach shown in FIG. 5, bandwidth is wasted because concatenation header 530 that contains the length of concatenation 505 is used. Instead of filling third grant 525 with next packets for transmission from queue 510, the CM must pad out third grant 525 with padding 540, leaving the entire queue 510 of packets to be transmitted. In the CCF approach of FIG. 6, no bandwidth is wasted because no concatenation header is used. Instead of padding, the CM can fill third grant 625 with next packets for transmission from queue 610, leaving only packet 630 to be transmitted.

In the example CCF implementation of FIG. 6, there is no way for the CMTS MAC layer to find packet boundaries within an individual multichannel grant once an upstream burst is lost due to noise. In the conventional DOCSIS downstream, an MPEG pointer is used to point to the beginning of a DOCSIS MAC header within the MPEG frame. In the upstream direction, by definition, the leading burst MAC boundary always lines up with the beginning of a packet, concatenation, or fragmentation header. With the example CCF implementation of FIG. 6, however, there is no way for the MAC layer to find the packet boundaries within grant 625 if the data in grant 620 is lost due to burst noise. Thus, an additional mechanism is desirable to demark DOCSIS frame boundaries for CCF.

In accordance with an embodiment of the present invention, an efficient mechanism for using CCF to fill granted bandwidth is to use segment headers that aid in reassembly. In one embodiment, the segment header contains a pointer to a first DOCSIS header within the segment. This pointer is similar to the MPEG pointer used in the conventional DOCSIS downstream for identifying packet boundaries. By using a fixed overhead for every segment, the CMTS can easily calculate how much additional bandwidth it must grant whenever it chooses to divide a grant into several smaller grants.

Figure 7:
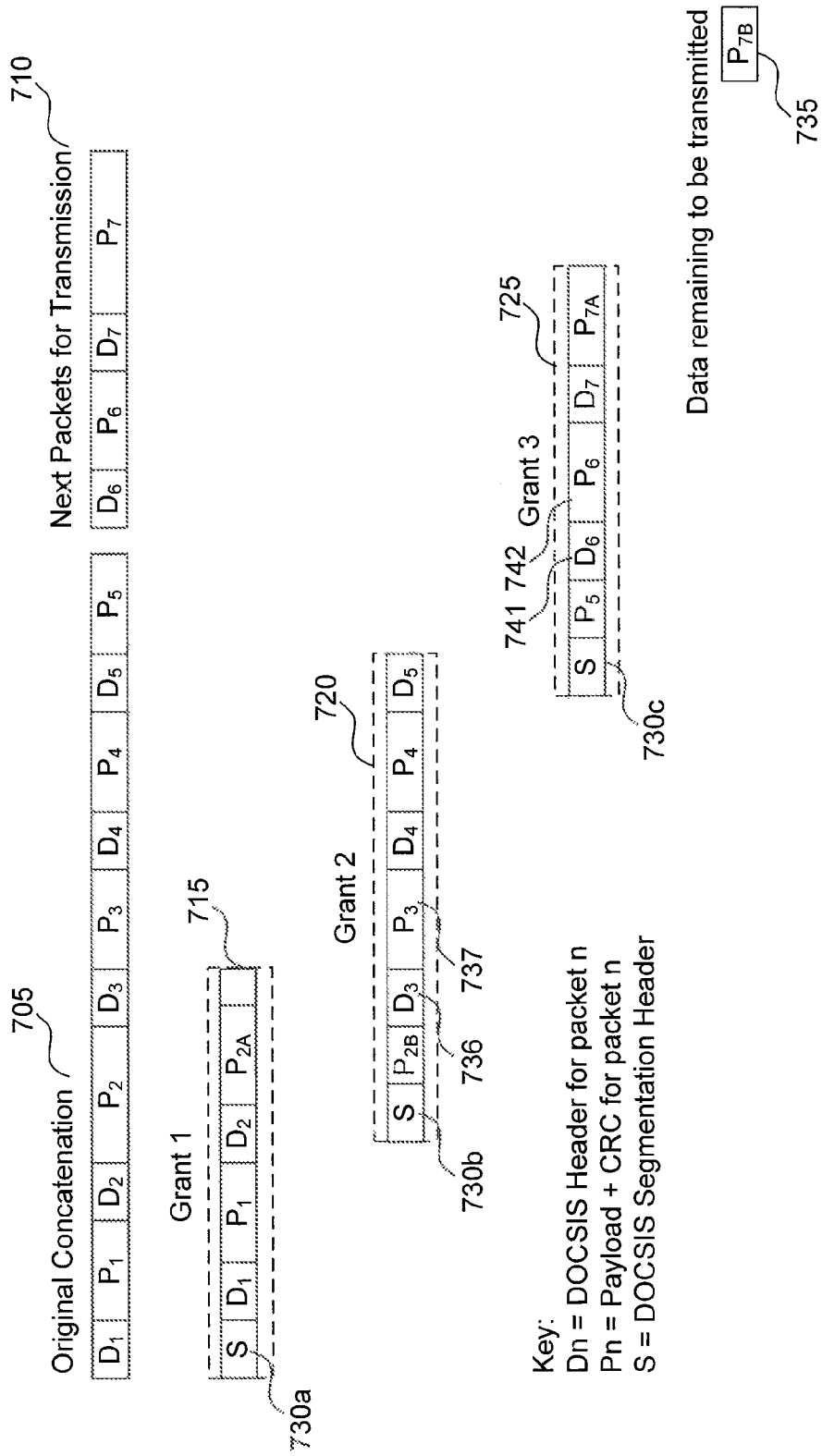
FIG. 7 illustrates an example of continuous concatenation and fragmentation using segment headers, in accordance with an embodiment of the present invention.

FIG. 7 shows an example implementation of the CCF technique using segment headers, in accordance with an embodiment of the present invention. FIG. 7 shows original concatenation of packets 705, for which the CM transmitted a request for bandwidth, and queue 710 of next packets for transmission. In this case, the CM divides original concatenation of packets 705 into three grants 715, 720 and 725 using segment headers 730a, 730b and 730c, respectively, for transmission. Segment header 730a in grant 715 points to the first byte after segment header 730a. Segment header 730b in grant 720 points to a DOCSIS header 736 of a third packet 737. Segment header 730c in grant 725 points to a DOCSIS header 741 of a sixth packet 742. Thus, if any segment is lost, the CMTS can still find the packet boundaries in the remaining segments. The CMTS MAC would use the grant size to determine how many MAC bytes to extract from each grant. Whenever the CM runs out of data to send, it will pad out the grant as it does in a conventional DOCSIS system.

An example segment header format is detailed herein in Section 7.2. In an embodiment, the segment header contains an optional piggyback field that the CM can use for requesting additional bandwidth. Example rules for using the optional piggyback field are detailed herein in Section 3.2.1.

The use of segment headers requires a relatively small overhead per segment and allows optimal use of the granted bandwidth. Without the segment headers, the CCF technique would have to prohibit packets from spanning segment boundaries, potentially wasting large portions of upstream bandwidth, or would have to accept the greatly increased bit error rate caused by the CMTS being unable to find MAC frame boundaries in the event of a lost segment.

Figure 8:
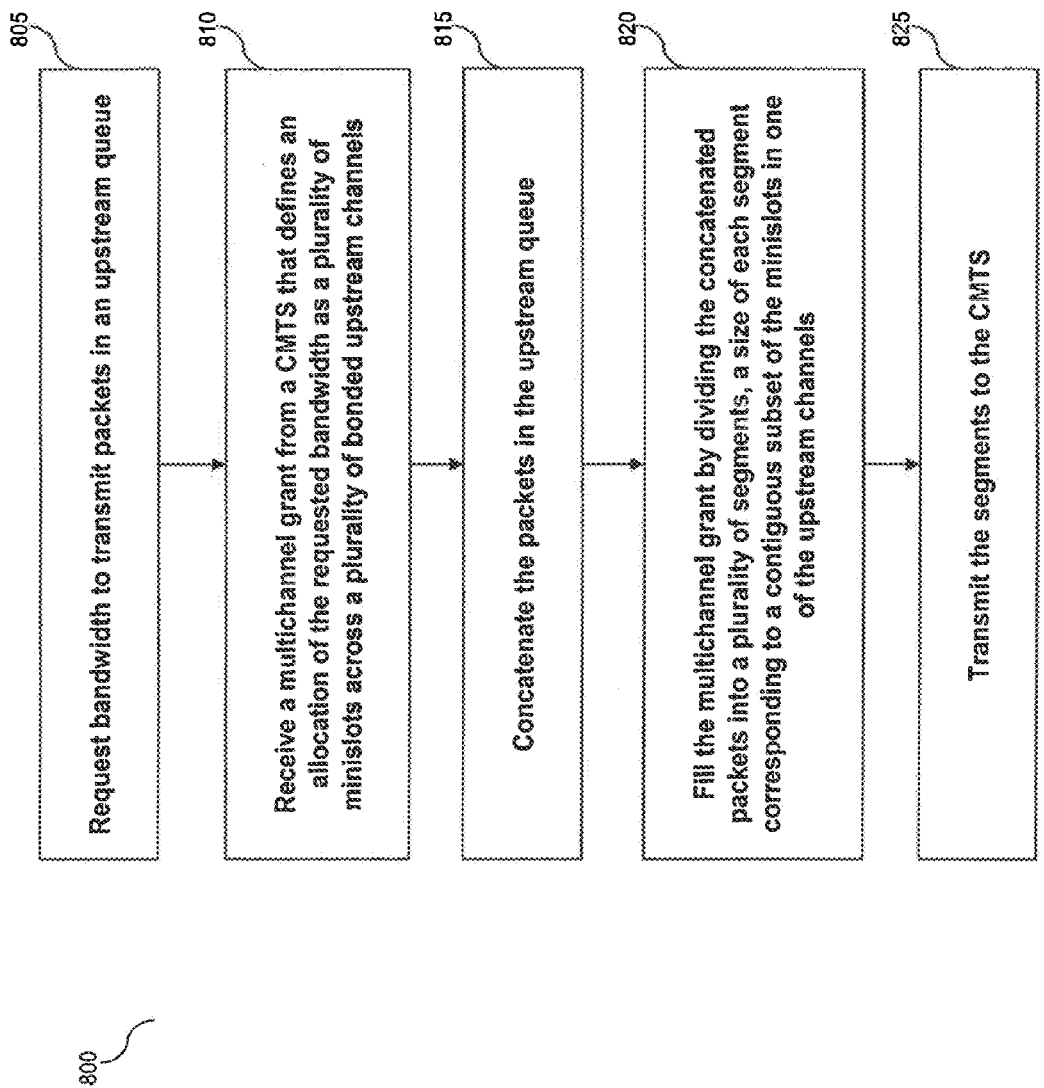
FIGS. 8-9 show process flowcharts providing example steps for continuous concatenation and traffic segmentation, in accordance with one or more embodiments of the present invention.
Figure 9:
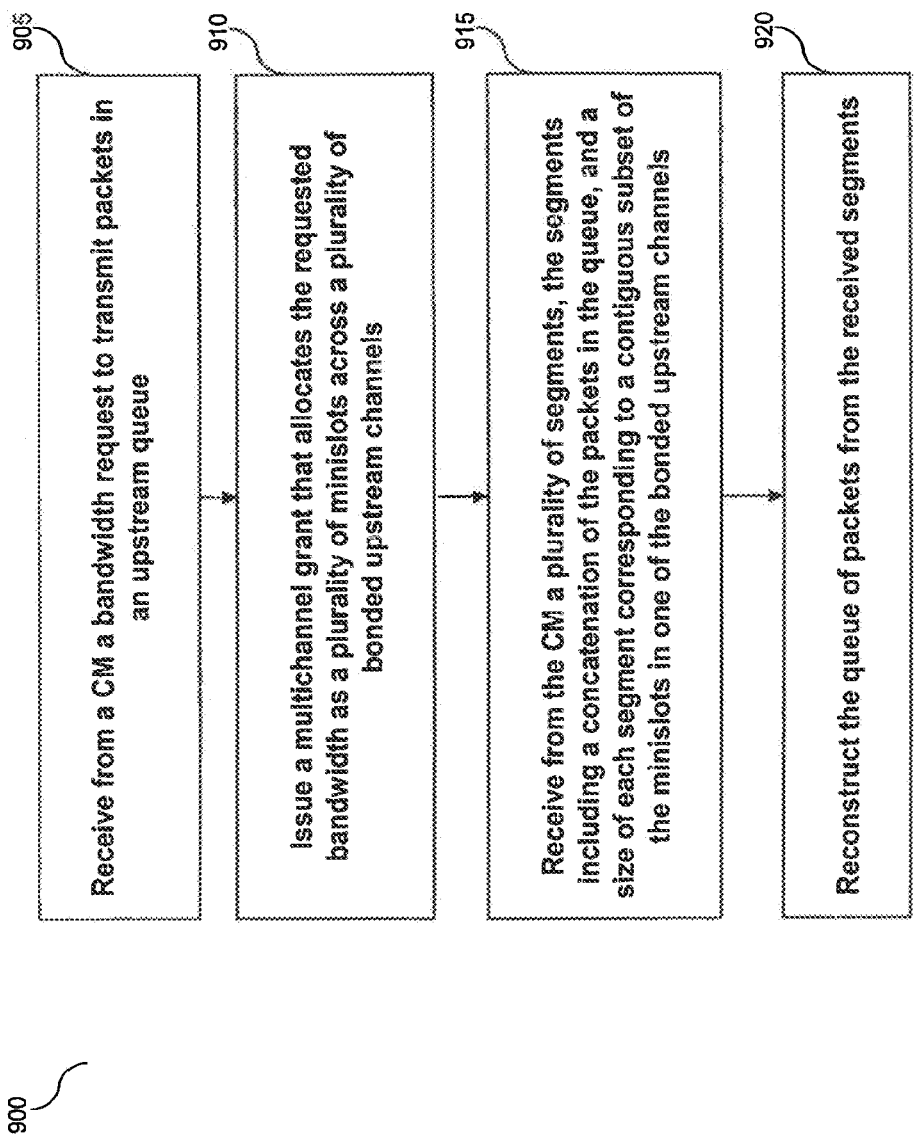
Figure 10:
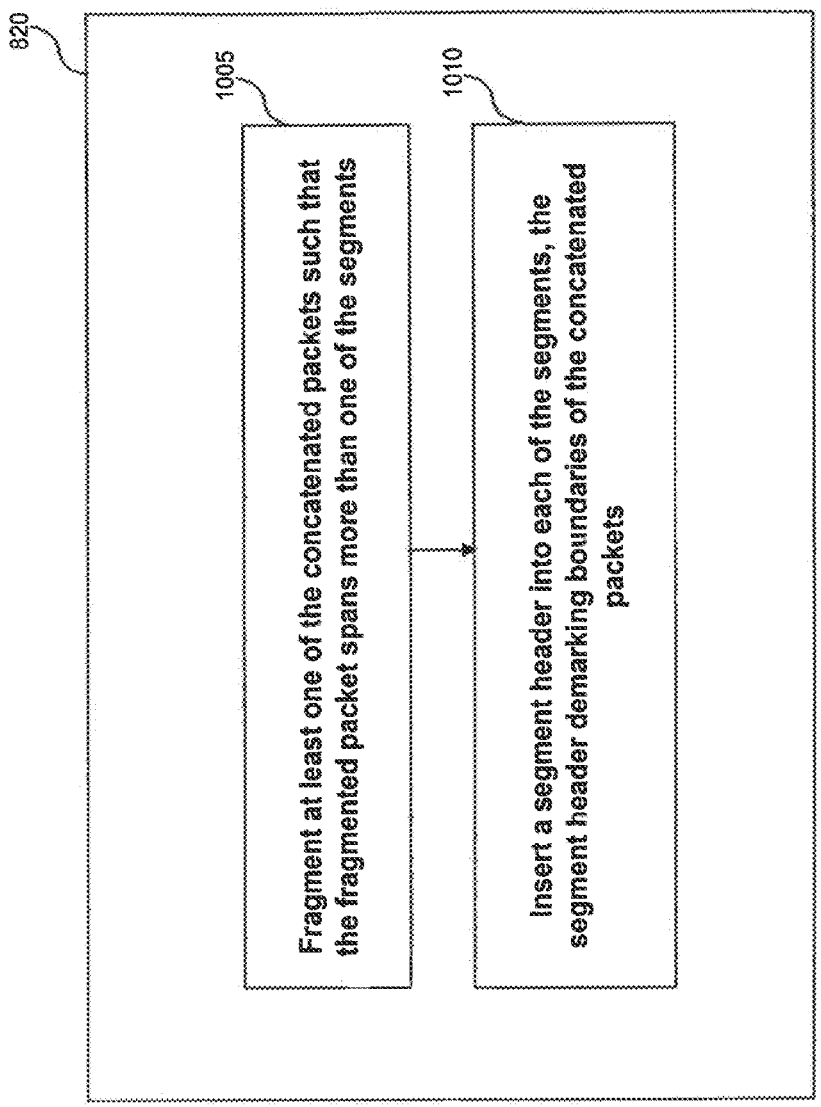
FIGS. 10-11 illustrate additional steps for implementing the processes of FIGS. 8-9 for fragmentation using segment headers, in accordance with one or more embodiments of the present invention.
Figure 11:
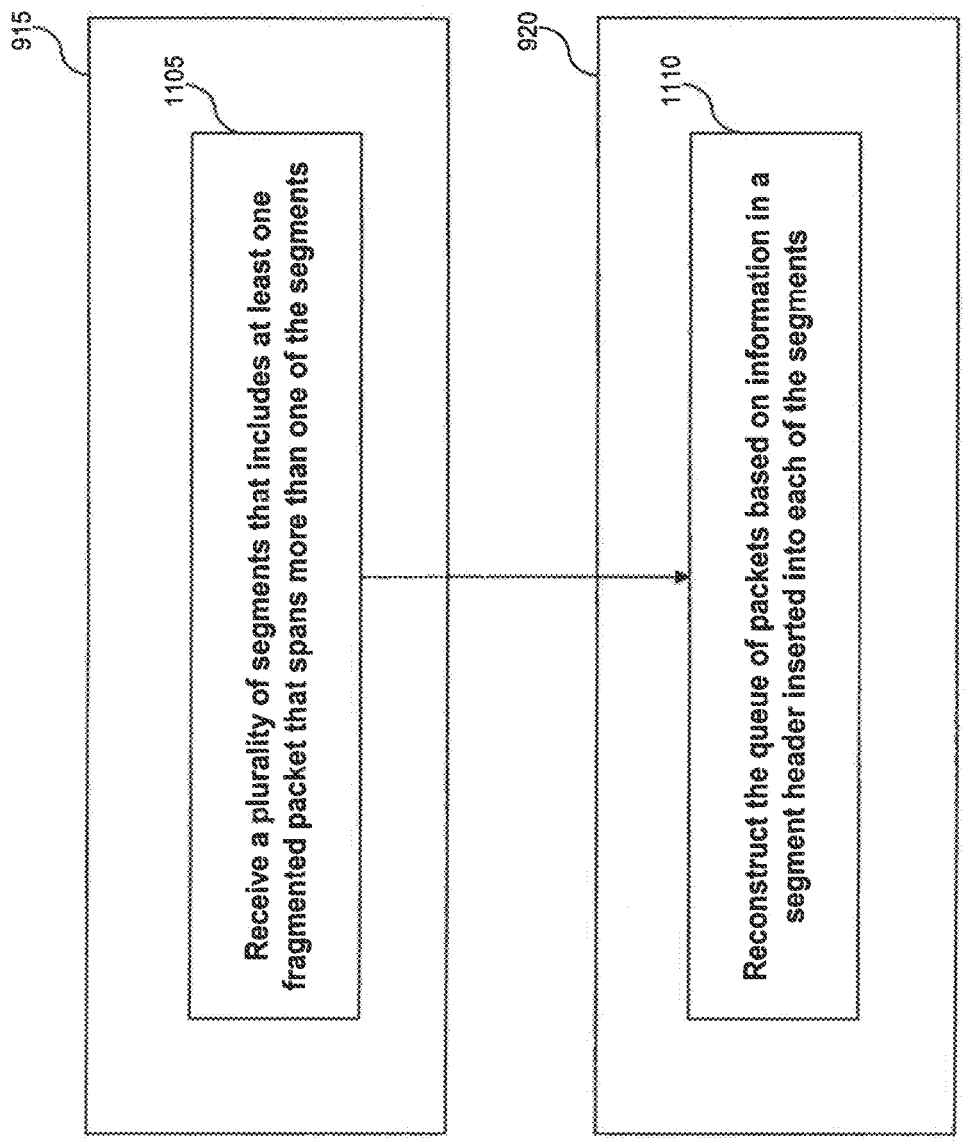

FIGS. 8-9 show process flowcharts providing example steps for continuous concatenation and traffic segmentation, in accordance with one or more embodiments of the present invention. FIGS. 10-11 illustrate additional steps for implementing the processes of FIGS. 8-9 for fragmentation using segment headers, in accordance with one or more embodiments of the present invention.

FIG. 8 shows a process flowchart 800 providing example steps in a CM for continuous concatenation and traffic segmentation. In step 805, the CM requests bandwidth to transmit packets in an upstream queue. In step 810, the CM receives a multichannel grant from a CMTS. The multichannel grant defines an allocation of the requested bandwidth as a plurality of minislots across a plurality of bonded upstream channels.

In step 815, the CM concatenates the packets in the queue. In another embodiment, when the allocated bandwidth exceeds the requested bandwidth, the CM continuously concatenates the packets in the queue such that packets already in the queue are concatenated with newly arriving packets until the multichannel grant is filled. For example, FIG. 7 shows how the CM concatenates packets from original concatenation 705 with next packets for transmission from queue 710 to fill grant 725. In yet another embodiment, the CM pads out the multichannel grant with a fixed byte pattern (e.g., "FF" for upstream channel bonding") when the queue is empty.

In step 820, the CM fills the multichannel grant by dividing the concatenated packets into a plurality of segments. A size of each segment corresponds to a contiguous subset of the minislots in one of the upstream channels. The CM fills the multichannel grant with the concatenated packets without using DOCSIS concatenation headers. In step 825, the CM transmits the segments to the CMTS.

FIG. 10 shows additional steps that may be used to implement step 820 of FIG. 8 using fragmentation with segment headers. In step 1005, the CM fragments at least one of the concatenated packets such that the fragmented packet spans more than one of the segments. In step 1010, the CM inserts a segment header into each of the segments that assists in packet demarcation within the segment. For example, as shown in FIG. 7, the CM inserts segment headers 730a, 730b and 730c into grants 715, 720 and 725, respectively, for transmission. In another embodiment, the segment header includes a pointer to a location of a first DOCSIS header, if any, within that segment. For example, as shown in FIG. 7, segment header 730b points to first DOCSIS header 736 of segment 720. When there is no first DOCSIS header for the segment, such as for the middle segment(s) when a large packet spans more than two segments, a pointer valid bit in the segment header is cleared. In yet another embodiment, the segment header includes a fixed amount of overhead.

FIG. 9 shows a process flowchart 900 providing example steps in a CMTS for continuous concatenation and traffic segmentation. In step 905, the CMTS receives from a CM a bandwidth request to transmit packets in an upstream queue. In step 910, the CMTS issues a multichannel grant that allocates the requested bandwidth as a plurality of minislots across a plurality of bonded upstream channels. In step 915, the CMTS receives from the CM a plurality of segments. The segments include a concatenation of the packets in the queue, and a size of each segment corresponds to a contiguous subset of the minislots in one of the bonded upstream channels. In step 920, the CMTS reconstructs the queue of packets from the received segments.

FIG. 11 shows additional steps for implementing steps 915 and 920 of FIG. 9 using fragmentation with segment headers. In step 1105, the CMTS receives a plurality of segments that includes at least one fragmented packet that spans more than one of the segments. In step 1110, the CMTS reconstructs the queue of packets based on information in a segment header inserted into each of the segments. In an embodiment, the CMTS reconstructs the queue of packets based on a pointer in each segment header to a first DOCSIS header within a corresponding segment.

2.2.3 Segmentation without Segment Headers

Some service flows (i.e., SIDs) have unique properties in which the CMTS has advanced knowledge of transmission sizes without the CM making a request. In this case, the use of segmentation headers with CCF can be enabled and disabled on a SID basis using the conventional DOCSIS Request/Transmission Policy, in accordance with an embodiment of the present invention. The value of the Request/Transmission Policy will specify, among other parameters, whether segments headers are enabled or disabled for a particular SID. For SIDs with segmentation headers disabled, the CM can still use the concatenation portion of CCF, but is prohibited from using the fragmentation portion. Thus, all segments for SIDs with segment headers disabled contain only complete packets or multiple complete packets. Should a segment be lost, the CMTS MAC will know that the next segment boundary aligns with a packet boundary and can continue processing the received packets.

When a SID is provisioned for segment-header-off operation, the conventional DOCSIS baseline privacy interface extended header (BPI EHDR) or the conventional DOCSIS request extended header (EHDR) should be used for piggyback requesting. The EHDR field provides extensions to the MAC frame format and is used in conventional DOCSIS systems to implement data link security, as well as frame fragmentation, but can be extended to support additional functions, such as piggyback requesting when a SID is provisioned for segment-header-off operation. The request fields in the EHDRs are not needed when segment headers are enabled because the segment header format allows for a piggyback request opportunity.

Note that the segment-header-off operation is intended for UGS flows and other types of flows for which the CMTS knows the amount of bandwidth needed to service the flow. As will be appreciated by persons skilled in the art, other uses of the segment-header-off operation (e.g., best effort) may be defined that necessitate enhancements to the Request/Transmission Policy and CM operational rules (thus, potentially impacting hardware design) in order to handle cases where the granted segment is smaller than the required amount.

3. Requesting Bandwidth

In order to describe embodiments of the present invention for requesting bandwidth with upstream channel bonding, it is helpful to contrast these embodiments with conventional approaches. For example, the conventional DOCSIS request/grant mechanism allows the CM to request for either a single packet or a concatenation of packets for each of the upstream SIDs supported by the CM. Once the CM transmits a bandwidth request for a given SID, it must wait until it receives from the CMTS a grant (or grants) allocating that bandwidth before requesting additional bandwidth for the same SID. These restrictions (i.e., one request outstanding and one packet or concatenation at a time) attempt to prevent the CM and CMTS from getting out of request/grant alignment under most circumstances. With an upstream throughput potential of approximately 100 Mbps, it is desirable to modify the conventional DOCSIS request/grant mechanisms to allow the CM to request for a larger amount of bandwidth within a given timeframe.

One such modification for systems with upstream channel bonding is to allow a CM to request for all the packets it has ready for transmission given the QoS (Quality of Service) parameters associated with a particular SID. This approach is similar to the conventional DOCSIS approach of creating the maximum allowable concatenation, except that the limit would be much higher for some service flows than for conventional flows. Because, in general, the CM will be requesting much more bandwidth, it is desirable for the CM to request more bandwidth in a single request.

A conventional DOCSIS system allows a CM to request for packets it has ready for transmission using a burdened requesting approach. With burdened requesting, the CM requests in "burdened" minislots. Burdened requests include an estimation of the PHY overhead needed to transport a packet. Burdened requesting is intended to ease calculations at the CMTS so that the CMTS can simply grant the requested bandwidth without having to do any overhead calculations. However, with the evolution of CMs being capable of transmitting simultaneously on multiple upstream channels having various PHY parameters, and CMTSs being capable of granting bandwidth to a given CM over multiple upstream channels, burdened requesting causes additional work for the CMTS. If burdened requesting is used for bonded upstream channel systems, the CMTS will have to perform reverse calculations to take out the PHY overhead in order to estimate the original payload size. Then the CMTS will have to divide the payload over the multiple upstream channels and calculate the PHY overhead associated with each partial grant.

In accordance with an embodiment of the present invention, a bonded upstream channel system allows a CM to request for packets it has ready for transmission using an unburdened requesting approach. With unburdened requesting, the CM requests bandwidth in "unburdened" bytes because the CM does not know over which channels the CMTS will choose to grant the requested bandwidth.

In an embodiment, the request field is expanded to include a length field of two bytes, with a granularity of four bytes, to allow the CM to request up to 256 kilobytes in a single request. Should the CM need to request more than 256 kilobytes for a particular SID at a given time, it will have to wait until the first request is acknowledged prior to requesting the additional bandwidth. The 256 kilobyte request size maximum allows for MAP periods of up to 20 ms in duration and allows a single SID to transmit up to 100 Mbps.

3.1 Request Mechanisms

As described above, one mechanism for enabling larger upstream bandwidth requests is to allow a CM to request for all the upstream bandwidth it currently needs based on the packets it has ready for upstream transmission. This request mechanism allows the CM to send a bandwidth request to the CMTS based on queue depth, which includes all upstream packets and their known MAC headers. In accordance with an embodiment of the present invention, queue-depth based requesting must be used in conjunction with the CCF technique described above because the CMTS will not know individual packet boundaries and cannot grant fractions of a request without inadvertently crossing packet boundaries.

When requesting for queue depth, the CM takes into account all packets it wants to transmit and the amount of bandwidth required, which includes all known MAC-layer overhead. In one example embodiment, step 305 of FIG. 3 can be implemented with queue-depth based requesting, such that the CM sends a bandwidth request to the CMTS based on a depth of an upstream queue of the data packets. In another example embodiment, step 305 of FIG. 3 can be implemented with queue-depth based requesting, such that the bandwidth request includes bandwidth for MAC-layer overhead associated with the data packets in the upstream queue.

In accordance with an embodiment of the present invention, when requesting for queue depth, the CM does not include any estimation for segment header overhead because the CM does not know how many segments the CMTS may use to fragment the grant. Instead, the CMTS adds the necessary additional bandwidth to compensate for the segment headers when it sends the grant to the CM. In one example embodiment, the CM does not request for segment header overhead when fragmentation with segment headers is used in process 800, shown in FIG. 8. In this case, in step 805, the CM requests an unburdened amount of bandwidth to transmit packets in the upstream queue and, in step 810, the CM receives a multichannel grant from the CMTS that includes an additional amount of bandwidth to accommodate a fixed amount of overhead associated with each of the segment headers. Similarly, in another example embodiment, the CMTS compensates for segment header overhead when fragmentation with segment headers is used in process 900, shown in FIG. 9. In this case, in step 910, the CMTS issues a multichannel grant that includes additional bandwidth to accommodate a fixed amount of overhead associated with each of the segment headers.

In accordance with an embodiment of the present invention, the CM sends a request for bandwidth for a given SID on any upstream channel available to the CM. In an example embodiment, the CM sends a bandwidth request to the CMTS on an available upstream channel in step 305 of FIG. 3.

In accordance with an embodiment of the present invention, the CMTS sends a bandwidth grant in a supergrant structure, which is a specific grouping of data segments (i.e., IUC types 5, 6, 9, 10, and 11) in the multichannel allocation structure, which is described in more detail below in Section 7.4.2. The CMTS can choose to grant bandwidth on the upstream channel upon which it received the request, on any other upstream channel associated with the CM, or on any combination of channels associated with the CM.

Should the CMTS decide not to grant all of the bandwidth requested, the CMTS may send a conventional DOCSIS grant pending, which is a zero length grant that indicates that a request has been received and is pending, in the MAP messages until all received requests for the SID are fulfilled. Alternatively, the CMTS may choose not to send grant pendings and allow the CM to re-request for the remainder of the bandwidth needed. Note that the latter mode can add significant latency over operation using the multi-grant mode.

In accordance with an embodiment of the present invention, when the CM makes a bandwidth request, it must store the minislot count and channel on which it made the request. The CM uses the acknowledgment time for the channel on which it made the request to determine whether or not to re-request. In an embodiment, in step 305 of FIG. 3, the CM re-sends the bandwidth request to the CMTS based on an acknowledgement time associated with an upstream channel on which the cable modem sent the initial bandwidth request.

In keeping with the conventional rule of one request outstanding at a time per SID, the CM cannot request additional bandwidth until it receives an acknowledgement that the CMTS has received the bandwidth request. The acknowledgement may be in the form of a grant or a grant pending. Once the CM receives an acknowledgement, it may request for additional bandwidth, even if the CMTS has not fulfilled the previous request. For example, assume a CM requests 16 kilobytes in an initial request, and a CMTS decides to grant the CM's request with two supergrants of 8 kilobytes each, plus segmentation overhead, the two supergrants being spaced out in time and appearing in separate MAPs. Once the CM receives the first supergrant, the initial request has been acknowledged and the CM may now request for any new packets that have arrived since the CM made the initial request.

In an embodiment, process 300, shown in FIG. 3, further includes the step of the CM sending an additional bandwidth request to the CMTS upon receiving an acknowledgement that the CMTS received a previous bandwidth request. In another embodiment, the CM sends the additional bandwidth request to the CMTS upon receiving a grant or a grant pending from the CMTS.

Because the CMTS may use multiple supergrants to grant the bandwidth from a single request, situations may arise where the CM and CMTS get temporarily out of alignment as requests are lost due to upstream burst errors and collisions, and MAPs are lost due to downstream errors. In accordance with an embodiment of the present invention, the CM must use the acknowledgment time of a request to determine if the CMTS should have received the request before deciding to re-request. Whenever the CM receives a grant pending in the MAPs, the CM can request for only newly-arrived packets using piggyback opportunities, and cannot send any re-requests. Once the CM receives MAPs with no grant pendings for a given SID, the CM can re-request using piggyback opportunities or contention opportunities for any untransmitted packets whose request time is earlier than the acknowledgment time in the current MAP. Note that requests whose request time is later than the acknowledgment may still be in-transit or awaiting processing by the CMTS.

3.2 Piggyback Requesting

Piggyback requesting refers to the use of bandwidth in a unicast data allocation for requesting additional bandwidth. The request, in effect, "piggybacks" on top of a data transmission. In an embodiment of the present invention, rules for when a CM can piggyback a request for a given SID vary slightly based on whether or not segment headers are being used with CCF. Segment header use is provisioned on a per-SID basis. Example rules for piggyback requesting with segment headers on and with segment headers off are presented below.

3.2.1 Example Rules for Piggyback Requesting with Segment Headers on

When segment headers are enabled for a SID, the CM can use only piggyback opportunities in the segment header. Piggyback requesting is performed on a per-SID basis such that the CM can only piggyback a request for bandwidth required for the same SID for which it is transmitting data. The CM can piggyback a request once per supergrant, which is a specific grouping of segments in the multichannel allocation structure defined below in Section 7.4.2.

When the CM receives a supergrant in a MAP with a grant pending for one of the CM's SIDS, the CM can piggyback a request for packets for which it has not previously sent a request but cannot re-request for previously requested bandwidth.

When the CM receives a supergrant in a MAP without a grant pending for that SID, the CM can re-request for previously requested bandwidth, when the request time is earlier than the acknowledgment time in the MAP. The CM may also include in this request the bandwidth for any newly arrived packets.

Figure 12:
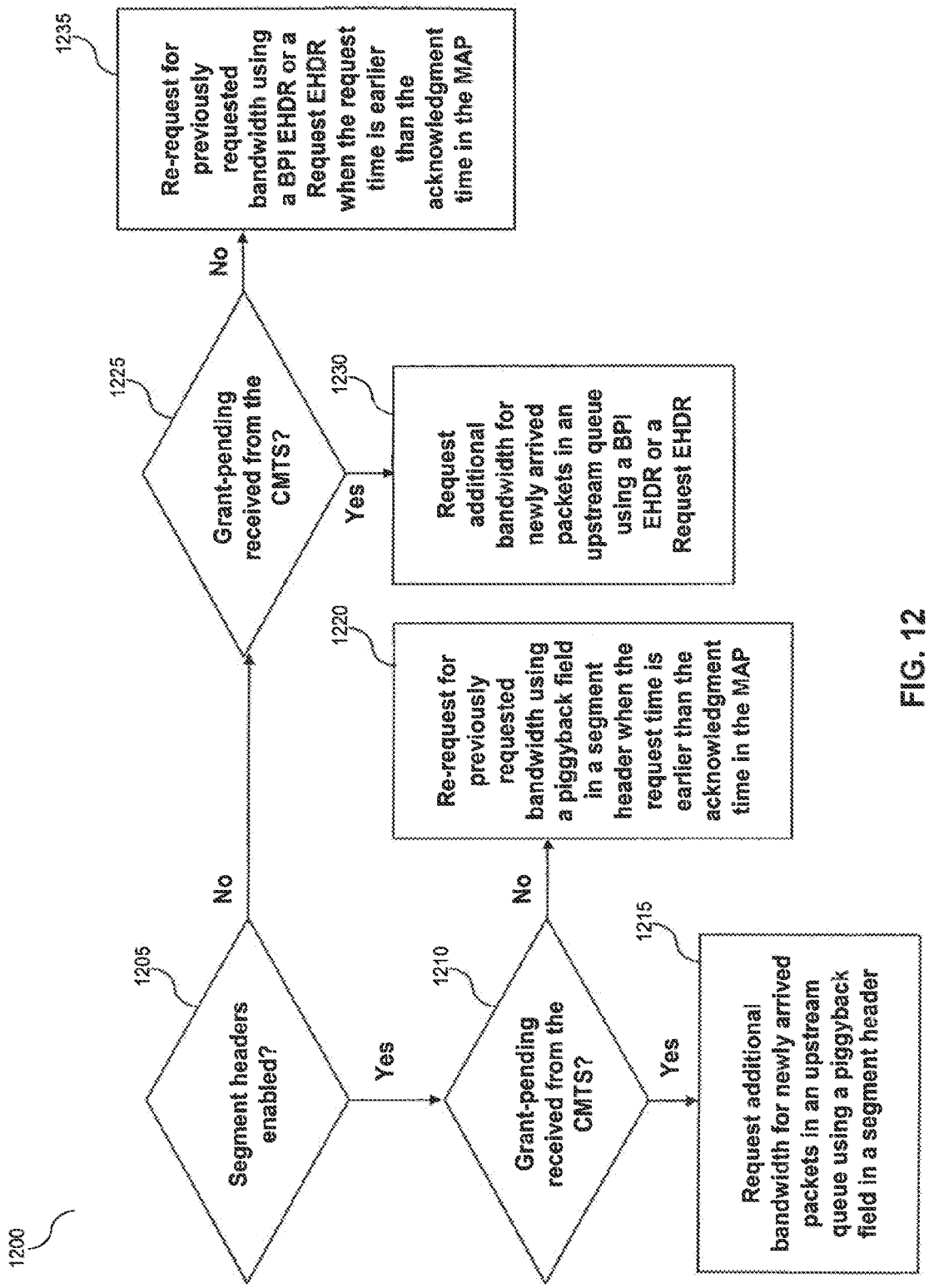
FIG. 12 shows a process flowchart providing example steps for piggyback requesting with segment headers, in accordance with an embodiment of the present invention.

FIG. 12 shows a process flowchart 1200 providing example steps in a CM for piggyback requesting with segment headers, in accordance with an embodiment of the present invention. If, in step 1205, segment headers are enabled, then process 1200 proceeds to step 1210. If a grant pending was received from the CMTS, then, in step 1215, the CM requests additional bandwidth only for newly arrived packets in an upstream queue using a piggyback field in a segment header. If a grant pending was not received from the CMTS, then, in step 1220, the CM re-requests for previously requested bandwidth using the piggyback field in the segment header if the request time is earlier than the acknowledgment time in the MAP. In another embodiment, in step 1220, the CM also requests bandwidth for any newly arrived packets in the upstream queue using the piggyback field in the segment header.

3.2.2 Example Rules for Piggyback Requesting with Segment Headers Off

When segment headers are disabled for a SID, the CM can use BPI EHDRs or Request EHDRs to send piggyback requests. Cross-SID piggybacking is not allowed. The CM must assume the use of a BPI EHDR or Request EHDR when it sends a request for the original data on which it wants to send a piggyback request. The CM can piggyback a request once per supergrant, which is a specific grouping of segments in the multichannel allocation structure defined below in Section 7.4.2.

When the CM receives a supergrant in a MAP with a grant pending for one of the CM's SIDS, the CM can piggyback a request for packets for which it has not previously sent a request but cannot re-request for previously requested bandwidth.

When the CM receives a supergrant in a MAP without a grant pending for that SID, the CM can re-request for previously requested bandwidth, when the request time is earlier than the acknowledgment time in the MAP. The CM may also include in this request the bandwidth for any newly arrived packets.

Referring again to process 1200 of FIG. 12, if segment headers are not enabled in step 1205, then process 1200 proceeds to step 1225. If a grant pending was received from the CMTS, then, in step 1230, the CM requests additional bandwidth for newly arrived packets in an upstream queue using a BPI EHDR or a Request EHDR. If a grant pending was not received from the CMTS, then, in step 1235, the CM re-requests for previously requested bandwidth using the BPI EHDR or Request EHDR when the request time is earlier than the acknowledgment time in the MAP. In another embodiment, in step 1235, the CM also requests bandwidth for any newly arrived packets using the BPI EHDR or Request EHDR.

3.3 Contention Requesting

In accordance with an embodiment of the present invention, contention requesting is enabled for bonded upstream channel systems. Contention requesting on bonded channels is similar to contention requesting on conventional DOCSIS unbonded channels. Each of the upstream channels in the bonding group is assigned a number within the group. The CM counts request opportunities in time-order across the channels. When the start times of request opportunities on two or more upstream channels align, it is up to the CM's discretion to pick the ordering of those opportunities as long as all opportunities are counted against the CM's randomly selected backoff value, which defines how many request opportunities the CM must let pass before making its request.

In accordance with an embodiment of the present invention, the CMTS must allocate request opportunities in multiples of the number of minislots required to transmit a request on a given channel, because counting request opportunities across channels is more difficult for a CM than counting them across a single upstream channel. For example, if a channel requires two minislots per request, then the CMTS must allocate request regions in multiples of two minislots (e.g., a request region of five minislots would not be permitted on this channel). Note, that in conventional DOCSIS systems, the CMTS is not prohibited from allocating improperly sized request regions.

Figure 13:
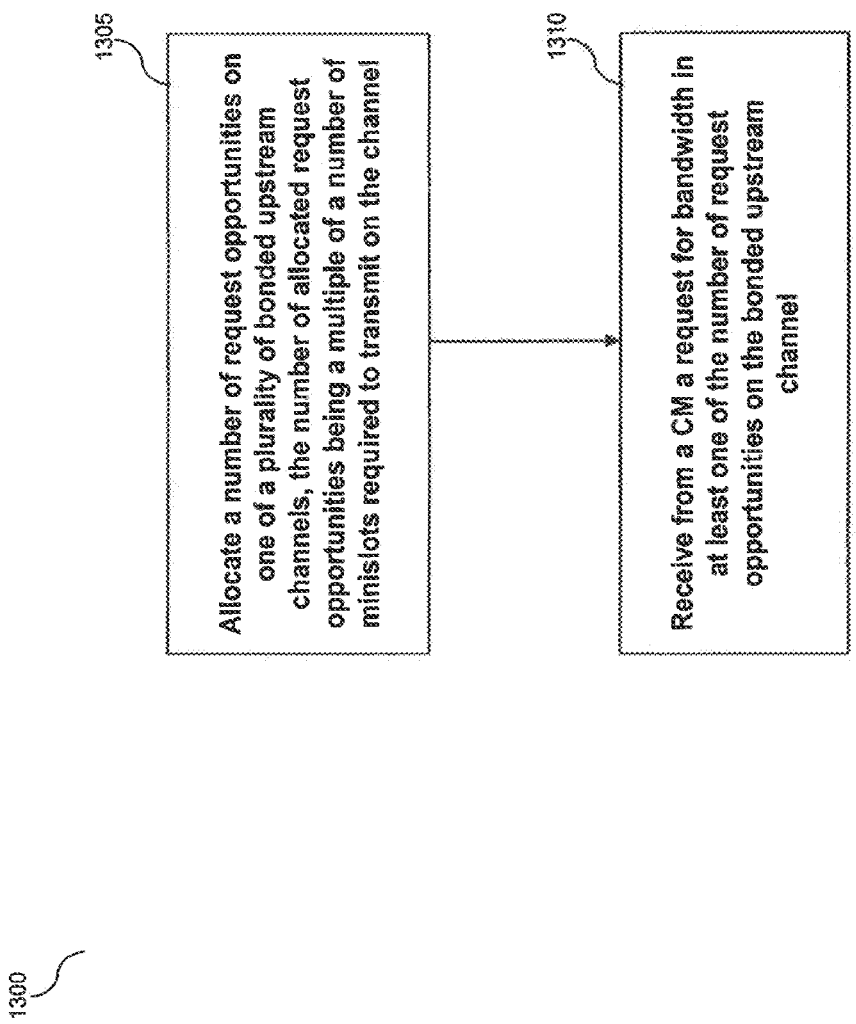
FIG. 13 shows a process flowchart providing example steps for contention requesting with bonded upstream channels, in accordance with an embodiment of the present invention.

FIG. 13 shows a process flowchart 1300 providing example steps for contention requesting with bonded upstream channels, in accordance with an embodiment of the present invention. In step 1305, a CMTS allocates a number of request opportunities on one of a plurality of bonded upstream channels, the number of allocated request opportunities being a multiple of a number of minislots required to transmit on the channel. In step 1310, the CMTS receives from a CM a request for bandwidth in at least one of the request opportunities on the bonded upstream channel.

4. Granting Bandwidth

In accordance with an embodiment of the present invention, a CMTS scheduler allocates bandwidth on individual channels based on the available bandwidth on all of the upstream channels in a bonding group. Requests made on any individual channel can be allocated bandwidth on any combination of upstream channels. In this manner, the CMTS can perform real-time load balancing of the upstream channels. Similarly, the CMTS can consider the PHY parameters on each of the upstream channels and the requested number of bytes to determine optimal allocations across channels.

One approach for sending grants in a bonded upstream channel system uses the conventional DOCSIS MAP structure and intermixes grants to CMs not implementing upstream channel bonding and CMs implementing upstream channel bonding, without the need for a newly defined MAP message. With this scheme, a CM implementing upstream channel bonding receives MAP messages for each of its upstream channels, parses the MAPs to determine groupings of grants to each SID, and determines, based on a time-ordering, which order to use for filling the grants for each SID. One issue with this approach is that the CM would need to keep track of the pre-ranged time (i.e., the time extracted from the timestamps and upstream channel descriptor (UCD) snapshots without any offsets due to ranging adjustments) for each upstream channel in order to make sure it uses the same time-ordering as the CMTS. The CM would need to look at this time-ordering before determining an order in which to fill the grants.

Another issue with this approach is that the MAP messages for each upstream channel are independent messages. The CM can determine if it lost a MAP for one of the upstream channels by looking at the allocation start time of the next MAP message for that channel. However, the CM cannot determine how many grants (and the size of those grants) were assigned to its SIDs in the missing MAP. In this case, the CM will not know how to segment data into the grants in the exact order in which the CMTS will reassemble them.

In another approach, the CM uses a segment header that includes a sequence number to explicitly tell the CMTS how it has ordered the segments. One issue with this approach is such a header would increase the per-segment overhead.

In yet another approach, the CMTS sends grants in a multichannel allocation (MCA) structure, which consists of individual grants on upstream channels defined in the MAP in the order in which the CM is to fill the grants. This approach minimizes the real-time calculations required by the CM, and avoids possible ambiguities. These new MAP messages use a message type that is ignored by the CMs not implementing upstream channel bonding. The CMTS will send conventional DOCISIS MAPs for each upstream channel, as well. The conventional DOCSIS MAPs will assign bandwidth to a reserved SID for allocations to the CMs implementing upstream channel bonding. The MAPs used for bonded channels are called bonded MAPs (B-MAPs) and are described in more detail below in Section 7.4.2.

In accordance with an embodiment of the present invention, in order to simplify the CM, the following restrictions are placed on the segmenting of grants across multiple channels:

(1) The CMTS must allocate no more than thirty-one segments within a single MCA (of the thirty-one segments, at most eight may be of IUC types 5, 6, 9, 10 or 11). Thus, a supergrant (i.e., the portion of a MCA using IUC types 5, 6, 9, 10 or 11) is limited to at most eight segments. A segment is a contiguous bandwidth allocation on a single channel to a single SID (unicast, multicast, or broadcast) with a single IUC.

(2) Supergrants to the same SID must be time-ordered within the B-MAP.

(3) If the CMTS allocates more than one supergrant to a SID, then on each channel, the start time of each segment within a subsequent supergrant in the B-MAP must be later than the start time of each segment within an earlier supergrant to the same SID within the B-MAP. For example, if the CMTS allocates a supergrant to SID A with a start time of the grant on a first channel of 1450, then no other supergrant to SID A on the first channel as part of a subsequent supergrant in the B-MAP may have a start time earlier than 1450.

(4) If the CMTS allocates more than one supergrant to a SID, then the end times of subsequent supergrants must be later than the end times of all grants in the preceding supergrant to that SID.

(5) The span of segments that overlap in time and that are allocated to a specific SID on different channels must not be greater than a predetermined value.

(6) Multichannel allocations to different SIDs must be ordered by earliest start time (across all channels), with the order being arbitrary in the event of a tie.

As will be appreciated by persons skilled in the art, other restrictions may be placed on the segmenting of grants across multiple channels.

5. Baseline Privacy Impact

The conventional DOCSIS Baseline Privacy Interface (BPI) is a set of extended services within the DOCSIS MAC layer for encrypting traffic flows between a CMTS and a CM to give subscribers data privacy across an RF network. In order to describe embodiments of the present invention for traffic encryption for bonded upstream channels, it is helpful to contrast these embodiments with conventional approaches.

5.1 Conventional DOCSIS Traffic Encryption

Figure 14:
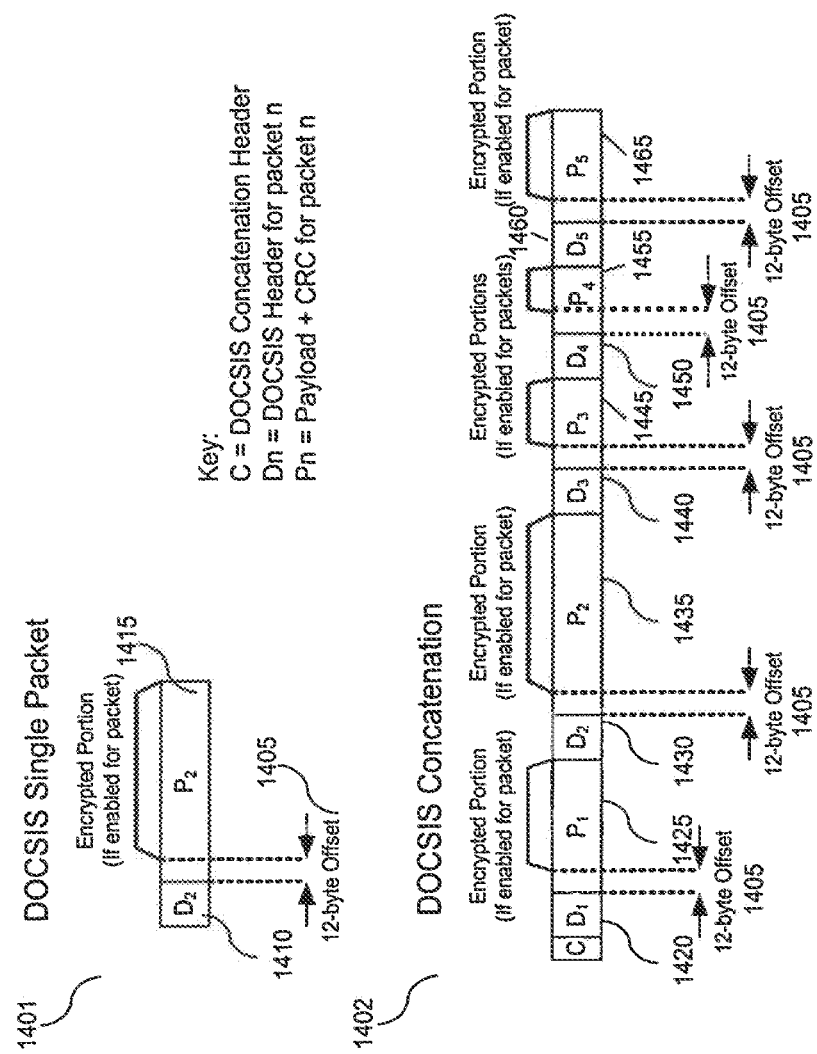
FIG. 14 illustrates an example of a conventional DOCSIS traffic encryption technique with 12-byte offset for an unfragmented single packet and an unfragmented concatenation of packets.
Figure 15:
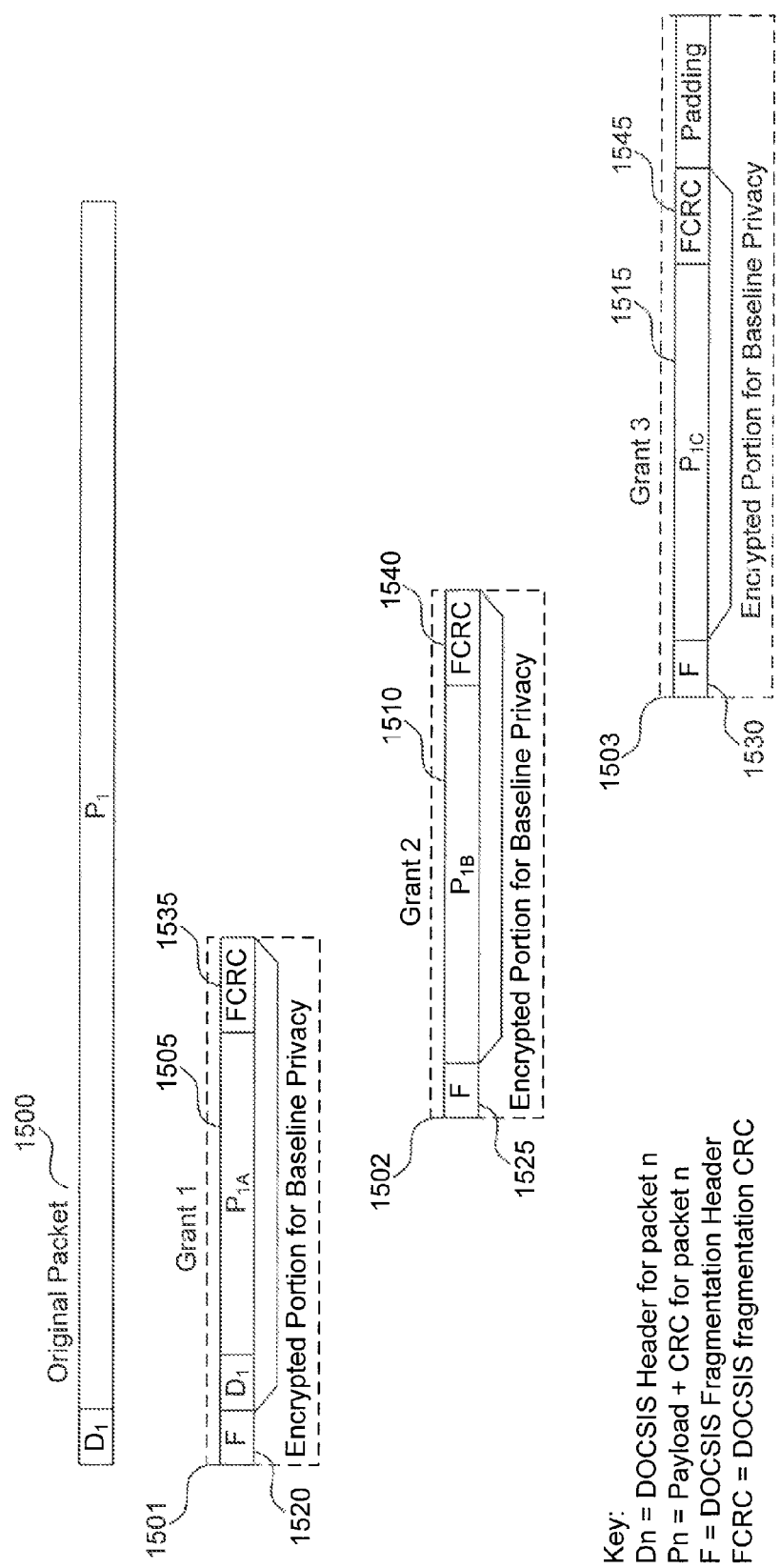
FIG. 15 illustrates an example of a conventional DOCSIS traffic encryption technique for a fragmented single packet.
Figure 16:
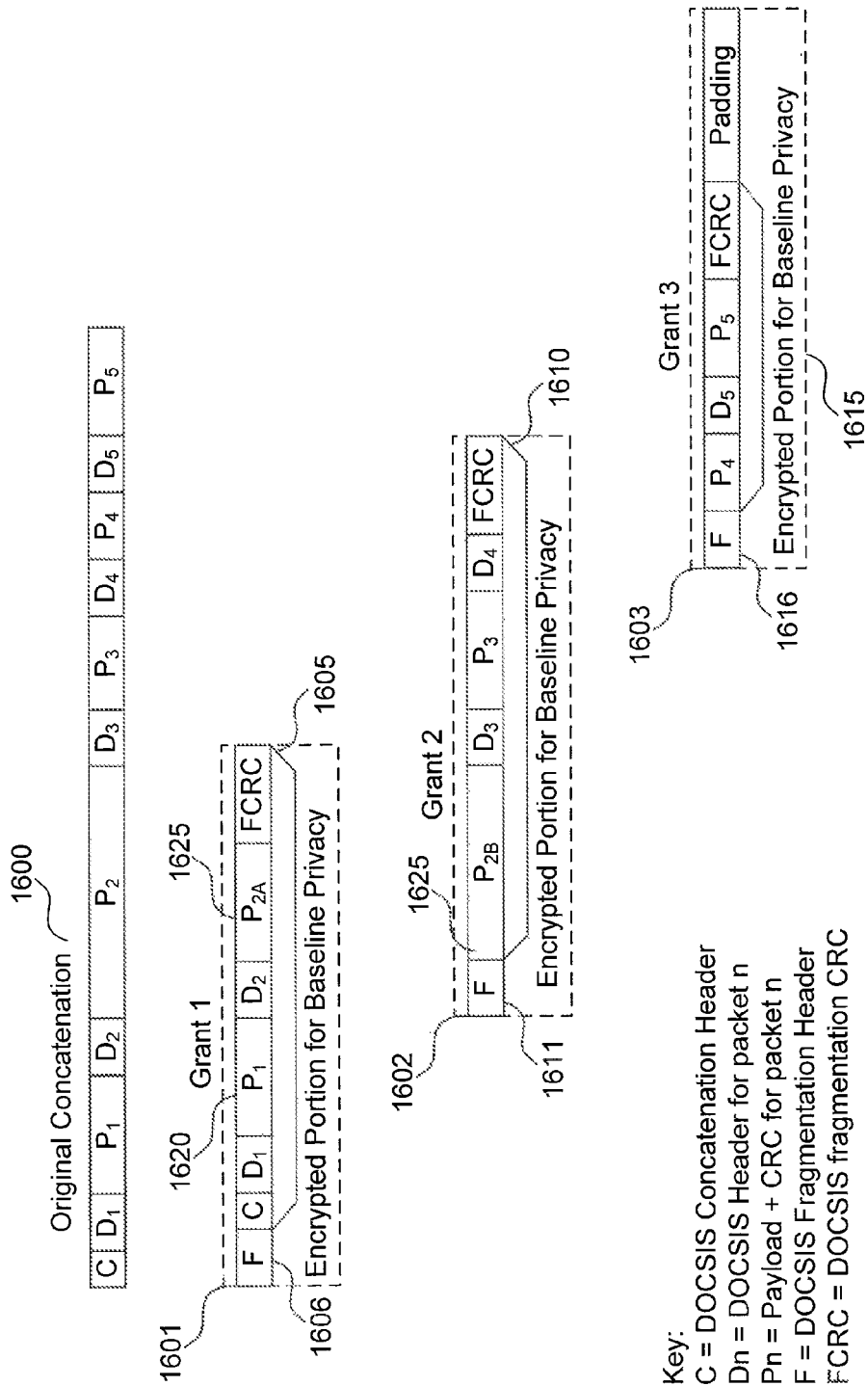
FIG. 16 illustrates an example of a conventional DOCSIS traffic encryption technique for a fragmented concatenation of packets.

Conventional DOCSIS systems handle traffic encryption in two different ways depending on whether the traffic is fragmented at the DOCSIS MAC layer. FIGS. 14-16, described in detail below, illustrate example conventional DOCSIS traffic encryption techniques.

For unfragmented single MAC frame transmissions that require encryption, the frame is encrypted from twelve bytes after the DOCSIS MAC header through the CRC of the packet. This 12-byte offset allows the receiving entity to filter on the Destination Address/Source Address (DA/SA) combination (when Payload Header Suppression (PHS) is not used) prior to decryption. This 12-byte offset also allows for a stronger cipher because the frequently occurring strings of destination address and source address are left visible so as not to give hackers hints for deciphering.

For unfragmented concatenations, each MAC frame within the concatenation is treated like an unfragmented single MAC frame. Mixtures of unencrypted and encrypted frames may appear within a concatenation. This mixture can occur whenever MAC management messages (which are not supposed to be encrypted) are included in a concatenation with encrypted data. FIG. 14 illustrates an example of conventional DOCSIS traffic encryption with 12-byte offset for an unfragmented single packet 1401 and an unfragmented concatenation of packets 1402. As shown in FIG. 14, unfragmented single packet 1401 includes an encrypted payload 1415 following a 12-byte offset 1405 from a corresponding unencrypted DOCSIS MAC header 1410 through the CRC of the packet. Similarly, each frame of concatenation of packets 1402 includes an encrypted payload portion 1425, 1435, 1445, 1455 and 1465 following the 12-byte offset 1405 from a corresponding unencrypted DOCSIS MAC header 1420, 1430, 1440, 1450 and 1460 through the CRC of each packet.

Fragmented single frames and fragmented concatenations are treated differently from their unfragmented forms. FIG. 15 illustrates an example of conventional DOCSIS traffic encryption for a fragmented single packet 1500. Original packet 1500 is fragmented across three grants 1501, 1502 and 1503. Each packet fragment 1505, 1510 and 1515 is encapsulated with a corresponding fragment header 1520, 1525 and 1530 and a corresponding fragment CRC 1535, 1540 and 1545. As shown in FIG. 15, each fragment 1505, 1510 and 1515 is encrypted from the end of the corresponding fragment header through the corresponding fragment CRC.

Because fragment boundaries will rarely align with packet boundaries within a concatenation, concatenations of packets are treated as a large single MAC frame from a conventional DOCSIS traffic encryption perspective. Thus, for a fragmented concatenation of packets, each concatenation fragment is encapsulated with a fragmentation header and a fragmentation CRC. Encryption is then performed on the fragment from the end of the fragment header through the fragment CRC. The 12-byte offset used for unfragmented frames is not used with fragmented frames because the 12-bytes would be user data rather than a DA/SA pair.

FIG. 16 illustrates an example of conventional DOCSIS traffic encryption for a fragmented concatenation of packets 1600. Concatenation of packets 1600 is fragmented over three grants 1601, 1602 and 1603 into three fragments 1605, 1610 and 1615 having corresponding fragment headers 1606, 1611 and 1616. Note that all packets within fragments 1605, 1610 and 1615 are encrypted the same way (i.e., encryption is performed on each fragment from the end of the corresponding fragment header through the corresponding fragment CRC).

Referring to FIG. 16, if a first packet 1620 in grant 1601 is supposed to be encrypted but a second packet 1625 is not supposed to be encrypted, both packets will be encrypted. Thus, if concatenation 1600 were to contain a BPI key exchange message and be fragmented, the BPI key exchange message would be encrypted within one or more fragments 1605 and 1610. If the key exchange message is encrypted and the key used is incorrect, the CMTS will not be able to decrypt the message containing the new key. For this reason, conventional DOCSIS traffic encryption prohibits the CM from including BPI key exchange messages within a concatenation.

5.2 Traffic Encryption for Bonded Upstream Channels

For bonded upstream channel systems, the CMTS decides how to segment the bandwidth over the upstream channels and does not know a priori what type of packets the CM will transmit in a given segment. Thus, there is no way to ensure that BPI key exchange messages have their own segments unless additional mechanisms are added to the conventional DOCSIS protocol for bonded upstream channel systems.

Rather than adding mechanisms to the protocol, the following approaches can be used to avoid encryption of BPI key exchange messages for bonded upstream channel systems: (1) BPI encryption can be performed on a segment basis, or (2) a secondary SID can be dedicated to every CM implementing upstream channel bonding for sending BPI key exchange messages, or (3) BPI encryption can be performed on a protocol data unit (PDU) basis prior to segmentation. These three approaches are described in more detail below.

5.2.1 CM Forcing Single Packet Transmission

One mechanism for avoiding encryption of BPI key exchange messages for bonded upstream channel systems is to encrypt on a segment basis, but always force a BPI key exchange message to be the only packet within a segment. This approach requires that the segment header for all segments requiring BPI include a BPI header. This approach also requires that the CM have an intelligent requesting agent and be able to stall the request engine surrounding BPI key exchange messages.

For example, consider the packet ordering shown in Table 1. Assume that Table 1 shows a current list of packets enqueued for upstream transmission on a particular SID at a CM. To prevent the BPI key exchange message in the fifth packet from being included with other packets in a segment, the CM first sends up a request for only the first four packets in the queue. Once the CM receives grants for the first four packets, the CM sends up a request for only the fifth packet. The CM then waits again for the grants to fulfill transmission of the fifth packet before requesting bandwidth for the sixth and seventh packets and any other packets that have been enqueued in the meantime. This approach is less efficient than sending one request for all seven packets in the example queue of packets shown below in Table 1.

TABLE 1

Example of Packets in CM Queue

| Packet Number in Queue | Type of Packet |
| --- | --- |
| 1 | User Data |
| 2 | User Data |
| 3 | SNMP Response |
| 4 | User Data (Ack) |
| 5 | BPI Key Exchange Message |
| 6 | User Data (Ack) |
| 7 | User Data |

5.2.2 Using Dedicated SID with BPI Disabled

Another mechanism to avoid encrypting BPI key exchange messages for bonded upstream channel systems is to dedicate a secondary SID to every CM implementing upstream channel bonding to be used only for BPI key exchange messages and for other messages not requiring encryption. In this approach, the CM uses a BPI-OFF SID whenever requesting bandwidth for sending BPI key exchange messages. While this approach avoids the problem of encrypting BPI key exchange messages, it requires an additional SID at every CM. Adding additional SIDs may not be desirable to Cable Operators trying to conserve SIDs due to the added number of DOCSIS devices with DOCSIS set-top gateway (DSG) usage for set-top box control.

5.2.2 Encrypting on PDU Basis Rather than Segment Basis

Rather than encrypting on a segment basis or requiring a dedicated SID for BPI key exchange messages, BPI encryption can be performed on a PDU basis (i.e., on the individual MAC frames) prior to segmentation for bonded upstream channel systems. In order for the CMTS MAC to handle mixes of unbonded upstream channel traffic and bonded upstream channel traffic, the encryption performed on individual packets uses the same rules and 12-byte offset as the conventional BPI and BPI Plus encryption techniques described above.

Figure 17:
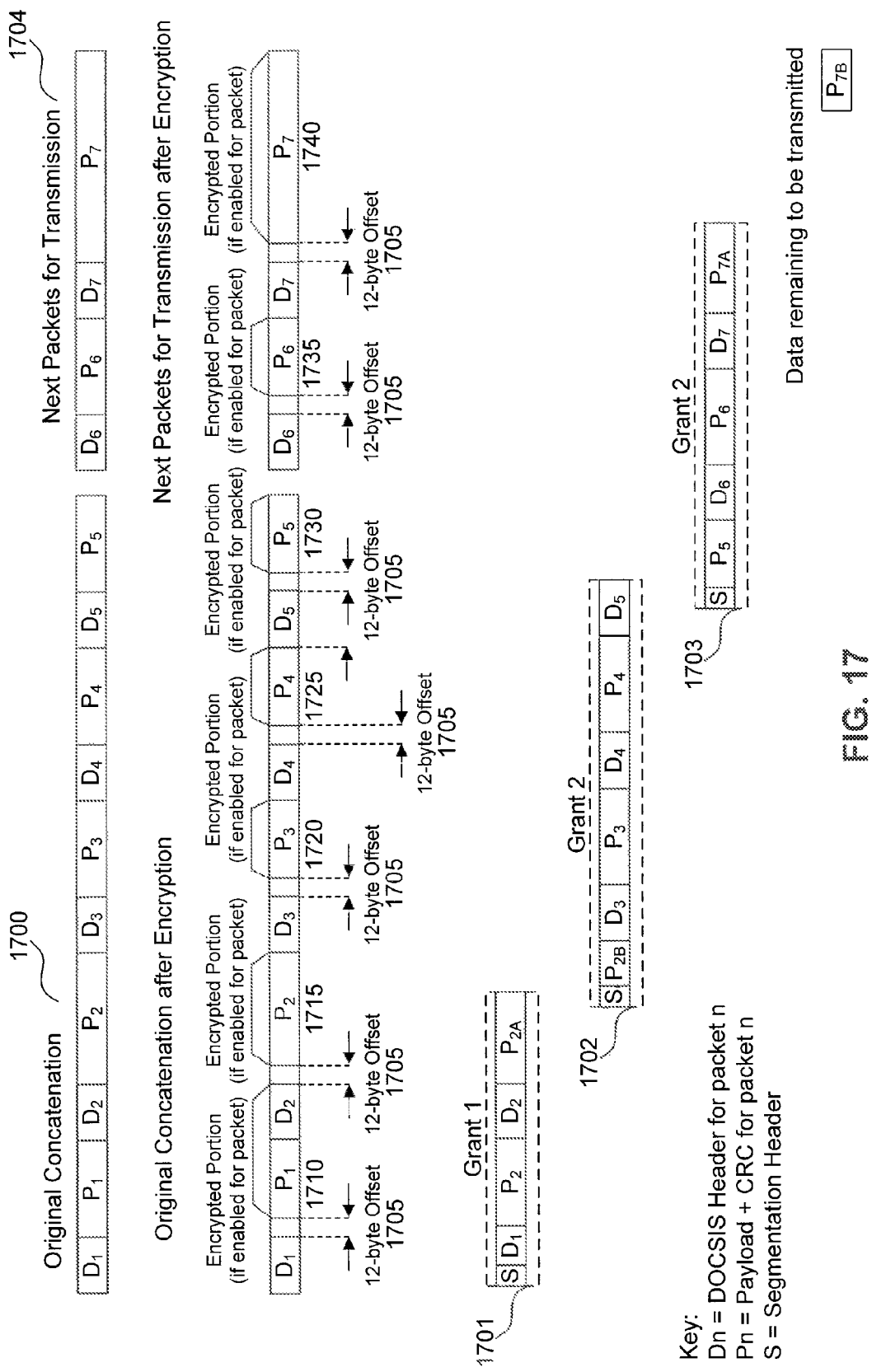
FIG. 17 illustrates an example of baseline privacy interface (BPI) encryption performed on individual MAC frames prior to segmentation, in accordance with an embodiment of the present invention.

FIG. 17 illustrates an example of BPI encryption performed on a PDU basis prior to segmentation, in accordance with an embodiment of the present invention. As shown in FIG. 17, an original concatenation of packets 1700 and a queue 1704 of next packets for transmission are encrypted using conventional BPI encryption techniques. Each packet 1710, 1715, 1720, 1725, 1730, 1735 and 1740 are encrypted following a 12-byte offset 1705 from a corresponding DOCSIS header. Next, the encrypted packets are segmented into grants 1701, 1702 and 1703.

Because the piggyback field in a conventional BPI EHDR is too small to send an unburdened request in multiples of four bytes, in accordance with an embodiment of the present invention, the conventional DOCSIS BPI EHDR is modified to include a longer piggyback field for use without segment headers and no piggyback field for use with segment headers. These modified BPI EHDR types are described in more detail below in Section 7.3.1.

6. System Initialization

Figure 18A:
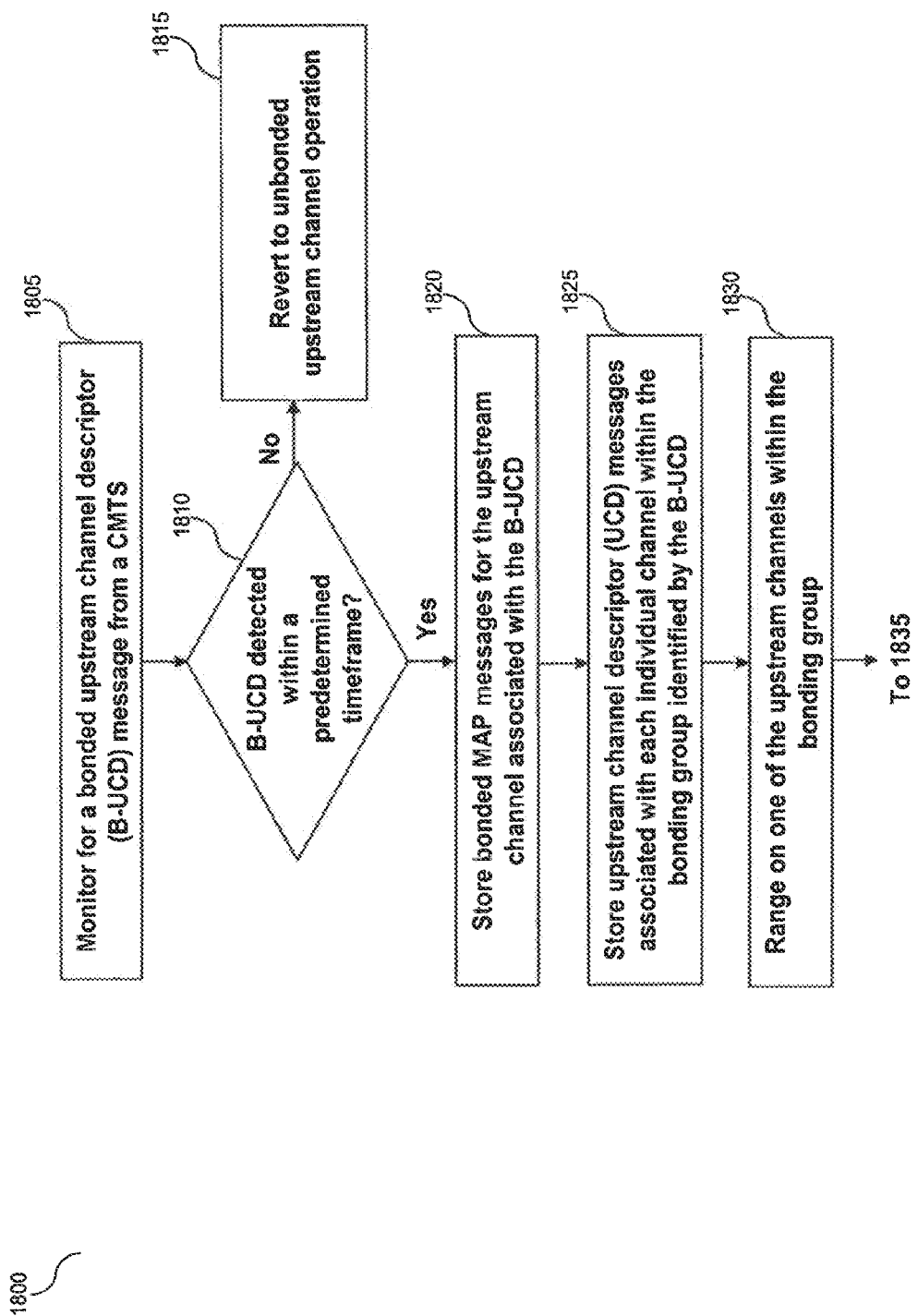
FIGS. 18A and 18B illustrate a process flowchart providing example initialization steps for a CM that supports upstream channel bonding, in accordance with an embodiment of the present invention.
Figure 18B:
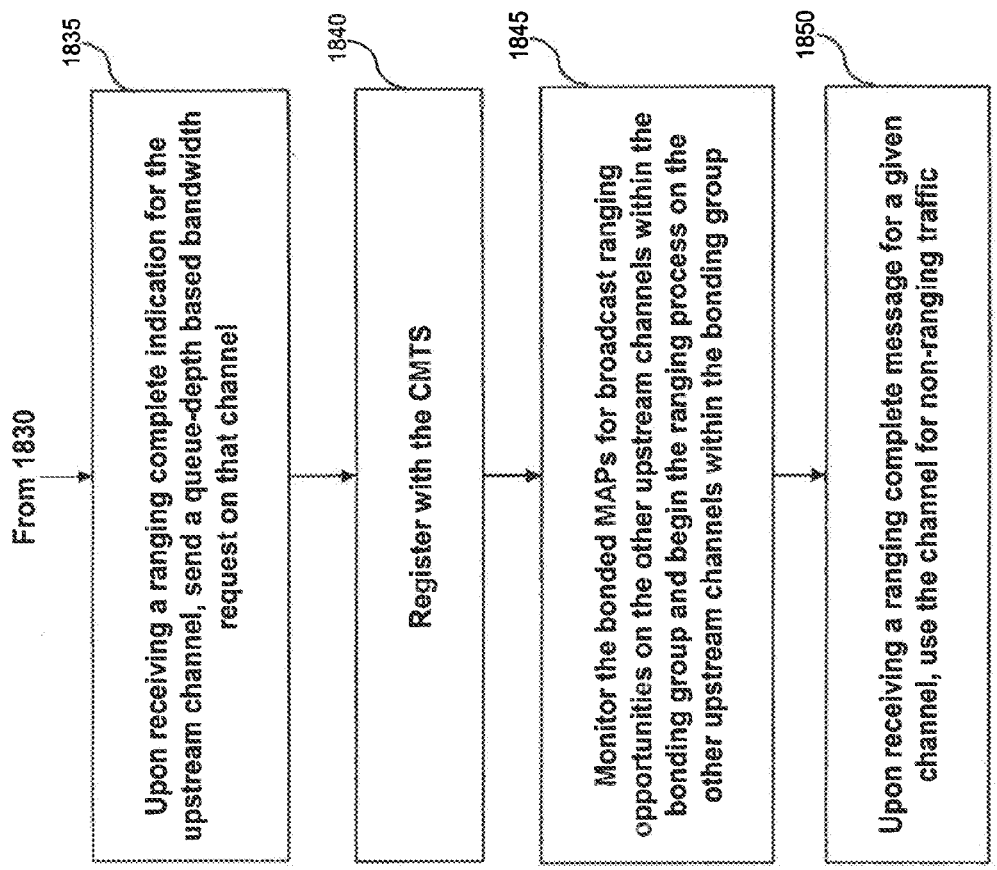

FIGS. 18A and 18B show a process flowchart 1800 providing example steps in a CM for initialization with a CMTS in a bonded upstream channel system, in accordance with an embodiment of the present invention. After the CM acquires a suitable downstream channel, the CM looks for a Bonded Upstream Channel Descriptor (B-UCD) message in step 1805. In step 1810, if the CM cannot find a B-UCD message within a predetermined timeframe, then the CM reverts to conventional unbonded upstream channel operation in step 1815.

If the CM finds a B-UCD message within the predetermined timeframe, then the CM begins storing bonded MAP messages for the upstream channel associated with the B-UCD in step 1820. In step 1825, the CM also begins storing upstream channel descriptor (UCD) messages associated with each individual channel within the bonding group identified by the B-UCD.

In step 1830, the CM begins to range on one of the upstream channels within the bonding group. In step 1835, once the CM receives a ranging complete indication for the upstream channel, the CM sends a queue-depth based bandwidth request on that channel to facilitate the remainder of the initialization process.

In step 1840, during a registration process, the CM tells the CMTS how many upstream channels it is capable of bonding and the CMTS tells the CM how many upstream channels it wants the CM to use. Registration message attributes are described in more detail below in Section 7.4.5.

Once the CM has registered, the CM monitors the bonded MAPS for broadcast ranging opportunities on the other upstream channels within the bonding group and begins the ranging process on the other upstream channels within the bonding group in step 1845. Because the CM may not be capable of bonding to the number of upstream channels supported by the bonding group, the CM may try ranging on any subset of the channels. If the CM attempts to range on a channel within the bonding group for which the CMTS does not want additional traffic added, the CMTS can send a new upstream channel ID in the upstream channel override field of the ranging response message.

Once the CM receives a ranging complete message for a given channel, the CM uses that channel for non-ranging traffic in step 1850. The CMTS can segment a CM's grant over any channels within the bonding group for which the CM has successfully ranged. Once the CM has successfully ranged on the number of upstream channels specified at registration time, the CMTS can segment grants for the CM across any of those channels.

Note that the CMTS must continue to provide unicast ranging opportunities to the CM for each upstream channel within the bonding group for which the CM has been sent a ranging complete indication. In accordance with an embodiment of the present invention, if the CM does not receive a unicast ranging opportunity within a predetermined timeframe (e.g., the conventional DOCSIS T4 timeframe), or reaches a retry threshold on sending ranging request packets (e.g., conventional DOCSIS RNG-REQ messages), then the CM will remove the associated upstream channel from its list of usable upstream channels and send a Bonded Channel Upstream Ranging Abort (B-RNG-ABORT) message to the CMTS, as described in further detail below in Section 7.4.6.

7. Detailed Mac Changes

As described above, in an embodiment, the upstream channel bonding technique of the present invention is implemented as an extension of conventional DOCSIS interface specifications. Thus, several new and modified MAC formats are introduced below to extend conventional DOCSIS interface specifications to support upstream channel bonding.

7.1 Request Message

In order for a CMTS to distinguish between conventional DOCSIS bandwidth requests based on burdened minislots and bandwidth requests for bonded upstream channels based on unburdened bytes, a new request header is defined, in accordance with an embodiment of the present invention. The new header is ignored by conventional DOCSIS systems. For example, Table 2 shows the conventional DOCSIS 2.0 FC_PARM fields extended to include a new Queue-Depth Based Request Frame type for bonded upstream channel systems.

TABLE 2

MAC-Specific Headers and Frame Types

| FC_PARM | Header/Frame Type |
|---|---|
| 00000 | Timing Header |
| 00001 | MAC Management Header |
| 00010 | Conventional Request Frame |
| 00011 | Fragmentation Header |
| 00100 | Queue-Depth Based Request Frame |
| 11100 | Concatenation Header |

Figure 19:
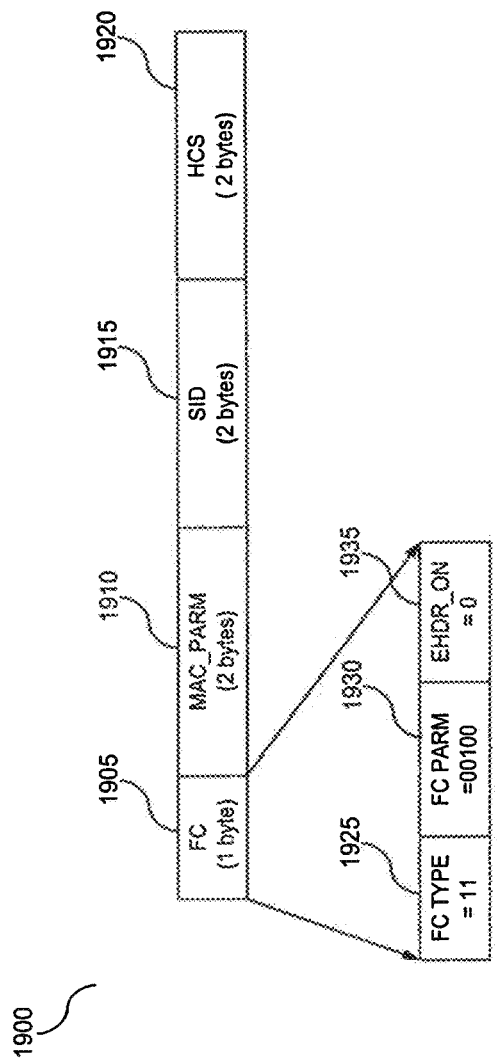
FIG. 19 illustrates a queue-depth based request frame format, in accordance with an embodiment of the present invention.

FIG. 19 illustrates a queue-depth based request frame format 1900, in accordance with an embodiment of the present invention. The format is similar to the format of a conventional DOCSIS Request Frame except that the MAC_PARM field is two bytes instead of one byte. As shown in FIG. 19, queue-depth based request frame 1900 includes four fields: a frame control (FC) field 1905, a MAC_PARM field 1910, a SID field 1915, and header check sequence (HCS) field 1920. FC field 1905 includes three fields: an FC TYPE field 1925, an FC PARM field 1930, and an EHDR_ON field 1935. The fields of queue-depth based request frame 1900 are further defined below in Table 3.

TABLE 3

Queue-Depth Based Request Frame Format

| Field | Usage | Size |
|---|---|---|
| FC | FC_TYPE = 11; MAC-Specific Header FC_PARM[4:0] = 00100; MAC request header only; no data PDU following EHDR_ON = 0; No EHDR allowed | 1 byte |
| MAC_PARM | REQ2, total number of bytes requested in units of 4 bytes. Thus, a value of 0x1 would represent a request for 4 bytes. | 2 bytes |
| SID | Service ID | 2 bytes |
| EHDR | Extended MAC Header not allowed | 0 bytes |
| HCS | MAC Header Check Sequence | 2 bytes |
|  | Length of Queue-Depth Based Request MAC Header | 7 bytes |

7.2 Segment Header Formats

Figure 20:
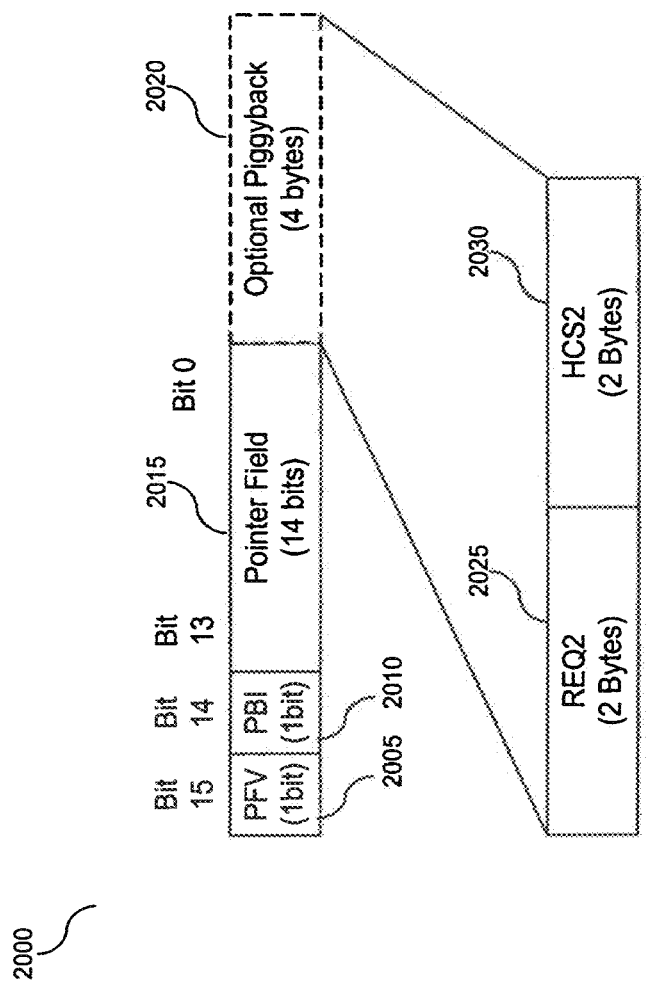
FIG. 20 illustrates a segment header format, in accordance with an embodiment of the present invention.

As described above, in order to implement fragmentation with bonded upstream channels, segment headers can be inserted into each segment. FIG. 20 illustrates a segment header format 2000, in accordance with an embodiment of the present invention. The segment header is usually two bytes in length, however, once per supergiant, a piggyback field may be present, causing the segment header to expand to six bytes in length. As shown in FIG. 20, segment header 2000 includes four fields: a pointer field valid (PFV) field 2005, a piggyback indication (PBI) field 2010, a pointer field 2015, and an optional piggyback field 2020. Optional piggyback field 2020 includes a request field (REQ2) 2025 and a MAC header check sequence (HCS2) field 2030. The fields of segment header 2000 are further defined below in Table 4.

TABLE 4

Segment Header Fields

| Field | Usage | Size |
|---|---|---|
| PFV | Pointer Field Valid. This bit is set to a 1 to indicate that the pointer field is valid. When cleared to a 0, this bit indicates that there is not a valid pointer in the pointer field. | 1 bit |

TABLE 4-continued

Segment Header Fields

| Field | Usage | Size |
|---|---|---|
| PBI | PiggyBack Indication. This bit is set to a 1 to indicate that an optional piggyback request has been appended to this segment header making the overall segment header six bytes in length. When this bit is 0, no piggyback is present and the segment header length is two bytes. | 1 bit |
| Pointer Field | When the PFV bit is a 1, the value in this field is the number of bytes past the end of the segment header and optional piggyback that the receiver must skip when looking for a DOCSIS MAC Header. Thus, a value of 0 in the pointer field with the PFV set to 1 would designate a DOCSIS MAC header beginning just after the segment header and optional piggyback field. | 14 bits |
| REQ2 | The total number of bytes requested in units of four bytes. Thus, a value of 0x1 would represent a request for four bytes. This field is present only when PBI = 1. | 2 bytes |
| HCS2 | MAC Header Check Sequence 2. Similar to HCS used on all MAC headers except that this value is only calculated over the REQ2 field. This field is present only when PBI = 1. | 2 bytes |

7.3 Extended Header Formats

In accordance with one or more embodiments of the present invention, several new DOCSIS EHDR types and lengths can be added to conventional DOCSIS specifications to accommodate upstream channel bonding, as shown below in Table 5. The new EHDR types include: EH_Type=1 with EH_LEN=4, and EH_Type=7 with EH_LEN of 3 and 5.

TABLE 5

Extended Header Formats

| EH_Type | EH_LEN | EH_VALUE |
|---|---|---|
| 0 | 0 | Null configuration setting; may be used to pad the extended header. The EH_LEN must be 0, but the configuration setting may be repeated. |
| 1 | 3 | Request in minislots. Request (1 byte); SID (2 bytes) [CM → CMTS] |
| 1 | 4 | Request in 4x bytes. Request (2 bytes); SID (2 bytes) [CM → CMTS] |
| 2 | 2 | Acknowledgment requested; SID (2 bytes) [CM → CMTS] |
| 3 (BP_UP) | 4 | Upstream Privacy EH Element [DOCSIS8] |
|  | 5 | Upstream Privacy with Fragmentation EH Element [DOCSIS8] |
| 4 (BP_DOWN) | 4 | Downstream Privacy EH Element [DOCSIS8] |
| 5 | 1 | Service Flow EH Element; Payload Header Suppression Header Downstream |
| 6 | 1 | Service Flow EH Element; Payload Header Suppression Header Upstream |
| 6 | 2 | Service Flow EH Element; Payload Header Suppression Header Upstream (1 byte), Unsolicited Grant Synchronization Header (1 byte) |
| 7 (BP_UP2) | 3 | Upstream Privacy EH Element with no piggyback request |
| 7 (BP_UP2) | 5 | Upstream Privacy EH Element with piggyback request in 4x bytes |
| 8-9 |  | Reserved |
| 10-14 |  | Reserved [CME ←→ CM] |
| 15 | XX | Extended EH Element; EHX_TYPE (1 byte), EHX_LEN (1 byte), EH_VALUE (length determined by EHX_LEN) |

7.3.1 Request EHDR With Length 4

When upstream channel bonding is enabled for a CM and segment headers are disabled for a given SID, the CM may have occasion to piggyback requests on packets without baseline privacy headers. To handle this case, a second type of request EHDR with a length of 4 can be used in accordance with an embodiment of the present invention, as shown below in Table 6.

TABLE 6

Request EHDR with Length 4

| EH Element Field | Usage | Size |
|---|---|---|
| EH_TYPE | EH_TYPE = 1 | 4 bits |
| EH_LEN | EH_LEN = 4 for segment header off operation | 4 bits |
| EH_VALUE | Request in multiples of 4 bytes (2 bytes), SID (2 bytes) | 4 bytes |

7.3.2 BP_UP2

In accordance with an embodiment of the present invention, the BP_UP2 EHDR can be used when upstream channel bonding and baseline privacy are enabled. When upstream channel bonding is enabled for a CM and segment headers are enabled for a given SID, any piggyback requests for that SID will use the piggyback opportunity in the segment header. For example, as shown in FIG. 20, segment header 2000 includes optional piggyback field 2020. Thus, a piggyback field is not needed in the BPI EHDR for that SID. The CM will use the BPI_UP2 EHDR with a length of 3 for SIDs with segment headers enabled. The fields of the BPI_UP2 EHDR with a length of 3 are shown below in Table 7.

TABLE 7

BP_UP2 EHDR with Length 3 (Segment Headers Enabled)

| EH Element Field | Usage | Size |
|---|---|---|
| EH_TYPE | EH_TYPE = 7 for bonded channel usage | 4 bits |
| EH_LEN | EH_LEN = 3 for segment header on operation | 4 bits |
| EH_VALUE | KeySEQ (4 bits), Version (4 bits), Enable (1 bit), Toggle (1 bit), SID (14 bits) | 3 bytes |

When channel bonding is enabled for the CM and segment headers are disabled for a given SID, the BPI EHDR allows for a piggyback request opportunity. The CM will use the BPI_UP2 EHDR with a length of 5 for SIDs with segment headers disabled. The fields of the BPI_UP2 EHDR with a length of 5 are shown below in Table 8,

TABLE 8

BP_UP2 EHDR with Length 5 (Segment Headers Disabled)

| EH Element Field | Usage | Size |
|---|---|---|
| EH_TYPE | EH_TYPE = 7 for bonded channel usage | 4 bits |
| EH_LEN | EH_LEN = 5 for segment header off operation | 4 bits |
| EH_VALUE | KeySEQ (4 bits), Version (4 bits), Enable (1 bit), Toggle (1 bit), SID (14 bits), Request (2 bytes) | 5 bytes |

7.4 MAC Management Message Changes

In accordance with one or more embodiments of the present invention, several MAC Management Message attributes are modified and several new MAC Management Messages are created in order to support bonded upstream channels. These modified MAC Management Messages and new MAC Management Messages are identified below in Table 9.

TABLE 9

New and Modified MAC Management Messages

| Change | Type Value | Version | Message Name | Message Description |
|---|---|---|---|---|
| Modified | 6 | 1 | REG-REQ | Registration Request |
| Modified | 7 | 1 | REG-RSP | Registration Response |
| Modified | 14 | 2 | REG-ACK | Registration Acknowledgement |
| Modified | 32 | 2 | DCC-REQ | Dynamic Channel Change Request |
| New | 33 | 4 | B-MAP | Bonded Channel Upstream Bandwidth Allocation |
| New | 34 | 4 | B-UCD | Bonded Upstream Channel Descriptor |
| New | 35 | 4 | Init-B-RNG-REQ | Initial Ranging Request for Bonded Upstream |
| New | 36 | 4 | B-RNG-Abort | Bonded Channel Ranging Abort |
| New | 37 | 4 | B-RNG-Abort-ACK | Bonded Channel Ranging Abort Acknowledgement |

7.4.1 Bonded Upstream Channel Descriptor (B-UCD)

In accordance with an embodiment of the present invention, a bonded upstream channel descriptor (B-UCD) message is transmitted by a CMTS at a periodic interval to define the characteristics of a group of bonded upstream channels. A separate B-UCD message must be transmitted for each group of bonded upstream channels. The first portion of the B-UCD format is similar to the format of a conventional DOCSIS single-channel upstream channel descriptor (UCD) message, so that the same type of filtering can be used for filtering channel ID and change count. The CMTS must also transmit UCD messages for each of the individual channels within each group of bonded upstream channels.

Figure 21:
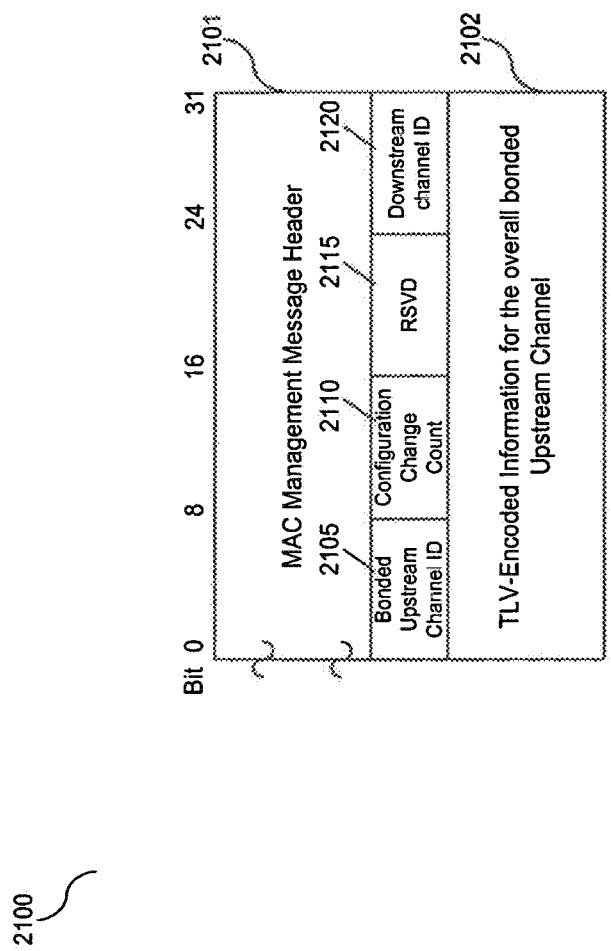
FIG. 21 illustrates a bonded upstream channel descriptor (B-UCD) message format, in accordance with an embodiment of the present invention.

FIG. 21 illustrates a B-UCD message format 2100, in accordance with an embodiment of the present invention. B-UCD message format 2100 includes a MAC management message header 2101, type length value (TLV) tuple encoded information for the overall bonded upstream channel 2102, and the following parameters: a bonded upstream channel identifier 2105, a configuration change count 2110, a reserved parameter 2115, and a downstream channel identifier 2120. These four parameters 2105, 2110, 2115 and 2120 are defined as follows:

Bonded Upstream Channel ID. The identifier of the upstream bonded channel to which this message refers. This identifier is arbitrarily chosen by the CMTS and is only unique within the MAC-Sublayer domain. Note: Upstream Channel ID=0 is reserved to indicate telephony return [DOCSIS6].

Configuration Change Count. Incremented by one (modulo the field size) by the CMTS whenever any of the values of this channel descriptor change. If the value of this count in a subsequent B-UCD remains the same, the CM can quickly decide that the channel operating parameters have not changed, and may be able to disregard the remainder of the message. This value is also referenced from the bonded MAP (B-MAP).

RSVD. This field is reserved for future use. CMTS should clear this field to zero.

Downstream Channel ID. The identifier of the downstream channel on which this message has been transmitted. This identifier is arbitrarily chosen by the CMTS and is only unique within the MAC-Sublayer domain.

All other parameters are coded as TLV tuples 2102. The type values used are defined below in Table 10.

TABLE 10

Bonded Channel TLV Parameters

| Name | Type (1 byte) | Length (1 byte) | Value (Variable Length) |
|---|---|---|---|
| Bonding Group Size | 1 | 1 | Number of channels within this bonding group (2 to N). |
| Subchannel | 2 | 1 | Channel ID within bonded group. This TLV is repeated for every upstream channel within the bonded group. |

Figure 22:
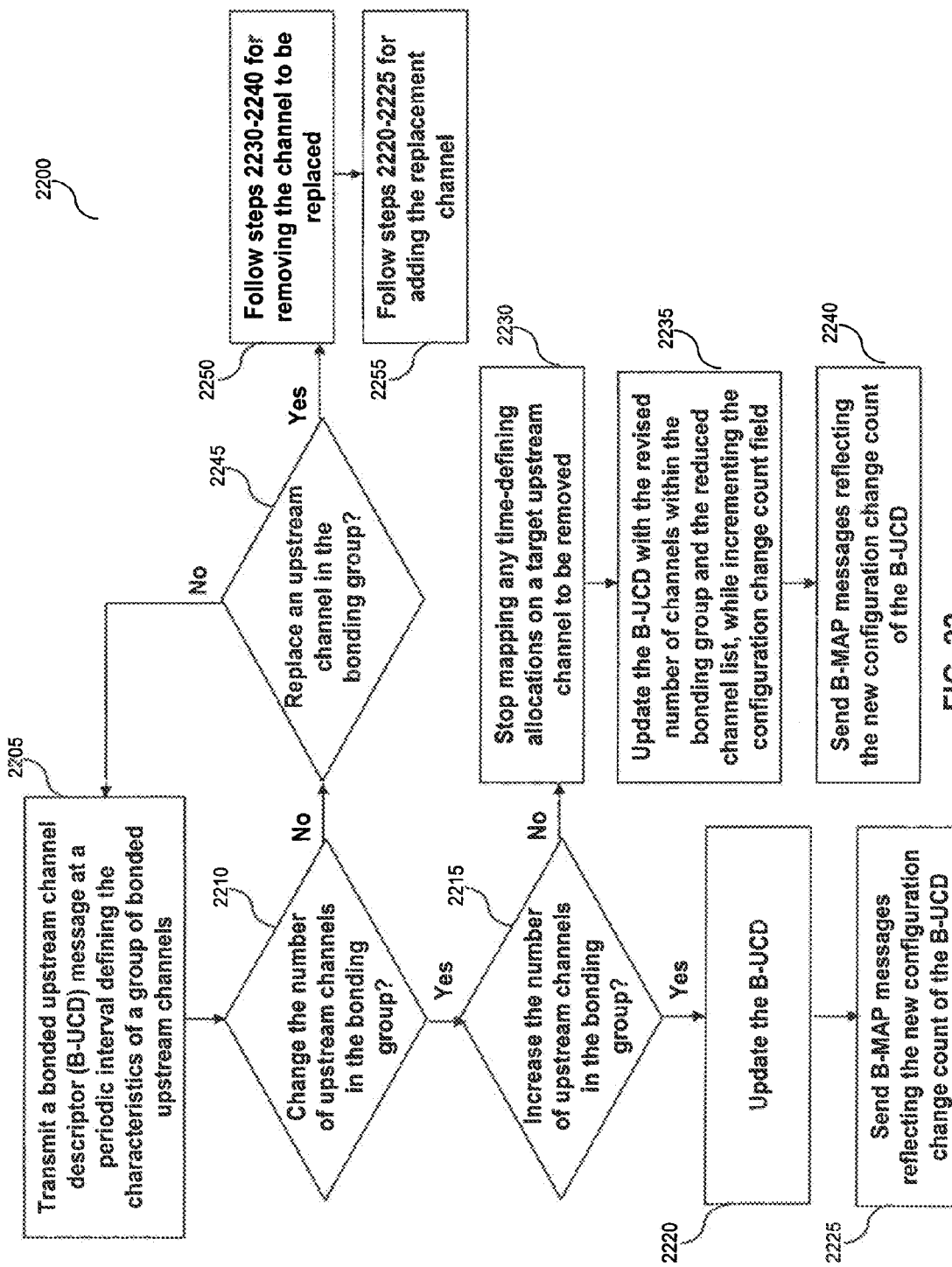
FIG. 22 illustrates a process flowchart providing example steps in a CMTS for using a B-UCD message to change the channel configuration within a group of bonded upstream channels, in accordance with one or more embodiments of the present invention.

The CMTS can use the B-UCD message to change the number of channels within a bonding group. For example, the CMTS can use the B-UCD message to increase or decrease the number of channels within the bonding group, and the CMTS can also use the B-UCD message to replace channels within the bonding group by using a two-step process. FIG. 22 illustrates a process flowchart 2200 providing example steps for a CMTS for using a B-UCD message to change the channel configuration within a group of bonded upstream channels, in accordance with an embodiment of the present invention. In step 2205, the CMTS transmits a B-UCD message at a periodic interval that defines the characteristics of the bonding group.

7.4.1.1 Process for Removing a Channel from an Upstream Bonding Group

If, in step 2210, the CMTS decides to change the number of channels in the bonding group, then process 2200 proceeds to step 2215. If, in step 2215, the CMTS decides to remove a channel in the bonding group, then process 2200 proceeds to step 2230. In order to remove an upstream channel from the bonding group, the CMTS must first stop mapping any time-defining allocations (i.e., allocations to request regions, ranging regions, data grants, etc.) on the target upstream channel to be removed in step 2230. Next, in step 2235, the CMTS updates the B-UCD with the revised number of channels within the bonding group and the reduced channel list, while incrementing the configuration change count field. In step 2240, the CMTS must then send B-MAPs reflecting the new configuration change count of the B-UCD. The first B-MAP sent after the new B-UCD allocates the minimum time (per Section 11.3.2 of the DOCSIS 2.0 RFI Specification) to a Null SID for each of the upstream channels within the bonding group to give the CM sufficient time to react to the change.

7.4.1.2 Process for Adding a Channel to an Upstream Bonding Group

If, in step 2215, the CMTS decides to add a channel to the bonding group, then process 2200 proceeds to step 2220. When the CMTS wants to add an upstream channel to a bonding group, the CMTS first updates the B-UCD in step 2220. Then, in step 2225, the CMTS sends B-MAPs reflecting the new configuration change count of the B-UCD. The first B-MAP sent after the B-UCD that adds a new upstream channel must allocate the minimum time (per Section 11.3.2 of the DOCSIS 2.0 RFI Specification) to a Null SID for each of the upstream channels within the bonding group to give the CM sufficient time to react to the change. The CMs that can add the additional upstream channel (based on the maximum number of bonded channels specified during registration) will then try to range on the new upstream channel. Because the CMs are specifically notified via the change in the B-UCD which channel is being added, and because the CMTS knows from the registration information which CMs are capable of adding another upstream channel, the CMTS can accelerate ranging by sending unicast ranging opportunities to the affected CMs for the newly added channel.

7.4.1.3 Process for Replacing a Channel in an Upstream Bonding Group

If, in step 2210, the CMTS decides not to change the number of channels in the bonding group, then process 2200 proceeds to step 2245. If, in step 2245, the CMTS decides to replace a channel in the bonding group, then process 2200 proceeds to step 2250. When the CMTS wants to replace a channel in the bonding group, it must follow a two-step process. In step 2250, the CMTS must first follow the procedure given in Section 7.4.1.1 for steps 2230, 2235 and 2240 to remove the old channel from the bonding group. Then, in step 2255, the CMTS must follow the procedure given in Section 7.4.1.2 for steps 2220 and 2225, to add the new channel to the bonding group.

7.4.2 Bonded Upstream Bandwidth Allocation MAP (B-MAP)

Figure 23:
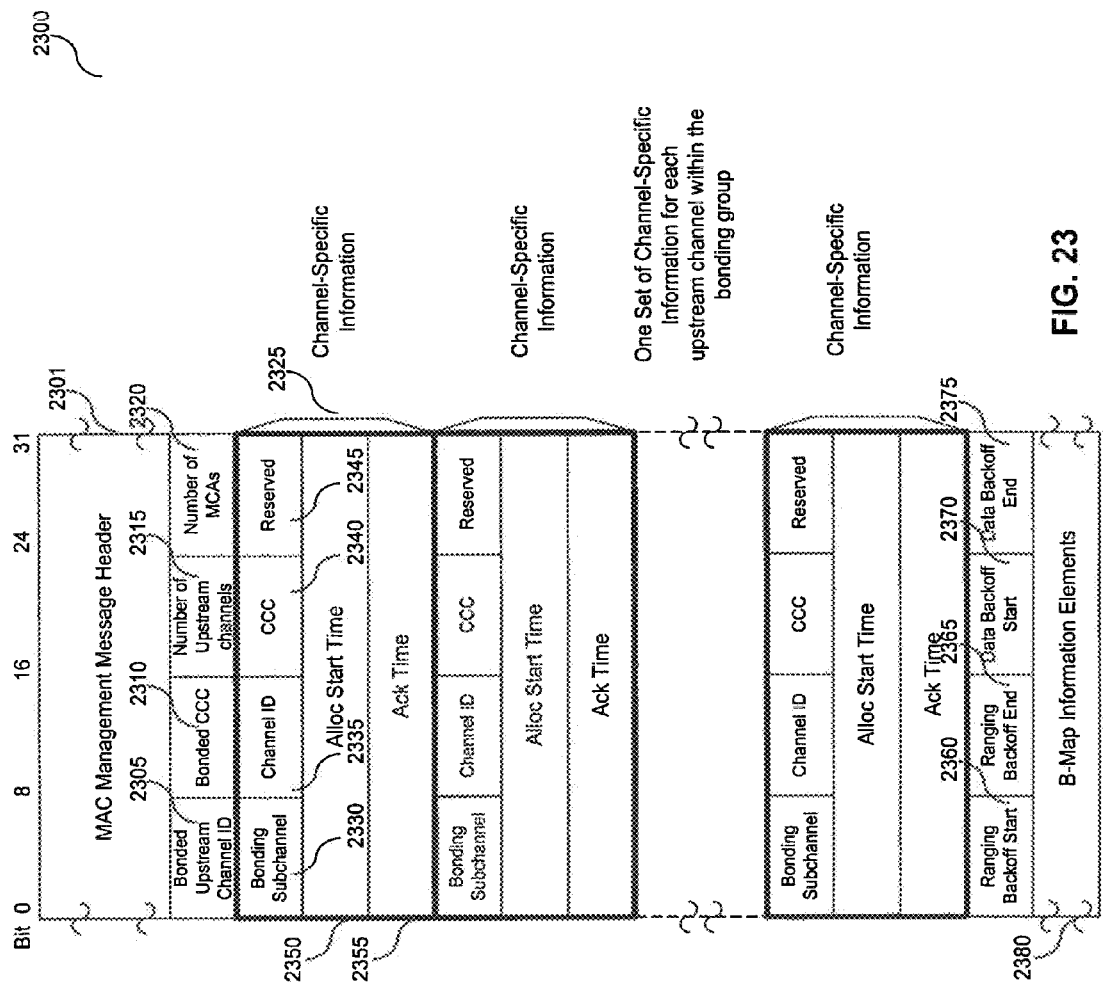
FIG. 23 illustrates a bonded upstream bandwidth allocation map message format, in accordance with an embodiment of the present invention.

FIG. 23 illustrates a bonded upstream bandwidth allocation map message (B-MAP) format 2300, in accordance with an embodiment of the present invention. B-MAP format 2300 includes the following parameters: a MAC management message header 2301, a bonded upstream channel identifier 2305, a bonded configuration change count 2310, a number of upstream channels 2315, a number of multichannel allocations 2320, a ranging backoff start window 2360, a ranging backoff end window 2365, a data backoff start window 2370, and a data backoff end window 2375.

B-MAP 2300 also includes one set of channel-specific information 2325 for each upstream channel within the bonding group. The channel-specific information 2325 includes the following fields: a bonding subchannel 2330, a channel identifier 2335, a configuration change count 2340, a reserved field 2345, an allocation start time 2350, and an acknowledgement time 2355. B-MAP 2300 farther includes B-MAP information elements 2380. These example parameters and fields of B-MAP structure 2300 are defined as follows:

Bonded Upstream Channel ID. The identifier of the bonded upstream channel to which this message refers.

Bonded Configuration Change Count (CCC). Matches the value of the Configuration Change Count of the B-UCD that describes the upstream channels within this bonding group.

Number of Upstream Channels. Number of upstream channels within this bonding group.

Number of MCA. Number of multichannel allocations in this B-MAP.

Per Upstream Channel Information. There must be one set of upstream channel information in the B-MAP for each upstream channel within the bonding group.

Bonding Subchannel. Four most-significant bits of this 8-bit field are reserved (zero), four least-significant bits indicate the subchannel number that will be used within the B-MAP multichannel allocations to refer to the upstream channel within the bonding group described by this set of Upstream Channel Information.

Channel ID. This 8-bit field contains the Upstream channel ID for the upstream channel described by this set of Upstream Channel Information Configuration Change Count (CCC). This 8-bit field contains the configuration change count of the UCD for upstream channel described in this set of Upstream Channel Information Reserved. This 8-bit field is reserved for future use and should be zero for this version of the protocol.

Alloc Start Time. Allocation Start Time (AST) for the channel described in this set of Upstream Channel Information. This value represents the effective start time (in minislots) from CMTS initialization for assignments on this channel within this B-MAP.

Ack Time for Channel N. Acknowledgement Time for the channel described in this set of Upstream Channel Information. This value represents the latest time (in minislots), from CMTS initialization, processed in the upstream for this channel. This time is used by the CMs for collision detection purposes.

Ranging Backoff Start. Initial back-off window for initial ranging contention, expressed as a power of two. Values range 0-15 (the highest order bits must be unused and set to 0).

Ranging Backoff End. Final back-off window for initial ranging contention, expressed as a power of two. Values range 0-15 (the highest order bits must be unused and set to 0).

Data Backoff Start. Initial back-off window for requests, expressed as a power of two. Values range 0-15 (the highest order bits must be unused and set to 0).

Data Backoff End. Final back-off window for requests, expressed as a power of two. Values range 0-15 (the highest order bits must be unused and set to 0).

Figure 24:
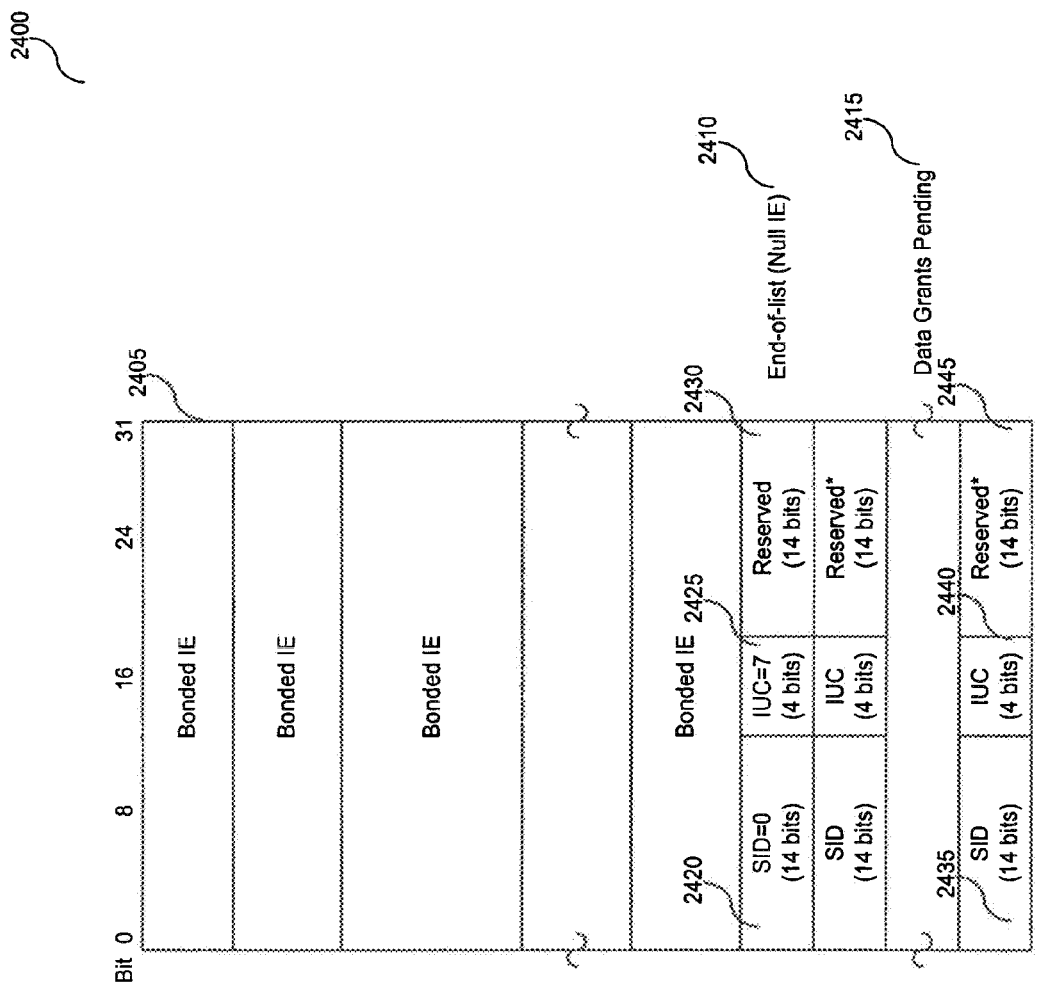
FIG. 24 illustrates a bonded map information element format, in accordance with an embodiment of the present invention.

B-MAP Information Elements. B-MAP Information Elements are formatted as shown in FIG. 24. Values for IUCs are defined in Table 8-20 of SP-RFIv2.0-I03-021218 and are described in detail in Section 9.1.2 of SP-RFIv2.0-I03-021218. *Note that the reserved field in FIG. 24 is not reserved when contained in a packed grant pending, as described below.

FIG. 24 illustrates a bonded map information element structure 2400, in accordance with an embodiment of the present invention. Bonded map information element structure 2400 includes bonded information elements 2405, an end-of-list information element 2410, and a plurality of data grants pending 2415. End-of-list information element 2410 includes a service identifier=0 field 2420, an interval usage code 7 field 2425 and a reserved field 2430. Each data grant pending 2415 includes a service identifier field 2435, an interval usage code 2440 and a reserved field 2445. Reserved field 2445 is not reserved when contained in a packed grant pending, which is defined in detail below. Bonded information elements 2405 are formatted like information elements in the conventional DOCSIS MAP structure, with the exception of the multichannel allocation and the packed grant pending formats, which are described below.

Figure 25:
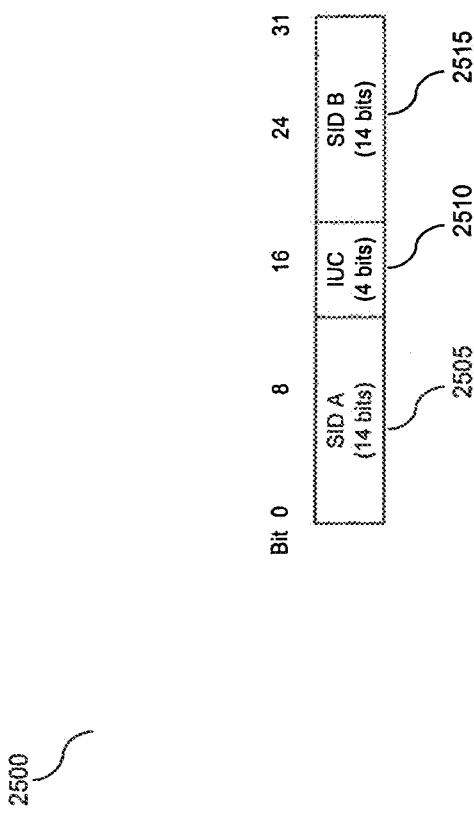
FIG. 25 illustrates a packed grant pending format, in accordance with an embodiment of the present invention.

The CMTS inserts grant pendings into the B-MAP in a packed grant-pending format, which allows two grant pendings to be packed into a single 32-bit IE in the B-MAP. FIG. 25 illustrates a packed grant pending format 2500, in accordance with an embodiment of the present invention. Packed grant pending format 2500 includes the following fields: a service identifier A field 2505, an interval usage code field 2510, and a service identifier B field 2515. The fields in packed grant pending format 2500 are further defined below in Table 11. Packed grant pending format 2500 must be used for grant pendings 2415 in B-MAP 2300 because the offset field in the conventional DOCSIS grant pending format will not be valid. Packed grant pending format 2500 must not be used in conventional DOCSIS MAP messages.

TABLE 11

Packed Grant Fields

| Field | Usage | Size |
|---|---|---|
| SID A | The first of two SIDs for which this grant pending applies. | 14 bits |
| IUC | Any of the data IUCs (5, 6, 9, 10, and 11). | 4 bits |
| SID B | The second of the two SIDs for which this grant pending applies. If no second SID needs to be specified in this grant pending, this field must be zero. | 14 bits |

Figure 26:
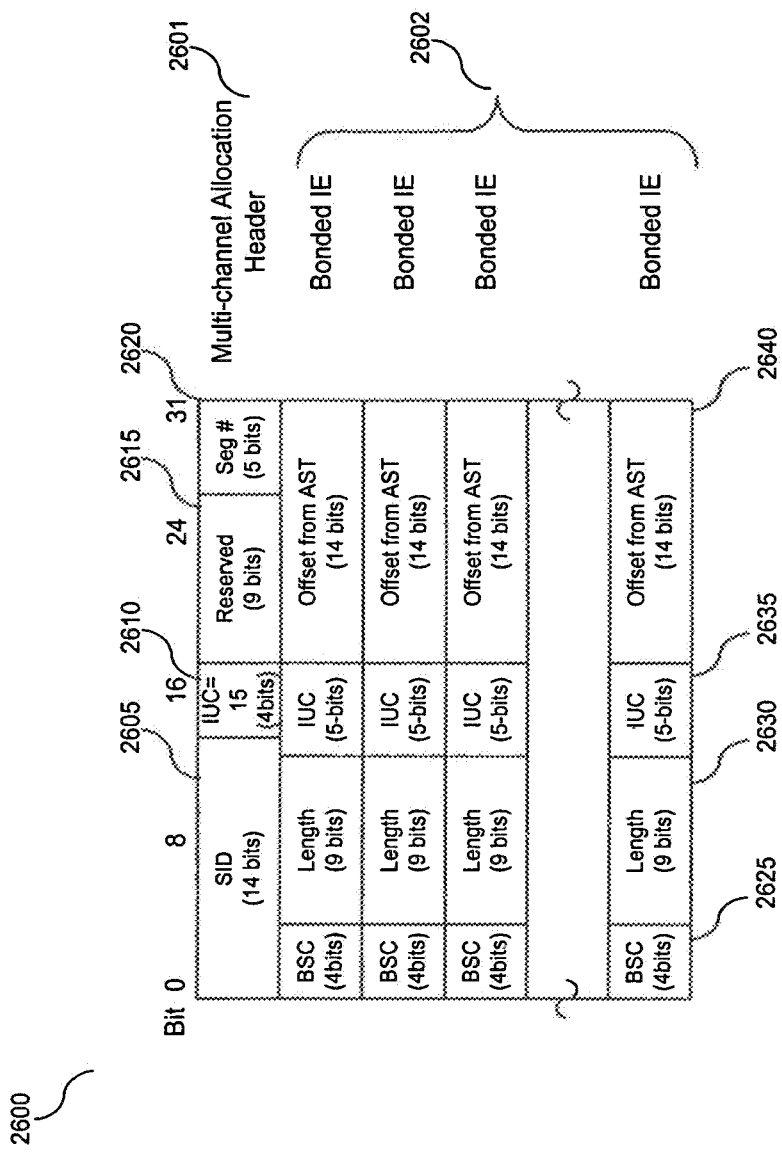
FIG. 26 illustrates a multichannel allocation format, in accordance with an embodiment of the present invention.

FIG. 26 illustrates a multichannel allocation format 2600, in accordance with an embodiment of the present invention. Multichannel allocation format 2600 includes a multichannel allocation header 2601 and a plurality of bonded information elements 2602. Multichannel allocation header 2601 includes the following fields: a service identifier field 2605, an interval usage code=15 field 2610, a reserved field 2615, and a segment number 2620. Each bonded information element 2602 includes the following fields: a bonded subchannel field 2625, a length field 2630, an interval usage code field 2635 and an offset from allocation start time field 2640. The fields in multichannel allocation format 2600 are further defined below in Table 12. Multichannel allocation structure 2600 is used for data grants, request regions, and ranging regions.

TABLE 12

Multichannel Allocation Fields

| Field | Usage | Size |
|---|---|---|
| SID | Service Identifier to which this multichannel allocation is directed. This Service Identifier may be unicast, multicast, or broadcast. | 14 bits |
| IUC = 15 | Expansion IUC used to distinguish multichannel allocations from other elements within the B-MAP | 4 bits |
| Reserved | This field must be cleared to zero by the CMTS and is reserved for future use. | 9 bits |
| Seg # | Number of Segments. This field represents the number of segments defined within this multichannel allocation. Maximum number of segments within a multichannel allocation is 31. Of the 31 segments, at most 8 can be of IUC types 5, 6, 9, 10, or 11. | 5 bits |
| BSC | Bonded Subchannel within bonding group. | 4 bits |
| Length | Length in minislots for this segment. | 9 bits |
| IUC | Interval Usage Code for this segment. IUC codes are defined in Table 8-20 of SP-RFIv2.0-I03-021218. The most significant bit of this field is reserved for future expansion of the IUC space. | 5 bits |
| Offset from AST | Starting offset in minislots from the allocation start time of this upstream channel. | 14 bits |

Example rules regarding the granting of bandwidth in bonded upstream channel systems are described above in Section 4. Because B-MAP multichannel allocation structure 2600 contains each segment's start time and duration, the B-MAP only needs to describe elements being allocated to specific IUCs and/or SIDs and does not need to map all time. This structure is different from the conventional DOCSIS MAP where all time must be mapped because the MAP elements only contain a start time (in the form of an offset from the start of the MAP), and the element duration is calculated based on the start time of the subsequent MAP element.

In accordance with an embodiment of the present invention, the conventional DOCSIS limit of the CMTS mapping no more than 4096 minislots ahead applies to both MAPs and B-MAPs. Additionally, the CMTS must not allocate more than 120 IEs and BIEs per channel per B-MAP. Thus, a single B-MAP can contain 400 IEs and BIEs as long as no more than 120 are allocated per channel.

Figure 27:
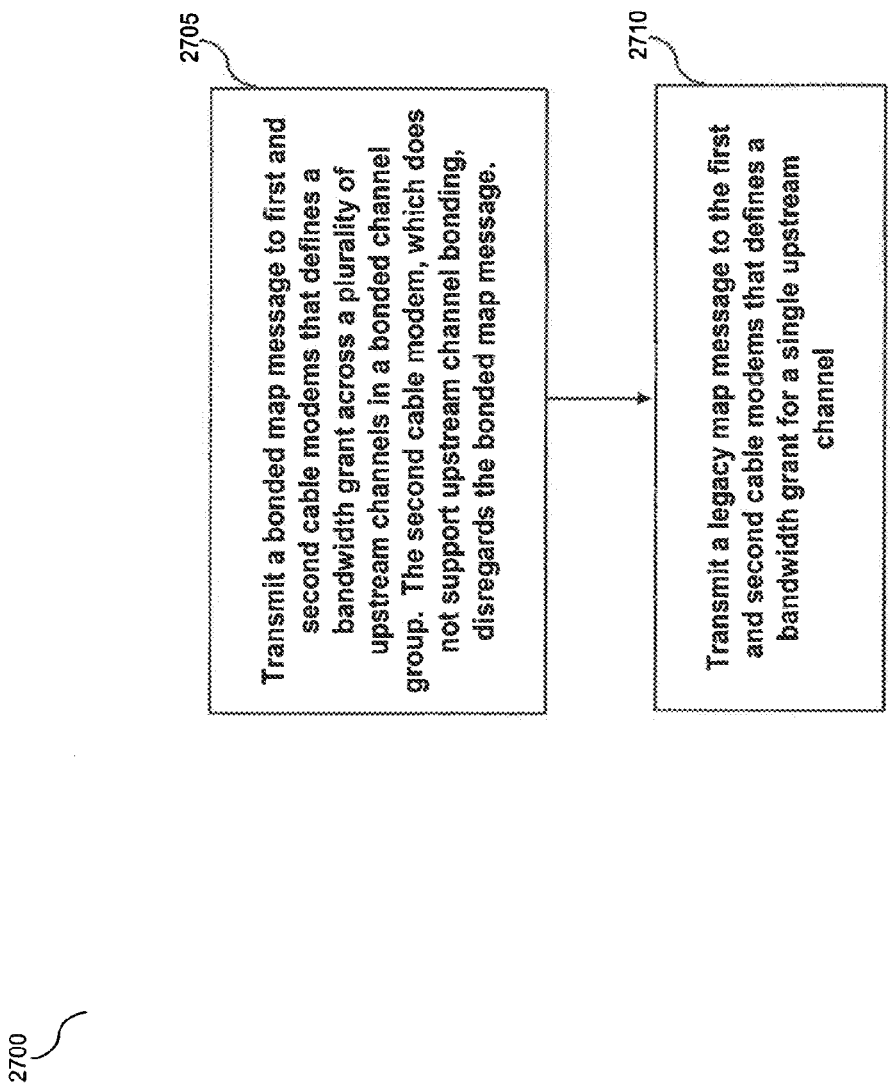
FIG. 27 illustrates a process flowchart providing example steps in a CMTS for communicating with a plurality of cable modems, including a first cable modem that supports upstream channel bonding and a second cable modem that does not support upstream channel bonding, in accordance with an embodiment of the present invention.

FIG. 27 illustrates a process flowchart 2700 providing example steps in a CMTS for communicating with a plurality of cable modems, including a first cable modem that supports upstream channel bonding and a second cable modem that does not support upstream channel bonding, in accordance with an embodiment of the present invention.

In step 2705, the CMTS transmits a bonded map message to the first and second cable modems that defines a bandwidth grant across a plurality of upstream channels in a bonded channel group. The second cable modem, which does not support upstream channel bonding, disregards the bonded map message. For example, the bonded map message can have the format of B-MAP message 2300, described above and shown in FIG. 23.

In step 2710, the CMTS transmits a conventional map message to the first and second cable modems that defines a bandwidth grant for a single upstream channel. The conventional map message will assign bandwidth to a reserved SID for allocations for the first cable modem, which supports upstream channel bonding.

7.4.3 Bonded Upstream Initial Ranging Request (B-INIT-RNG-REQ)

Because the CMTS can allocate multiple bonded upstream channel groups associated with a given downstream channel (or group of downstream channels in the case of downstream channel bonding), situations may arise where an upstream channel is a member of more than one bonding group. In order to make the most efficient use of the upstream bandwidth, the CMTS may allocate contention regions on that upstream channel to all bonding groups containing that upstream channel. For example, a broadcast ranging region on the upstream channel may be described in the B-MAP for all bonding groups containing that upstream channel.

Because the CM is listening to the B-MAPs of only one bonding group, the CMTS must ensure that its unicast allocations for that CM are in the same B-MAP to which the CM is listening. Information about which bonding group the CM is actively using must be relayed to the CMTS prior to registration, because the CM will be unable to process unicast bandwidth allocations sent in B-MAPs for bonding groups other than the one the CM is actively using. Accordance with an embodiment of the present invention a Bonded Upstream Initial Ranging Request (B-INIT-RNG-REQ) message is used with the initial ranging request to facilitate this transfer of bonding group information.

The CM uses the B-INIT-RNG-REQ message only when ranging for the first time in a bonded upstream group. Once the CM receives a ranging complete message on the channel, the CM uses the conventional DOCSIS RNG-REQ message for station maintenance on that channel. Once the CM has registered with the CMTS, the CM uses the conventional DOCSIS INIT-RNG-REQ or RNG-REQ messages to initiate ranging on other channels within the bonding group.

Figure 28:
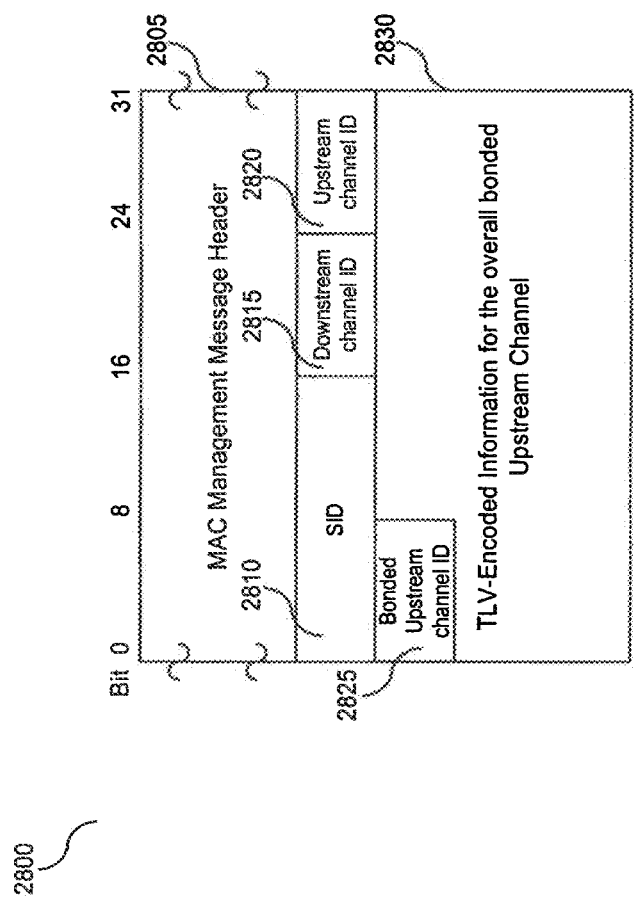
FIG. 28 illustrates a B-INIT-RNG-REQ message format, in accordance with an embodiment of the present invention.

FIG. 28 illustrates a B-INIT-RNG-REQ message format 2800, in accordance with an embodiment of the present invention. B-INIT-RNG-REQ message format 2800 includes a MAC management message header 2805, a service identifier 2810, a downstream channel identifier 2815, an upstream channel identifier 2820, a bonded upstream channel identifier 2825 and a TLV-encoded information field 2830 for the overall bonded upstream channel. The B-INIT-RNG-REQ message, like all ranging request messages, must use an FC_TYPE=MAC Specific Header and FC_PARM=Timing MAC Header. Header 2805 must be followed by a packet PDU, as shown in FIG. 28. Example parameters for B-INIT-RNG-REQ message format 2800 are defined as follows:

SID. Initialization SID if a cable modem is attempting to join the network. This is a 16-bit field, of which the lower 14 bits define the SID, with bits 14 and 15 defined to be 0.

Downstream Channel ID. The identifier of the downstream channel on which the CM received the UCD, which described this upstream. This is an 8-bit field.

Upstream Channel ID. The Upstream Channel ID from the UCD the CM is using to transmit this B-INIT-RNG-REQ. In the case where multiple logical upstream channels are sharing the same spectrum, and the Broadcast Initial Ranging Opportunities of some of these logical channels are aligned, this field allows the CMTS to know which logical channel the CM is using.

Bonded Upstream Channel ID. The Bonded Upstream Channel ID from the B-MAP the CM is using. In the case where multiple upstream bonding groups are sharing some of the same spectrum and the Broadcast Initial Ranging Opportunities defined for these bonding groups are aligned, this field allows the CMTS to know which upstream bonding group the CM is using.

The B-INIT-RNG-REQ message differs from the conventional DOCSIS INIT-RNG-REQ message in that it contains the bonded upstream channel ID parameter (e.g., bonded upstream channel identifier 2825, shown in FIG. 28) and is only transmitted in Broadcast Initial Ranging by a CM ranging the first time on an upstream bonding group.

7.4.4 Ranging Response Messages

In accordance with an embodiment of the present invention, a new TLV tuple is included in the conventional DOCSIS ranging response (RNG-RSP) message to allow the CMTS to override the bonding group to which a CM is trying to join. This parameter is only used prior to the CM registering with the CMTS. When the CMTS receives a B-INIT-RNG-REQ message from a CM, the CMTS may choose to change the upstream bonding group associated with the CM by sending a Bonded Upstream Channel Override TLV in the RNG-RSP message.

If a bonded upstream channel override is specified in the RNG-RSP message and no upstream channel override is specified, the CM must re-initialize its MAC. The CM must also perform initial ranging using the same upstream channel specified in the RNG-RSP message and the same downstream frequency, but using the bonded upstream channel specified in the RNG-RSP message for its first attempt at ranging after re-initialization.

If both a bonded upstream channel override and an upstream channel override are specified in the RNG-RSP message, then the CM must re-initialize its MAC and perform initial ranging using the same downstream frequency as before, but using the upstream channel and bonded upstream channel specified in the RNG-RSP message.

7.4.4.1 Bonded Upstream Channel Override TLV

In accordance with an embodiment of the present invention, the Bonded Upstream Channel Override TLV in the RNG-RSP message has a type value of 10 with a length of 1. The value field of this TLV contains the bonded upstream channel ID to which the CMTS wants to move the CM. This TLV may only be present in RNG-RSP messages sent prior to registration. A bonded upstream channel ID of zero instructs the CM to stop using the bonded channel, and directs the CM to move to the upstream channel specified in the upstream channel ID override and to use the MAPs and UCDs associated with the single upstream channel, rather than the B-MAPs and B-UCDs the CM was using previously.

7.4.5 Registration Messages

In accordance with one or more embodiments of the present invention, the following registration parameters are modified or added to the conventional DOCSIS specifications to control the use of upstream channel bonding. In addition to these parameters, the Nominal Grant Interval and the Tolerated Grant Jitter parameters are modified for bonded upstream channel systems.

7.4.5.1 Upstream Channel Bonding Capability TLV

The value field of the conventional DOCSIS Modem Capabilities Encoding describes the capabilities of a particular CM, such as implementation dependent limits on the particular features or number of features which the CM can support. In accordance with an embodiment of the present invention, an Upstream Channel Bonding Capability TLV parameter is added to the conventional DOCSIS Modem Capabilities Encoding and its value represents the Upstream Channel Bonding Support of the CM. The type is 5.13 and the length is 1 byte. The value is as follows: 0=no support of segmentation or upstream channel bonding; 1=support only of segmentation on a single upstream channel; 2=support for upstream channel bonding across 2 channels; N=support for upstream channel bonding across N channels (with a maximum value of N=16). Higher values are reserved.

7.4.5.2 Maximum Concatenated Burst TLV

The Maximum Concatenated Burst TLV parameter is part of the conventional Upstream-Specific QoS Parameter Encodings and defines the maximum concatenated burst (in bytes) that a Service Flow is allowed. Because the concept of concatenation is different with upstream channel bonding, in accordance with an embodiment of the present invention, this parameter is changed when upstream channel bonding is active to define the maximum number of bytes for which a CM may ask in a single request.

7.4.5.3 Maximum Request Outstanding TLV

In accordance with an embodiment of the present invention, the Maximum Request Outstanding TLV parameter is added to the Upstream-Specific QoS Parameter Encodings for conventional DOCSIS systems to handle upstream channel bonding. This parameter limits the amount of bandwidth for which the CM has a request outstanding. The type is 24.25 and the length is 4. The value is the maximum number of bytes for which the CM may have a request outstanding. Combined with the modified the Maximum Concatenated Burst TLV parameter discuss above, this parameter replaces the functionality provided by the Maximum Concatenated Burst in conventional DOCSIS systems.

7.4.5.4 Request/Transmission Policy TLV

The Request/Transmission Policy TLV parameter in the Upstream-Specific QoS Parameter Encodings specifies attributes of the request/grant process for a given service flow. In accordance with an embodiment of the present invention, this parameter is modified to include an additional value defined to control the use of segment headers. The type is 24.16 and the length is 4. The value is 9=The Service Flow Must Not use segment headers.

7.4.6 Bonded Channel Upstream Ranging Abort Message (B-RNG-Abort)

In accordance with an embodiment of the present invention, the Bonded Channel Upstream Ranging Abort Message (B-RNG-Abort) message is used to inform the CMTS that the CM has aborted ranging on one or more of the upstream channels within an upstream bonding group, due to either a T4 timeout or exceeding the retry threshold for resending RNG-REQ messages. This message is only sent by the CM for channels on which it previously received a ranging complete indication as part of the CM's upstream bonding operation.

Figure 29:
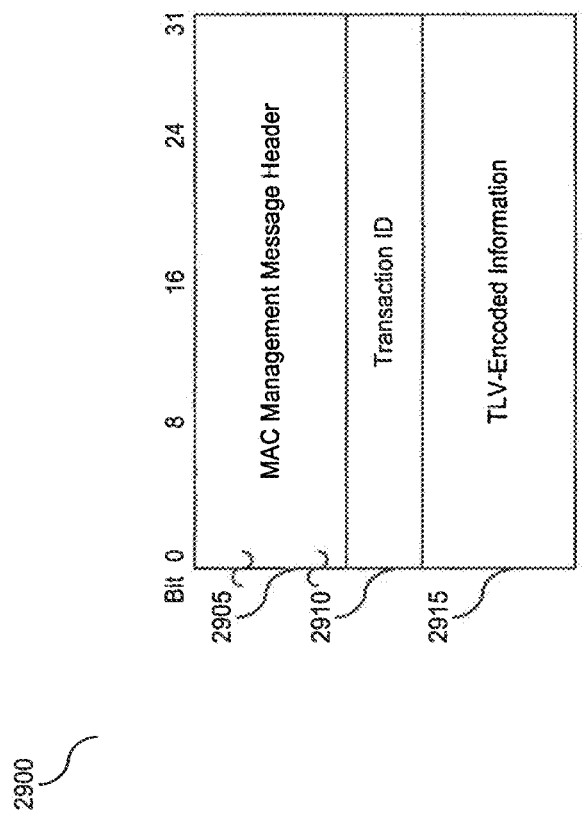
FIG. 29 illustrates a B-RNG-Abort message format, in accordance with an embodiment of the present invention.

FIG. 29 illustrates the format of a B-RNG-Abort message 2900, in accordance with an embodiment of the present invention. B-RNG-Abort message 2900 includes a MAC management message header 2905, a transaction identifier 2910, and a TLV-encoded information field 2915. The binary encoded 32-bit Transaction ID 2910 is assigned by the CM and used to correlate a received B-RNG-Abort-ACK message with a particular pending B-RNG-Abort message. The value of Transaction ID 2910 must be unique relative to the value used for any other B-RNG-Abort messages transmitted by the CM and not yet acknowledged by the CMTS via a B-RNG-Abort-ACK message with a matching transaction ID. The CM should choose an initial value of Transaction ID 2910 and increment by one for each subsequent B RNG-Abort message transaction.

TLV-encoded information field 2915 is Bonded Channel Range Abort Encoding. This TLV must be present and may appear multiple times. The type is 1 and the length is 9. The value varies according to the following three sub-type encodings:

Bonded Upstream Channel ID. This TLV must be present. The type is 1.1. The length is 1. The value is Channel ID for upstream bonding group on which ranging is aborted.

Aborted Upstream Channel. This TLV must be present for each channel reporting ranging aborts. The type is 1.2. The length is 1. The value is Upstream Channel ID for upstream channel for which ranging was aborted.

Reason for Abort. The type is 1.3. The length is 1. The value is: 0=T2, no initial maintenance map opportunity timeout; 1=T4, no station maintenance map opportunity timeout; 2=Exceeded retry limit for consecutive T3, no RNG-RSP timeout.

In an embodiment, after sending a B-RNG-Abort message to the CMTS, the CM must wait one second to receive a matching B-RNG-Abort-ACK message. If a matching B-RNG-Abort-ACK message is not received within one second, then the CM must resend the B-RNG-Abort message. The maximum number of retries for an unacknowledged B-RNG-Abort message is three, for a total number of four attempts. If a particular ranging failure results in the CM no longer being ranged on any bonded upstream channel, then the CM must perform "re-initialize upstream MAC" error handling.

7.4.7 Bonded Channel Upstream Ranging Abort Response Message (B-RNG-Abort-ACK)

In accordance with an embodiment of the present invention, the CMTS must send a B-RNG-Abort-ACK message in response to a received B-RNG-Abort message to acknowledge that the target CM is no longer connected to the bonded upstream channel indicated in the B-RNG-Abort message. In the B-RNG-Abort-ACK message, the CMTS may specify target bonded upstream channels that the CM must attempt to join. The format of the B-RNG-Abort-ACK message is the same as that of B-RNG-Abort message 2900 shown in FIG. 29. The binary encoded 32-bit transaction ID 2910 is copied from the received B-RNG-Abort message. TLV-encoded information 2915 includes the following sub-type encoding:

Bonded Upstream Channel Target Encoding. The CM must attempt to range on the specified target bonded upstream channel. This TLV may be present and may appear multiple times. The type is 1. The length is 1. The value is Target Upstream Channel ID.

7.4.8 DCC-REQ Messages

In accordance with an embodiment of the present invention, the meaning of a Dynamic Channel Change (DCC) message is modified for upstream channel bonding operation. In conventional DOCSIS systems, the CMTS may transmit a DCC Request (DCC-REQ) message to cause a CM to change the upstream channel on which it is transmitting, the downstream channel it is receiving, or both.

7.4.8.1 Bonded Upstream Channel ID

When present, a Bonded Upstream Channel ID TLV specifies a new bonded upstream channel ID that the CM must use when performing a Dynamic Channel Change. The Bonded Upstream Channel ID TLV is an override for the current bonded upstream channel ID. The CMTS must ensure that the Bonded Upstream Channel ID for the new channel is different than the Bonded Upstream Channel ID for the old channel.

The Bonded Upstream Channel ID TLV must be included if the upstream bonding group is changed. The Bonded Upstream Channel ID TLV is used for moving the CM to a different upstream bonding group, moving the CM from a bonded upstream channel to an unbonded upstream channel, and moving the CM from an unbonded upstream channel to a bonded upstream channel.

The type is 9 and the length is 1. The value is 0-255; Bonded Upstream Channel ID. A value of zero indicates that the CM is being moved to a channel without upstream channel bonding. When the value is zero, the upstream channel ID TLV must also be included to instruct the CM where to move. Note that in this instant, the new upstream channel ID may match the current upstream channel ID for the case where the CM is being removed from a bonding group, but remaining on one of the individual upstream channels within the bonding group.

8. System Synchronization Requirements

An embodiment of the present invention requires that the upstream channels within a bonding group are associated with a single downstream channel or multiple downstream channels that are synchronized together. For example, as shown in FIG. 1, system 100 includes a master clock source 116 to aid in such synchronization.

This synchronization requirement implies that the CM can use a single recovered clock to generate the timing required for transmission on all the channels within the bonded upstream group. The phase of the master clock source can be shifted from one upstream channel to another and this phase difference is accounted for through ranging.

The CM will range on each of the channels within an upstream bonded group and may possibly have a different ranging offset for each of the channels.

9. Discussion of Other Mechanisms for Bonding Channels

Other mechanisms for bonding upstream channels to achieve a higher bandwidth "pipe" in the upstream are described below in the following sections. As described above, systems implementing bonded upstream channels provide increased data rate and throughput, and in turn, benefit from an increased statistical multiplexing gain and automatic load balancing, as compared to systems not implementing bonded upstream channels.

9.1 Bonding at the Physical Layer (PHY)

One approach to bonding at the physical layer is to use a single wideband channel to provide higher maximum throughput and increased statistical multiplexing gain.

Unlike previously described embodiments of the present invention, this approach does not allow CMs not implementing upstream channel bonding to use the complete spectrum, and does not allow CMs not implementing upstream channel bonding and CMs implementing upstream channel bonding to efficiently share the same wider spectrum.

A second approach to bonding at the physical layer coding level is to code across multiple channels. The coding includes Forward Error Correction, related interleaving, and scrambling. Unlike previously described embodiments of the present invention, for which channel bonding takes place above the physical layer, this approach couples the channel bonding implementation to PHY coding, thereby making it potentially cumbersome for making changes to coding without impacting the upstream channel bonding implementation.

9.2 Variations of Bonding at the MAC Layer

In accordance with previously described embodiments of the present invention, if upstream channel bonding takes place at the level of a transmitted segment, the segment can be transmitted on any of the channels in the bonded channel group, independent of how the request was made or on which channel the request was made. After it is determined that the segment is to be transmitted on a particular channel via a grant from the CMTS, the segment is transmitted at the appropriate time using the channel and burst-specific parameters defined for that channel.

A segment on a channel within a bonded channel group can be a single complete DOCSIS frame, a concatenation of DOCSIS frames, a fragment of a DOCSIS frame, or a concatenation of DOCSIS frames. The concatenation of DOCSIS frames can be cut off at any point, which may or may not be a frame boundary due to some kind of segmentation. Thus, in accordance with previously described embodiments of the present invention, bonding at the MAC layer segment boundary provides more flexibility at the DOCSIS MAC layer, while preserving the signal processing structure and flexibility of the physical layer. Two variations for upstream channel bonding at the MAC layer are described below.

9.2.1 Requiring Identical Channel Parameters

One variation of MAC layer bonding requires that a CMTS grant a CM transmission opportunities on all bonded channels simultaneously and for the same time duration. Unlike previously described embodiments of the present invention, this approach is not flexible enough to efficiently accommodate, on the same channels, CMs that do not support upstream channel bonding in addition to UGS opportunities for various services. This approach is also restrictive with respect to the scheduling implementation when channels have different PHY parameters, such as data rates, modulation orders, and minislot sizes, among others.

9.2.2 CM Controlling Bonding

Another variation of MAC layer bonding allows the CM a great deal of "decision making" in regards to what channel in a bonded channel group to use and how to order the data. This approach, which allows the CM to decide what upstream channels to use at particular times, can complicate system testing and verification because the CM does not behave deterministically. With each CM behaving differently, this non-deterministic behavior can make field debug difficult.

In accordance with an embodiment of the present invention, a CMTS scheduler schedules all transmission opportunities on the channels in a bonded channel group, whether those transmissions are dedicated, granted, or contention opportunities. Unlike the approach of CM controlled upstream scheduling, CM behavior is deterministic and specified by the CMTS's bandwidth allocation. With CMTS controlled upstream scheduling, the CMTS is the only entity that knows the loading on each of the upstream channels, and, as such, is the only entity capable of accurately performing load balancing and deciding the channel or channels on which a CM should transmit.

9.3 Bonding at Higher Layers than the MAC Layer

An alternative approach to MAC layer bonding and segmenting at the MAC layer is fragmenting at the IP layer. IP fragmentation is an option for segmenting data to fit within a granted amount from a CMTS. However, each IP fragment has the same format as the original IP datagram. In particular, the minimum IP header of twenty bytes is included in each fragment. Thus, long packets that need to be fragmented multiple times will incur the IP overhead multiple times. Other schemes for fragmentation on the upstream at layers higher than the MAC layer would also incur additional overhead if the higher-level header is repeated multiple times for each fragment, in addition to multiple occurrences of the DOCSIS MAC header on each individual grant.

In accordance with an embodiment of the present invention, segmentation of data to fit within a granted amount from a CMTS is performed at the MAC layer. The segmentation overhead of this approach is more efficient than the conventional DOCSIS fragmentation approach and approaches for fragmenting at layers higher than the MAC layer.

10. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A cable modem termination system (CMTS), comprising:
   an upstream physical layer demodulator;
   a downstream physical layer modulator; and
   a media access control (MAC) configured to receive an upstream transmission from the upstream physical layer demodulator and to provide a downstream transmission to the downstream physical layer modulator;
   wherein the MAC is configured to bond a plurality of upstream channels in a bonded group, to receive a bandwidth request from a cable modem, wherein the bandwidth request is based on a depth of an upstream queue of data packets and includes a request for bandwidth for MAC layer overhead associated with the data packets in the upstream queue, and to issue a multichannel grant that allocates the requested bandwidth across the bonded group for use by the cable modem in transmitting a stream of data packets to the CMTS, and
   wherein the downstream physical layer modulator is configured to transmit the multichannel grant to the cable modem.

2. The CMTS of claim 1, wherein the MAC is further configured to perform real-time load balancing of the plurality of upstream channels to allocate the requested bandwidth across the bonded group.

3. The CMTS of claim 1, wherein the MAC is further configured to reconstruct the stream of data packets received from the cable modem based on information in the multichannel grant.

4. A method in a cable modem (CM) in a cable network, comprising:
- sending a bandwidth request to a cable modem termination system (CMTS), wherein the bandwidth request is based on a depth of an upstream queue of data packets and includes a bandwidth request for media access control (MAC) layer overhead associated with the data packets in the upstream queue;
- receiving a grant that allocates the requested bandwidth; and
- transmitting a stream of data packets to the CMTS according to the grant.

5. The method of claim 4, wherein the sending comprises:
- sending the bandwidth request on an available upstream channel.

6. The method of claim 5, further comprising:
- re-sending the bandwidth request based on an acknowledgment time associated with the available upstream channel.

7. The method of claim 4, wherein the transmitting comprises:
- dividing the stream of data packets among a plurality of upstream channels in a bonded group according to information in the grant.

8. The method of claim 7, wherein the transmitting comprises:
- simultaneously transmitting on the plurality of upstream channels in the bonded group.

9. The method of claim 4, further comprising:
- sending an additional bandwidth request to the CMTS after receiving an acknowledgement that the CMTS received the bandwidth request and prior to receiving the grant that allocates the requested bandwidth.

10. The method of claim 4, further comprising:
- sending an additional bandwidth request to the CMTS after receiving a grant pending from the CMTS and prior to receiving the grant that allocates the requested bandwidth.

11. A system for communicating with a plurality of devices residing on a wireless network, comprising:
- an upstream physical interface comprising one or more upstream demodulators;
- a downstream physical interface comprising one or more downstream modulators; and
- a media access control (MAC) configured to receive an upstream transmission from the upstream physical interface and to provide a downstream transmission to the downstream physical interface;
- wherein the MAC is configured to bond a plurality of upstream channels in a bonded group, to receive a bandwidth request from a device over the wireless network, wherein the bandwidth request is based on a depth of an upstream queue of data packets and includes a request for bandwidth for MAC layer overhead associated with the data packets in the upstream queue; and to issue a multichannel grant that allocates the requested bandwidth across the bonded group for use by the device in transmitting a stream of data packets to the system, and
- wherein the downstream physical interface is configured to transmit the multichannel grant to the device.

12. The system of claim 11, wherein the MAC is further configured to perform real-time load balancing of the plurality of upstream channels to allocate the requested bandwidth across the bonded group.

13. The system of claim 11, wherein the MAC is further configured to reconstruct the stream of data packets received from the device based on information in the multichannel grant.

14. The system of claim 11, wherein the MAC is further configured to simultaneously receive data from the device on the plurality of upstream channels in the bonded group.

15. The system of claim 11, wherein the MAC is further configured to receive an additional bandwidth request from the device after transmitting an acknowledgement of receiving the bandwidth request from the device and prior to transmitting the grant that allocates the requested bandwidth to the device.

16. The system of claim 11, wherein the MAC is further configured to receive an additional bandwidth request from the device after transmitting a grant pending to the device and prior to transmitting the grant that allocates the requested bandwidth.

* * * * *

UNITED STATES PATENT AND TRADEMARK OFFICE
CERTIFICATE OF CORRECTION

PATENT NO.        : 8,908,716 B2
APPLICATION NO.   : 13/618095
DATED             : December 9, 2014
INVENTOR(S)       : Denney et al.

Page 1 of 1

It is certified that error appears in the above-identified patent and that said Letters Patent is hereby corrected as shown below:

In the Claims

Column 40, line 53, please replace "modern" with --modem--.

Signed and Sealed this
Ninth Day of June, 2015

Michelle K. Lee
*Director of the United States Patent and Trademark Office*